US008826113B2

(12) United States Patent
Ludwig

(10) Patent No.: US 8,826,113 B2
(45) Date of Patent: Sep. 2, 2014

(54) SURFACE-SURFACE GRAPHICAL INTERSECTION TOOLS AND PRIMITIVES FOR DATA VISUALIZATION, TABULAR DATA, AND ADVANCED SPREADSHEETS

(71) Applicant: Lester F. Ludwig, Redwood Shores, CA (US)

(72) Inventor: Lester F. Ludwig, Redwood Shores, CA (US)

(73) Assignee: Lester F. Ludwig, San Antonio ( * ) Notice: Subject to any disclaimer, the term of this patent is extended or adjusted under 35 U.S.C. 154(b) by 0 days.

(21) Appl. No.: 13/670,346

(22) Filed: Nov. 6, 2012

(65) Prior Publication Data
US 2013/0191712 A1 Jul. 25, 2013

Related U.S. Application Data

(63) Continuation of application No. 12/875,115, filed on Sep. 2, 2010.

(60) Provisional application No. 61/239,349, filed on Sep. 2, 2009.

(51) Int. Cl.
*G06F 17/26* (2006.01)
*G06F 17/27* (2006.01)

(52) U.S. Cl.
USPC .......................................... 715/212; 715/215

(58) Field of Classification Search
CPC ............................... G06F 17/17; G06F 17/247
USPC ........................................................ 715/212
See application file for complete search history.

(56) References Cited

U.S. PATENT DOCUMENTS

| 4,748,676 | A | | 5/1988 | Miyagawa |
| 4,899,137 | A | | 2/1990 | Behrens et al. |
| 5,237,647 | A | | 8/1993 | Roberts et al. |
| 5,270,711 | A | | 12/1993 | Knapp |
| 5,276,785 | A | * | 1/1994 | Mackinlay et al. ........... 345/427 |
| 5,292,999 | A | | 3/1994 | Tumura |
| 5,341,133 | A | | 8/1994 | Savoy |

(Continued)

FOREIGN PATENT DOCUMENTS

EP   0 574 213 B1   12/1993

OTHER PUBLICATIONS

Fulton, Jennifier, "10 Minute Guide to Excel 97", 1997, QUE, pp. 1-9.*

(Continued)

*Primary Examiner* — James J Debrow
(74) *Attorney, Agent, or Firm* — Procopio, Cory, Hargreaves & Savitch LLP

(57) ABSTRACT

Graphical tools and primitives are provided for interactively intersecting graphical surfaces in a spreadsheet or visualization to produce surface intersection data. The invention can be used for simple business analysis as well as advanced engineering and science, and provide numerical solution for simultaneous spatially-manipulated interactive equations.
Visualizations of two-dimensional surfaces are rendered from provided data according to position, orientation, and viewpoint, some or all of which can be controlled by a user interface so as to create or control the intersection of surfaces. The provided data can be from an electronic spreadsheet, and the overall visualization can be displayed together with the display an electronic spreadsheet or other tabular data representation. Visually rendered surfaces can comprise symbols, colors, textures, or glyphs representing data, and virtual illumination. Intersection data corresponding to the mathematical intersection of the surfaces is computed and provided to further computation. Intersection computation can comprise interpolation and resampling.

25 Claims, 37 Drawing Sheets

(56) References Cited

U.S. PATENT DOCUMENTS

| | | | |
|---|---|---|---|
| 5,347,295 A | 9/1994 | Agulnick et al. | |
| 5,357,048 A | 10/1994 | Sgroi | |
| 5,378,850 A | 1/1995 | Tumura | |
| 5,386,219 A | 1/1995 | Greanias | |
| 5,420,936 A | 5/1995 | Fitzpatrick | |
| 5,440,072 A | 8/1995 | Willis | |
| 5,442,168 A | 8/1995 | Gurner et al. | |
| 5,459,282 A | 10/1995 | Willis | |
| 5,471,008 A | 11/1995 | Fujita et al. | |
| 5,475,214 A | 12/1995 | DeFranco et al. | |
| 5,550,964 A * | 8/1996 | Davoust | 345/440 |
| 5,565,641 A | 10/1996 | Gruenbaum | |
| 5,581,678 A * | 12/1996 | Kahn | 345/440 |
| 5,585,588 A | 12/1996 | Tumura | |
| 5,592,572 A | 1/1997 | Le | |
| 5,592,752 A | 1/1997 | Fu | |
| 5,659,145 A | 8/1997 | Weil | |
| 5,659,466 A | 8/1997 | Norris et al. | |
| 5,665,927 A | 9/1997 | Taki et al. | |
| 5,668,338 A | 9/1997 | Hewitt et al. | |
| 5,675,100 A | 10/1997 | Hewlett | |
| 5,717,939 A | 2/1998 | Bricklin et al. | |
| 5,719,347 A | 2/1998 | Masubuchi et al. | |
| 5,719,561 A | 2/1998 | Gonzales | |
| 5,724,985 A | 3/1998 | Snell | |
| 5,741,993 A | 4/1998 | Kushimiya | |
| 5,748,184 A | 5/1998 | Shieh | |
| 5,763,806 A | 6/1998 | Willis | |
| 5,786,540 A | 7/1998 | Westlund | |
| 5,801,340 A | 9/1998 | Peter | |
| 5,805,137 A | 9/1998 | Yasutake | |
| 5,824,930 A | 10/1998 | Ura et al. | |
| 5,827,989 A | 10/1998 | Fay et al. | |
| 5,841,428 A | 11/1998 | Jaeger et al. | |
| 5,850,051 A | 12/1998 | Machover et al. | |
| 5,852,251 A | 12/1998 | Su et al. | |
| 5,889,236 A | 3/1999 | Gillespie et al. | |
| 5,932,827 A | 8/1999 | Osborne et al. | |
| 5,969,283 A | 10/1999 | Looney et al. | |
| 5,977,466 A | 11/1999 | Muramatsu | |
| 5,986,224 A | 11/1999 | Kent | |
| 6,005,545 A | 12/1999 | Nishida et al. | |
| 6,037,937 A | 3/2000 | Beaton et al. | |
| 6,047,073 A | 4/2000 | Norris et al. | |
| 6,051,769 A | 4/2000 | Brown, Jr. | |
| 6,100,461 A | 8/2000 | Hewitt | |
| 6,107,997 A | 8/2000 | Ure | |
| 6,140,565 A | 10/2000 | Yamauchi et al. | |
| 6,204,441 B1 | 3/2001 | Asahi et al. | |
| 6,225,975 B1 | 5/2001 | Furuki et al. | |
| 6,285,358 B1 | 9/2001 | Roberts | |
| 6,288,317 B1 | 9/2001 | Willis | |
| 6,310,279 B1 | 10/2001 | Suzuki et al. | |
| 6,310,610 B1 | 10/2001 | Beaton et al. | |
| 6,320,112 B1 | 11/2001 | Lotze | |
| 6,323,846 B1 | 11/2001 | Westerman et al. | |
| 6,360,019 B1 | 3/2002 | Chaddha | |
| 6,363,159 B1 | 3/2002 | Rhoads | |
| 6,373,475 B1 | 4/2002 | Challis | |
| 6,392,636 B1 | 5/2002 | Ferrari | |
| 6,392,705 B1 | 5/2002 | Chaddha | |
| 6,400,836 B2 | 6/2002 | Senior | |
| 6,404,898 B1 | 6/2002 | Rhoads | |
| 6,408,087 B1 | 6/2002 | Kramer | |
| 6,570,078 B2 | 5/2003 | Ludwig | |
| 6,703,552 B2 | 3/2004 | Haken | |
| 6,793,619 B1 | 9/2004 | Blumental | |
| 7,030,860 B1 | 4/2006 | Hsu et al. | |
| 7,408,108 B2 | 8/2008 | Ludwig | |
| 7,557,797 B2 | 7/2009 | Ludwig | |
| 7,598,949 B2 | 10/2009 | Han | |
| 7,611,409 B2 | 11/2009 | Muir et al. | |
| 8,154,529 B2 | 4/2012 | Sleeman | |
| 8,169,414 B2 | 5/2012 | Lim | |
| 8,170,346 B2 | 5/2012 | Ludwig | |
| 8,179,376 B2 | 5/2012 | Griffin | |
| 8,345,014 B2 | 1/2013 | Lim | |
| 2001/0036299 A1 | 11/2001 | Senior | |
| 2001/0049695 A1* | 12/2001 | Chi et al. | 707/201 |
| 2002/0005108 A1 | 1/2002 | Ludwig | |
| 2002/0087275 A1* | 7/2002 | Kim et al. | 702/19 |
| 2002/0093491 A1 | 7/2002 | Gillespie et al. | |
| 2004/0074379 A1 | 4/2004 | Ludwig | |
| 2004/0118268 A1 | 6/2004 | Ludwig | |
| 2004/0251402 A1 | 12/2004 | Reime | |
| 2006/0212145 A1* | 9/2006 | Singh et al. | 700/83 |
| 2006/0252530 A1 | 11/2006 | Oberberger et al. | |
| 2007/0044019 A1 | 2/2007 | Moon | |
| 2007/0063990 A1 | 3/2007 | Park | |
| 2007/0229477 A1 | 10/2007 | Ludwig | |
| 2008/0005677 A1* | 1/2008 | Thompson | 715/744 |
| 2008/0010616 A1 | 1/2008 | Algreatly | |
| 2008/0143690 A1 | 6/2008 | Jang | |
| 2008/0164076 A1 | 7/2008 | Orsley | |
| 2008/0195928 A1* | 8/2008 | Matsa et al. | 715/215 |
| 2008/0259053 A1 | 10/2008 | Newton | |
| 2008/0297482 A1 | 12/2008 | Weiss | |
| 2008/0300055 A1 | 12/2008 | Lutnick | |
| 2008/0309634 A1 | 12/2008 | Hotelling et al. | |
| 2009/0006292 A1 | 1/2009 | Block | |
| 2009/0027351 A1 | 1/2009 | Zhang et al. | |
| 2009/0124348 A1 | 5/2009 | Yoseloff et al. | |
| 2009/0146968 A1 | 6/2009 | Narita et al. | |
| 2009/0167701 A1 | 7/2009 | Ronkainen | |
| 2009/0254869 A1 | 10/2009 | Ludwig | |
| 2010/0013860 A1 | 1/2010 | Mandella | |
| 2010/0044121 A1 | 2/2010 | Simon | |
| 2010/0060607 A1 | 3/2010 | Ludwig | |
| 2010/0079385 A1 | 4/2010 | Holmgren | |
| 2010/0087241 A1 | 4/2010 | Nguyen et al. | |
| 2010/0090963 A1 | 4/2010 | Dubs | |
| 2010/0110025 A1 | 5/2010 | Lim | |
| 2010/0117978 A1 | 5/2010 | Shirado | |
| 2010/0177118 A1 | 7/2010 | Sytnikov | |
| 2010/0231612 A1 | 9/2010 | Chaudhri et al. | |
| 2010/0232710 A1 | 9/2010 | Ludwig | |
| 2010/0289754 A1 | 11/2010 | Sleeman et al. | |
| 2010/0302172 A1 | 12/2010 | Wilairat | |
| 2010/0328032 A1 | 12/2010 | Rofougaran | |
| 2011/0007000 A1 | 1/2011 | Lim | |
| 2011/0037735 A1 | 2/2011 | Land | |
| 2011/0063251 A1 | 3/2011 | Geaghan | |
| 2011/0086706 A1 | 4/2011 | Zalewski | |
| 2011/0202889 A1 | 8/2011 | Ludwig | |
| 2011/0202934 A1 | 8/2011 | Ludwig | |
| 2011/0260998 A1 | 10/2011 | Ludwig | |
| 2011/0261049 A1 | 10/2011 | Cardno et al. | |
| 2011/0285648 A1 | 11/2011 | Simon et al. | |
| 2012/0007821 A1 | 1/2012 | Zaliva | |
| 2012/0034978 A1 | 2/2012 | Lim | |
| 2012/0056846 A1 | 3/2012 | Zaliva | |
| 2012/0108323 A1 | 5/2012 | Kelly et al. | |
| 2012/0192119 A1 | 7/2012 | Zaliva | |
| 2012/0194461 A1 | 8/2012 | Lim | |
| 2012/0194462 A1 | 8/2012 | Lim | |
| 2012/0195522 A1 | 8/2012 | Ludwig | |
| 2012/0223903 A1 | 9/2012 | Ludwig | |
| 2012/0235940 A1 | 9/2012 | Ludwig | |
| 2012/0262401 A1 | 10/2012 | Rofougaran | |
| 2012/0280927 A1 | 11/2012 | Ludwig | |
| 2012/0317521 A1 | 12/2012 | Ludwig | |
| 2013/0009896 A1 | 1/2013 | Zaliva | |
| 2013/0038554 A1 | 2/2013 | West | |

OTHER PUBLICATIONS

Ramamoorthi et al., "A First-Order Analysis of Lighting, Shading and Shadows", ACM, 2007, pp. 1-21.*

Doush et al., "Making Microsoft Excel Accessible: Multimodal Presentation of Charts", ACM, 2009, pp. 147-154.*

Moog, R. A., The Human Finger-A Versatile Electronic Music Instrument Component, Audio Engineering Society Preprint, 1977, New York, NY, 4 pgs.

(56) References Cited

OTHER PUBLICATIONS

Johnson, C., Image sensor tracks moving objects in hardware, Electronic Engineering Times, Apr. 5, 1999, 1 pg.
Kaoss pad dynamic effect/controller, Korg Proview Users' magazine Summer 1999, 2 pgs.
Leiberman, D., Touch screens extend grasp Into consumer realm, Electronic Engineering Times, Feb. 8, 1999.
Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.
Pennywitt, K., Robotic Tactile Sensing, Byte, Jan. 1986, 14 pgs.
Review of KORG X-230 Drum (later called Wave Drum), Electronic Musician, Apr. 1994, 1 pg.
Rich, R., Buchla Lightning MIDI Controller, Electronic Musician, Oct. 1991, 5 pgs.
Rich, R., Buchla Thunder, Electronic Musician, Aug. 1990, 4 pgs.
Dario P., et al., Tactile sensors and the gripping challenge, IEEE Spectrum, vol. 5, No. 22, Aug. 1985, pp. 46-52.
Snell, J. M., Sensors for Playing Computer Music with Expression, Proceedings of the Intl. Computer Music Conf. at Eastman, 1983, pp. 113-126.
Verner J., Artif Starr Switch Company Ztar 624-D, Electronic Musician, Nov. 1994, 5 pgs.
Haken, L., An Indiscrete Music Keyboard, Computer Music Journal, Spring 1998, pp. 30-48.
USPTO Notice of Allowance dated May 8, 2013 issued in U.S. Appl. No. 12/541,948 filed Aug. 15, 2009.
Buxton, W. A. S., Two-Handed Document Navigation, XEROX Disclosure Journal, 19(2), Mar./Apr. 1994 [online] [retrieved on May 28, 2013] URL: http://www.billbuxton.com/2Hnavigation.html, pp. 103-108.
USPTO Notice of Allowance dated Mar. 20, 2012 issued in U.S. Appl. No. 12/724,413 filed Mar. 15, 2010.
USPTO Notice of Allowance dated Jan. 10, 2008 issued in U.S. Appl. No. 10/683,914 filed Oct. 10, 2003.
USPTO Notice of Allowance dated Nov. 9, 2012 issued in U.S. Appl. No. 12/502,230 filed Jul. 13, 2009.
USPTO Notice of Allowance dated Mar. 12, 2012 issued in U.S. Appl. No. 12/511,930 filed Jul. 29, 2009.
USPTO Notice of Allowance dated May 16, 2013 issued in U.S. Appl. No. 13/441,842 filed Apr. 7, 2012.
USPTO Notice of Allowance dated May 24, 2013 issued in U.S. Appl. No. 13/442,815 filed Apr. 9, 2012.
USPTO Notice of Allowance dated Dec. 24, 2002 issued in U.S. Appl. No. 09/812,870 filed Mar. 19, 2001.
Otsu's method, [online] [retrieved on Jun. 26, 2013] URL: http://en.wikipedia.org/wiki/Otsu_method, Sep. 13, 2010, 2 pgs.
Principal component analysis, [online] [retrieved on Jun. 26, 2013] URL: http://en.wikipedia.org/wiki/Principal_component_analysis, Feb. 25, 2011, 9 pgs.
USPTO Notice of Allowance dated May 30, 2013 issued in U.S. Appl. No. 13/442,806 filed Apr. 9, 2012.
DIY Touchscreen Analysis, MOTO, [online] [retrieved on May 12, 2013] URL: http://labs.moto.com/diy-touchscreen-analysis/, Jul. 15, 2010, 23 pgs.
Wilson, T.V., How the iPhone Works, howstuffworks, [online] [retrieved on May 12, 2013] URL: http://electronics.howstuffworks.com/iphone2.htm, Jan. 8, 2011, 11 pgs.
Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.
Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.
Roberts Cross, [online] [retrieved on May 12, 2013] URL: http://en.wikipedia.org/wiki/Roberts_Cross, Jul. 20, 2010, visited Feb. 28, 2011, 3 pgs.
Sobel Operator, [online] [retrieved on May 12, 2013] URL: http://en.wikipedia.org/wiki/Sobel_operator, Mar. 12, 2010, visited Feb. 28, 2011, 5 pgs.
Prewitt, [online] [retrieved on May 12, 2013] URL: http://en.wikipedia.org/wiki/Prewitt, Mar. 15, 2010, visited Feb. 28, 2011, 2 pgs.
Coefficient of variation, [online] [retrieved on May 12, 2013] URL: http://en.wikipedia.org/wiki/Coefficient_of_variation, Feb. 15, 2010, visited Feb. 28, 2011, 2 pgs.
Canny edge detector, [online] [retrieved on May 12, 2013] http://en.wikipedia.org/wiki/Canny_edge_detector, Mar. 5, 2010, 4 pgs.
Polynomial regression, [online] [retrieved on May 12, 2013] URL: http://en.wikipedia.org/wiki/Polynomial_regression, Jul. 24, 2010, 4 pgs.
Pilu,M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPn-PmNDl1MDlxZGUtNGZhZi00NzJhLWFhZDMtNTJmYmRi-MWYyMjBh&authkey=CPeVx4wO&hl=en.
Osian, M., et al., Fitting Superellipses to Incomplete Contours, IEEE Computer Society Conference on Computer Vision and Pattern Recognition Workshops (CVPRW '04), Jun. 2004, 8 pgs.
Hough transform, [online] [retrieved on Feb. 13, 2010] URL: http://en.wikipedia.org/wiki/Hough_transform, Feb. 13, 2010, 7 pgs.
Tactile Pressure Measurement, Pressure Mapping Systems, and Force Sensors and Measurement Systems, [online] [retrieved on Aug. 6, 2013] URL: http://www.tekscan.com, 2 pgs.
Tactile Surface Pressure and Force Sensors,Sensor Products LLC, Oct. 26, 2006, [online] [retrieved on Aug. 6, 2013] URL: http://www.sensorprod.com, 2 pgs.
Pressure Profile Systems, Jan. 29, 2011, [online] [retrieved on Jan. 29, 2011] URL: http://www.pressureprofile.com, 1 pg.
Xsensor Technology Corporation, Feb. 7, 2011, [online] [retrieved on May 12, 2013] URL: http://www.xsensor.com, 1 pg.
Balda AG, Feb. 26, 2011, [online] [retrieved on May 12, 2013] URL: http://www.balda.de, 1 pg.
Cypress Semiconductor, Feb. 28, 2011, [online] [retrieved on May 12, 2013] URL: http://www.cypress.com, 1 pg.
Synaptics, Jan. 28, 2011, [online] [retrieved on May 12, 2013] URL: http://www.synaptics.com, 1 pg.
Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.
Davis, R. C., et al., NotePals: Lightweight Note Taking by the Group, for the Group, University of California, Berkeley, Computer Science Division, 1998, 8 pgs.
Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.
Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.
Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.
Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.
Moyle, M., et al. 'A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.
Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&lpg=PA361&dq=fingerprint+minutiae, 2 pgs.

(56) References Cited

OTHER PUBLICATIONS

VeriFinger Information, [online] [retrieved on Jun. 11, 2013] URL: http://www.fingerprint-it.com/_sol_verifinger.html, 2 pgs.

Prabhakar S., et al., Learning fingerprint minutiae location and type, Pattern Recognition 2003, 36, [online] URL: http://www.cse.msu.edu/biometrics/Publications/Fingerprint/PrabhakarJainPankanti_MinaLocType_PR03.pdf, pp. 1847-1857.

Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.

Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.

Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.

Image moment, Jul. 12, 2010, 3 pgs, [online] [retrieved on Jun. 13, 2013] URL: http://en.wikipedia.org/wiki/Image_moment.

Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.

Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.

Igel, C., et al., Improving the Rprop Learning Algorithm, Proceedings of the Second International ICSC Symposium on Neural Computation (NC 02000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.

Bishop, C.M., Pattern Recognition and Machine Learning, Springer New York, 2006, pp. 561-593.

Euler Angles, 2011, [online] [retrieved on Jun. 30, 2011] URL: http://en.wikipedia.org/w/index.php?title=Euler_angles&oldid=436460926, 8 pgs.

Electronic Statistics Textbook, StatSoft, Inc., 2011, [online] [retrieved on Jul. 1, 2011] URL: http://www.statsoft.com/textbook, 1 pg.

Local regression, Nov. 16, 2010, [online] [retrieved on Jun. 28, 2011] URL: http://en.wikipedia.org/w/index.php?title=Local_regression&oldid=416762287.

USPTO Notice of Allowance dated Jun. 6, 2013 issued in U.S. Appl. No. 13/846,830 filed Mar. 18, 2013.

Hernandez-Leon, R., et al., Classifying using Specific Rules with High Confidence, 9th Mexican International Conference on Artificial Intelligence, IEEE, Nov. 2010, pp. 75-80.

Fang, Y., et al., Dynamics of a Winner-Take-All Neural Network, Neural Networks, 9(7), Oct. 1996, pp. 1141-1154.

\* cited by examiner

|   | Unmodified Spreadsheet | Augmented Spreadsheet | Adapted Spreadsheet Metaphor |
|---|---|---|---|
| A | Traditional Spreadsheet Functionality | | |
| B | Traditional Spreadsheet Plots to Visualize Data | | |
| C | | Visual Calculation Flow within Spreadsheet | |
| D | | Semantic Classification of Spreadsheet Data | |
| E | | Separate Visualization using Spreadsheet Data | |
| F | | | Visualization Frames in Spreadsheet Layout |
| G | | Separate Visualization insert in Spreadsheet cells | |
| H | | 3D Graphics imposed atop Spreadsheet Plane | |
| I | | Modulate of Attributes within Spreadsheet | |

FIG. 1

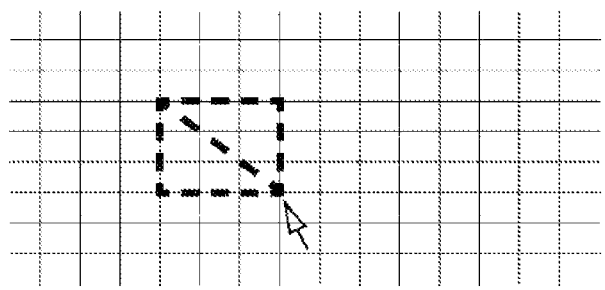
FIG. 11A                    FIG. 11B
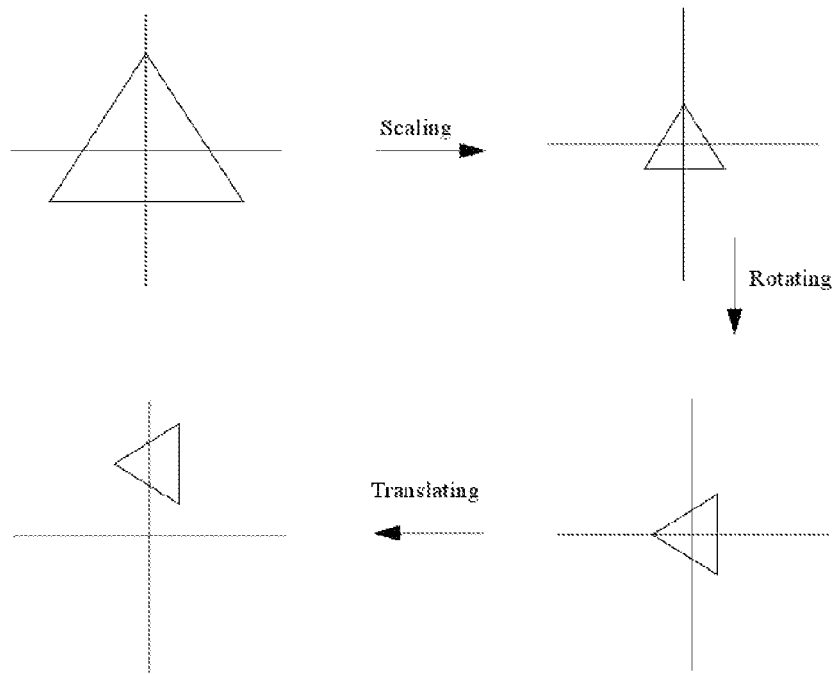
FIG. 12A

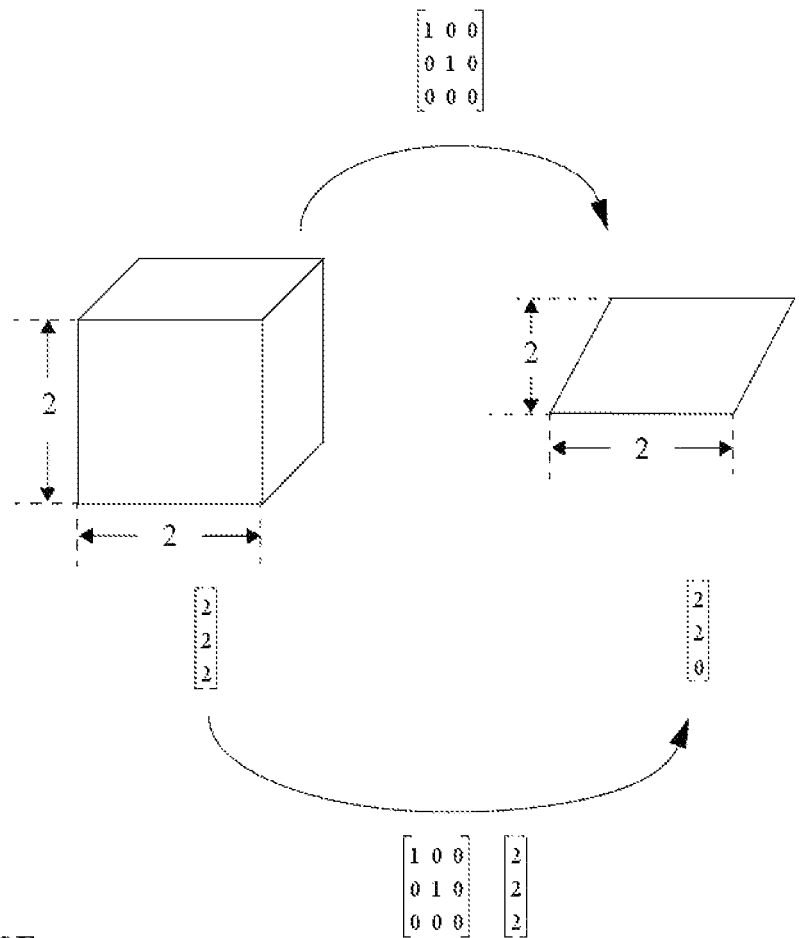
FIG. 12E
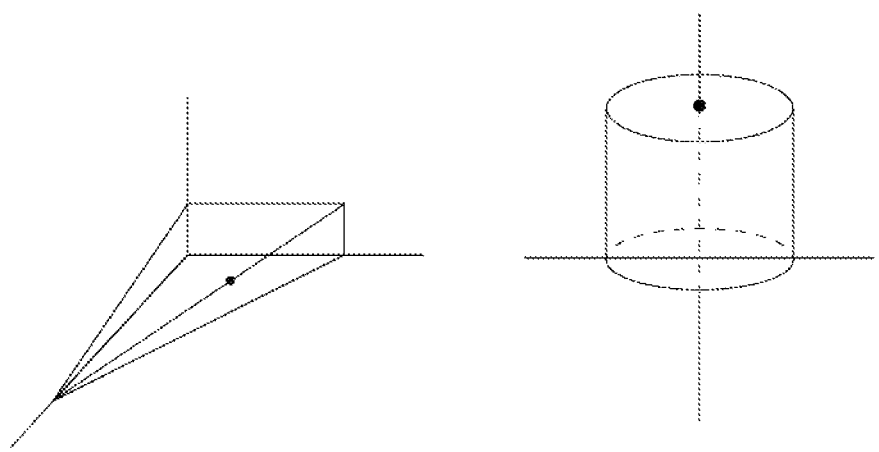
FIG. 12G  FIG. 12F

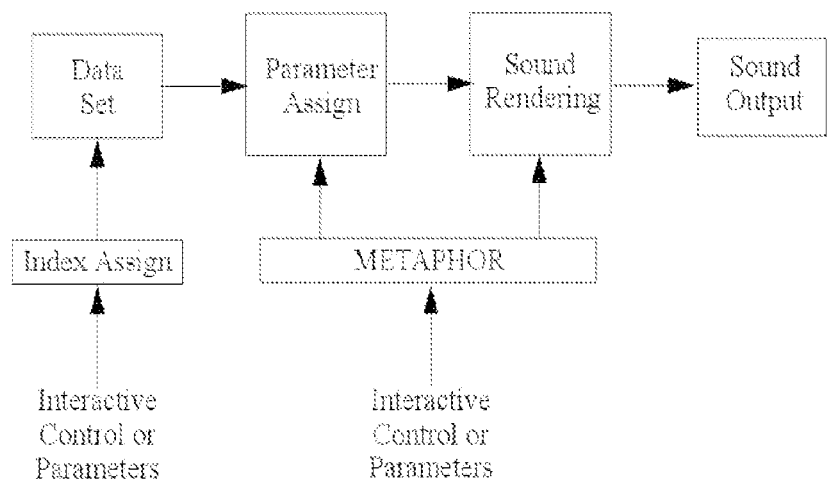
FIG. 31
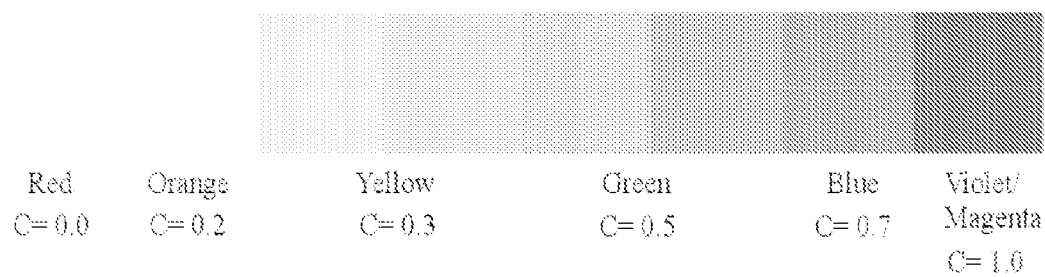
FIG. 32
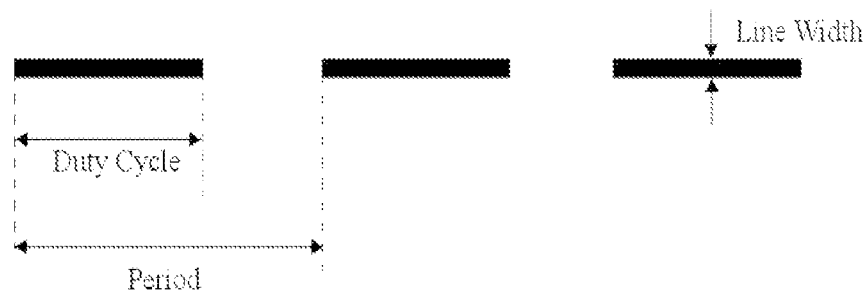
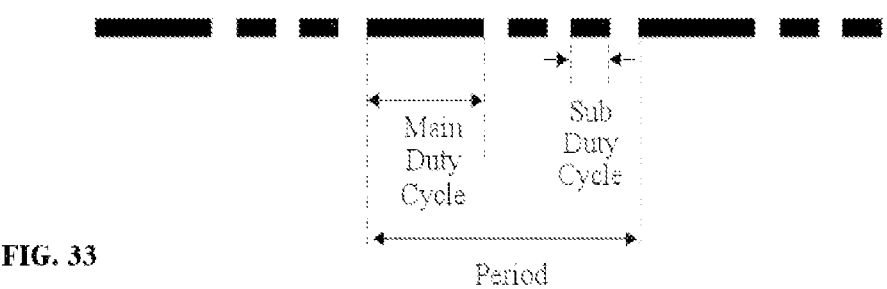
FIG. 33

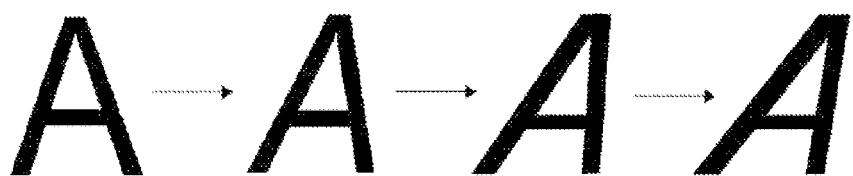
FIG. 36B
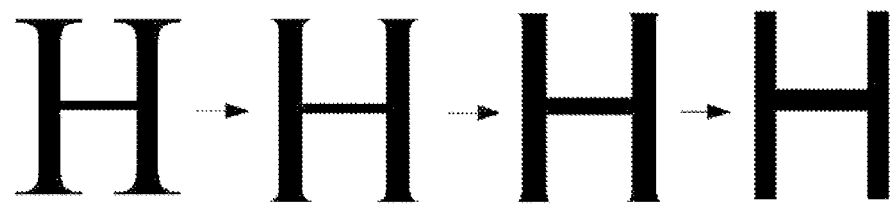
FIG. 36C
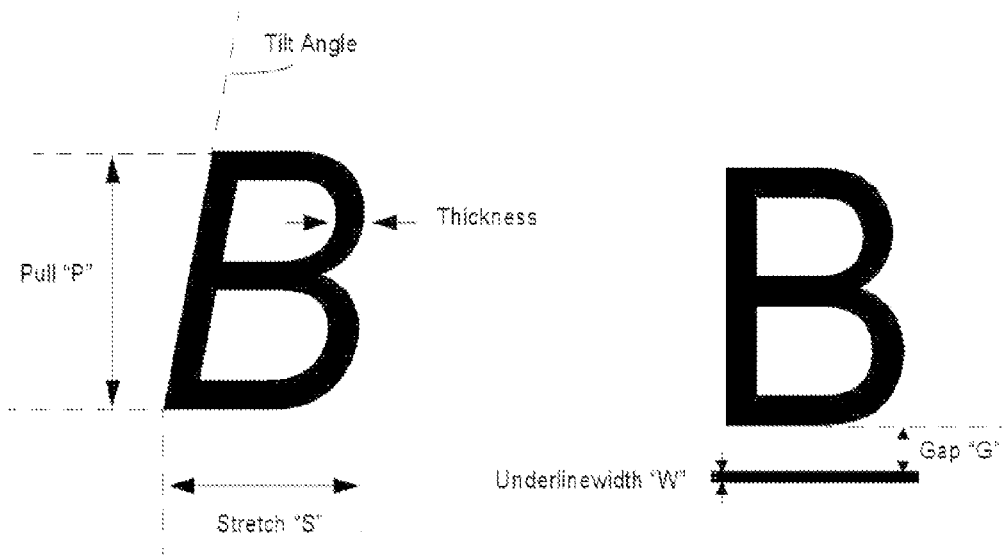
FIG. 37A          FIG. 37B

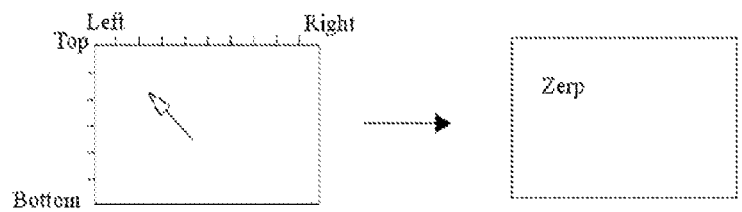
FIG. 46
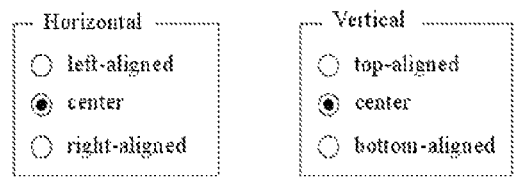
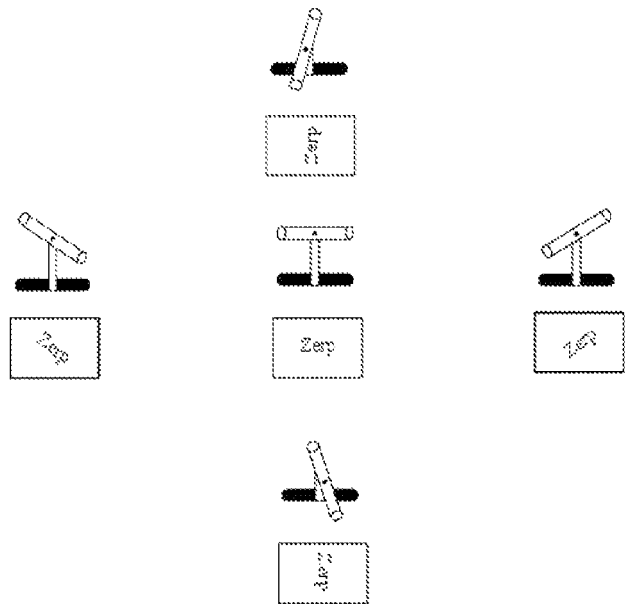
FIG. 47
| BF | Bakersfield | 315K | 29% |
| FN | Fresno | 470K | 16% |
| LA | Los Angeles | 2,834K | 4% |
| SF | San Francisco | 765K | (2)% |
| YC | Yuba City | 50K | 20% |
FIG. 48

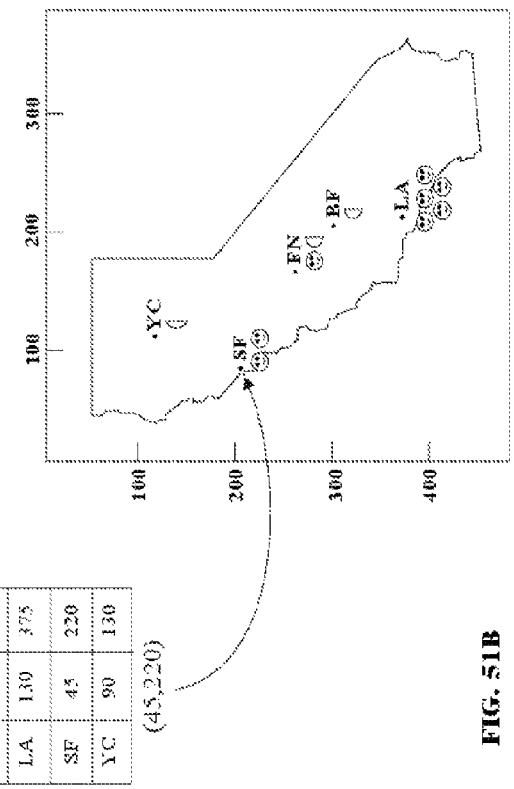
FIG. 51B
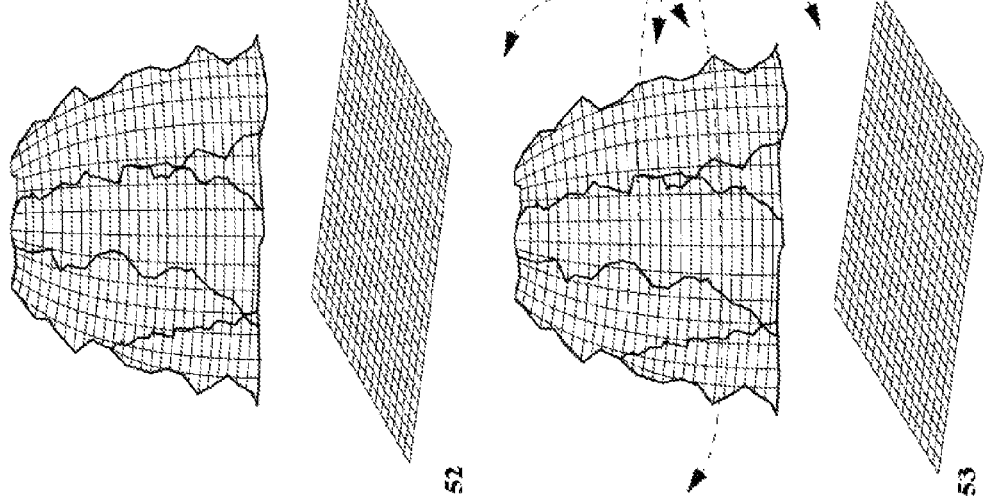
FIG. 52
FIG. 53

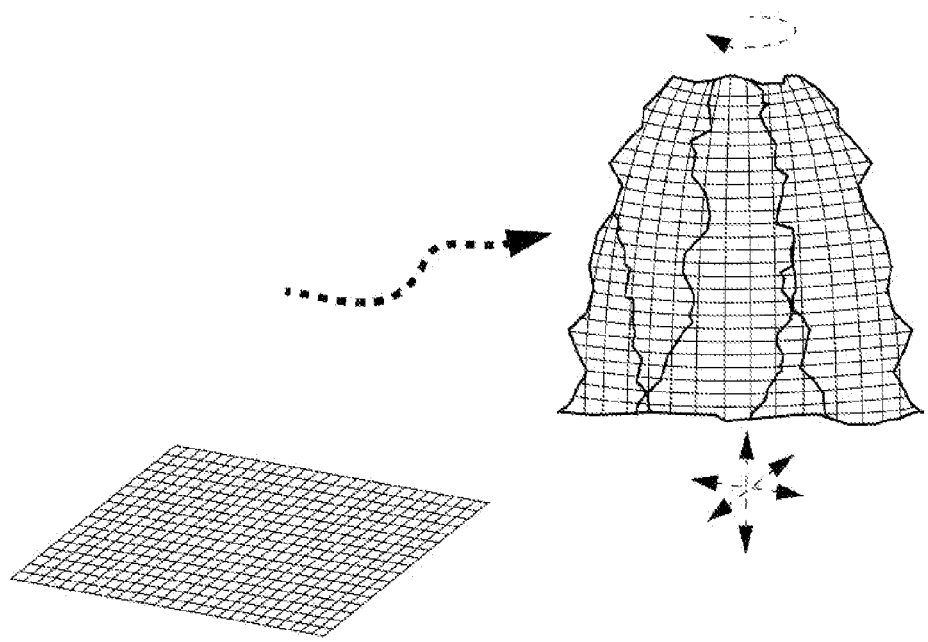
FIG. 54
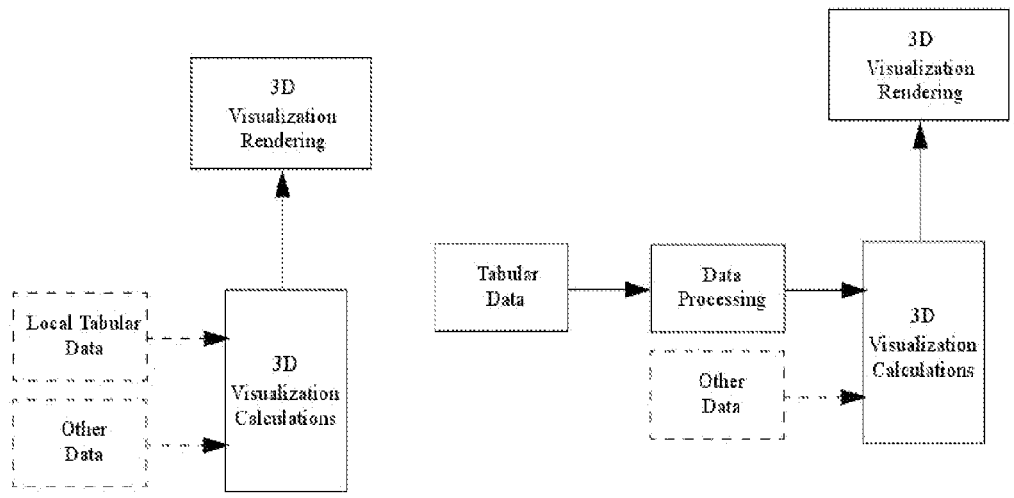
FIG. 55A  FIG. 55B

SURFACE-SURFACE GRAPHICAL INTERSECTION TOOLS AND PRIMITIVES FOR DATA VISUALIZATION, TABULAR DATA, AND ADVANCED SPREADSHEETS

CROSS-REFERENCE TO RELATED APPLICATIONS

This application is a continuation of application Ser. No. 12/875,115 filed on Sep. 2, 2010, the contents of which are incorporated by reference, which claims benefit of priority of U.S. Provisional Application No. 61/239,349 filed on Sep. 2, 2009, incorporated herein by reference.

BACKGROUND OF THE INVENTION

1. Field of the Invention

The invention relates to data visualization and in particular its implementation by and application to conventional spreadsheets and displays of tabular data.

2. Background of the Invention

Interactive electronic spreadsheets such as the 1979 VisiCalc numerical spreadsheet (http://www.danbricklin.com/visicalc.htm), Supercalc numerical spreadsheet (1980), Microsoft Multiplan™ 91982), Lotus 1-2-3™ (1983), the AppleWorks™ spreadsheet module (1984), Microsoft Exce™ (1985), OpenOffice.org™ Calc, Google's Google Spreadsheets, etc., present a tabular presentation of data and calculation formula flow in arrangements that have proven to be very useful for data analysis. Interactive electronic spreadsheets typically include plotting routines that create graphical representation of selected data points. These plots can be used to provide visual representations of data and mathematical functions. In a sense, these interactive electronic spreadsheet functions provide a form of data visualization based on data in the interactive electronic spreadsheet.

Further, interactive electronic spreadsheets present numerical, textual, and symbolic data to be presented in a tabular array of cells, with the numerical, textual, and symbolic data within the cells provided in various font styles and colors, and with various background colors and border styles of the associated cell. Using interactive electronic spreadsheet functions known as "conditional formatting" these font styles and colors, cell background colors, and cell border styles can be controlled by values of data according to hand-specified conditional tests performed on data within one or more specified cells. Such hand-specified conditional tests are entered through interactive electronic spreadsheet GUIs (Graphical User Interfaces), VBA (Visual Basic for Applications), APIs (Application programmer interfaces), etc. These interactive electronic spreadsheet functions provide another form of data visualization based on data in the interactive electronic spreadsheet.

These visual data representation successes of the interactive electronic spreadsheet paradigm suggest additional opportunities for providing and combining additional data visualization capabilities with the well-established functionality and embedded deployment of interactive electronic spreadsheet software. The present invention provides several such additional data visualization capabilities to traditional interactive electronic spreadsheets. The visual effects provided by the invention can be automatically varied over a range responsive to values of data or formulas according to mathematical functions rather than conditional tests found in interactive electronic spreadsheet products.

Unlike the logical-test structure inherent in "conditional formatting", the invention provides for use of numerical values directly from tabular data or as calculated by hidden mathematical function, compositions of mathematical functions, or traditional spreadsheet formulas to easily provide rich detailed control of useful parameterized visual effects rendered in the context of conventional interactive electronic spreadsheet and tabular data display.

The visual effects can include variation of background color or texture or border color, thickness, grouping scope of cells enveloping characters conveying data, as well as font color, type, embellishment, size, format, location, decimal places, or supplemental symbols symbolic or image element rendered within the cell of characters conveying data. Additionally, the invention provides for data-driven 3D plots rendered in the context of or projection from interactive electronic spreadsheet or tabular data. The invention provides for these visualization operations to be generated by an algorithm directly or indirectly in communication with data or parts of a program rendering an interactive electronic spreadsheet or visually displayed data table. The invention also provides for various optional additional functions, for example:

Data-driven automatic "live" sorting of rows and columns;
Incorporation of externally-provided stored data and live data feeds;
Real-time response to live input data, interactive data entry, or visualization manipulation via interactive user interfaces;
Collaboration capabilities;
Web-access capabilities;
Meaningful data sonification capabilities, including those involving multichannel timbre modulation.

Because many aspects of the invention are described in terms of, or pertain to interactive electronic spreadsheet programs, the shorthand "spreadsheet" will be understood to mean interactive electronic spreadsheet programs.

SUMMARY OF THE INVENTION

The invention provides for a method to visually enhance the display of tabular data of an electronic spreadsheet comprising cells arranged in rows and columns. At least one data value is used to compute at least one visual parameter, and each visual parameter is a number within a range of numbers and is determined according to a numerically calculated mathematical function. A visual effect of the at least one data value is controlled according to the at least one visual parameter, and the visual effect is applied to the display of the at least one data value to visually enhance the display of tabular data of the electronic spreadsheet.

Various aspects and features of the invention are described below. These aspects and features may be found either singly or in combination in the invention, and the descriptions of the various aspects and features are intended to be illustrative and not to limit the scope of the invention.

The visual effects can be automatically varied over a range responsive to data values or formulas according to mathematical functions rather than conditional tests found in interactive electronic spreadsheet products. The visual parameters of a data or cell presentation attribute may be varied over a pre-defined range (for example, between 0 and 1, between 0 and 100, between −1 and +1, etc).

Various attributes of the font in which the tabular data is displayed can be controlled. For example, one or more of the font color, the font type or style, font embellishments, and the font size may be controlled by the visual parameters. If the tabular data is numeric data, one or more of the number format, the number of decimal places, and the method and degree of rounding may also be controlled by the visual parameters.

The background of the cell in which tabular data is displayed may also be visually enhanced by the visual parameters. For example, one or more of the background color and background texture may be controlled by the visual parameters.

Further, one or more of border color and border line thickness may be controlled by the visual parameters. The border may enclose a single spreadsheet cell displaying tabular data or may enclose a plurality of contiguous cells displaying tabular data.

According to the visual parameters, a symbol may be appended to the displayed tabular data, or an image or a data symbol may be independently displayed instead of the tabular data in a spreadsheet cell.

While each of the above aspects and features of the invention may be applied to individual spreadsheet cells, these aspects and features may be applied to rows and columns containing tabular data.

Other aspects and features of the invention include:
visual parameters are generated by an algorithm in communication with the spreadsheet program, or from stored data;
storage and recall of sessions.
the support of data-driven automatic "live" rows and columns sorting;
live data feeds;
externally provided data;
data sonification;
web access;
collaboration with other users;
3D capabilities; and
at least one user interface that providing the selection of function blocks and the general connectivity among them to be specified using a drawing tool and a palette of function blocks, wherein clicking on each function blocks would cause dialog windows to be displayed for setting parameters by means of typed-in values, sliders, mouse manipulation, or advanced high-dimension user interface devices.

BRIEF DESCRIPTION OF THE DRAWINGS

The above and other aspects, features and advantages of the present invention will become more apparent upon consideration of the following description of preferred embodiments taken in conjunction with the accompanying drawing figures. The accompanying figures are examples of the various aspects and features of the present invention and are not limiting either individually or in combination.

FIG. 1 provides a demography of ways in which data visualization and spreadsheets can be integrated together.

FIG. 11A illustrates a user interface that permits users to select the geometric element boundary of a captured or rendered tabular matrix of tabular matrix data elements or cells within a spreadsheet. FIG. 11B illustrates a user interface that permits users to select array operations to be performed.

FIGS. 12A-12G depict transformations of graphics objects via array operations as provided for by the invention.

FIG. 27 depicts an arrangement wherein the HDTP or alternatives such as advanced mice can interface with browser-based applications via a browser plug-in.

FIG. 31 illustrates a general framework for data sonification wherein a parameterized metaphor is used to manage parameter assignment and sound rendering and a parameterized data indexing operation.

FIG. 32 depicts an arrangement wherein the hue of a color can be varied through natural colors of red through violet for the bulk of the [0,1] range and a range of artificial colors, such as the purple through magenta continuum, are appended for the remaining portion of the [0,1] range.

FIG. 33 illustrates an arrangement wherein line width, line dashing period, line dashing duty-cycle, and line dashing sub-duty-cycle can be determined by a uniform parameter in the range of [0,1].

FIG. 36B depicts an arrangement wherein an italics angle parameter is under the control of uniform parameters in the range of [0,1]. FIG. 36C depicts an arrangement wherein an font family interpolation parameter is under the control of uniform parameters in the range of [0,1].

FIG. 37A depicts an arrangement wherein exemplary vertical and horizontal dilation/contract parameters are each respectively under the control of uniform parameters in the range of [0,1]. FIG. 37B depicts an arrangement wherein font underline line width and font underline separation gap parameters are each respectively under the control of uniform parameters in the range of [0,1].

FIG. 46 depicts an interface that can be used to specify the position of text being displayed in a cell.

FIG. 47 depicts an interface that can be used to specify the rotation of text being displayed combined with the vertical or horizontal placement of the text.

FIG. 48 depicts a visualization wherein an attribute of a column area of data elements is varied as a group.

FIG. 51B illustrates the visualization of FIG. 51A augmented with additional spatially located symbols or parameterized glyphs.

FIG. 52 depicts a 2D-surface representing a 3D data plot of at least 3-dimensional data rendered above a planar array of associated tabular data or spreadsheet, these separated by a vertical gap within a 3D visual field as provided for by the invention.

FIG. 53 depicts with dashed lines a few ways in which the observation viewpoint can be moved with respect to these abstract objects.

FIG. 54 depicts a translation and rotation of an exemplary 3D data plot within the 3D visual field.

FIG. 55A depicts an arrangement wherein data plotted in a 2D-surface representing a 3D data plot within the 3D visual field can directly echo data displayed in a planar array of associated tabular data or spreadsheet and/or can originate from another set of tabular data or spreadsheet region and/or can originate from other data.

FIG. 55B depicts an arrangement wherein processing of data via mathematical transformations, statistical processing, signal processing, etc. is made prior to creation of the 2D-surface representing at least 3-dimensional data.

DETAILED DESCRIPTION

Figures 2A, 2B:
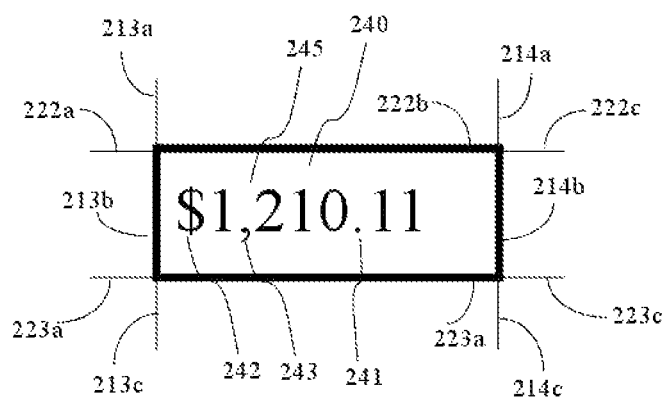
FIG. 2A depicts a region of a spreadsheet or table of tabular data.
FIG. 2B depicts a cell and its immediate neighborhood within a spreadsheet or table of tabular data.

In the following description, reference is made to the accompanying drawing figures which form a part hereof, and which show by way of illustration specific embodiments of the invention. It is to be understood by those of ordinary skill in this technological field that other embodiments can be utilized, and structural, electrical, as well as procedural changes can be made without departing from the scope of the present invention. The aspects and features described herein may be used singly or in combination unless specifically stated otherwise.

The visual data representation successes of spreadsheets suggest additional opportunities for providing and combining additional data visualization capabilities with the well-established functionality and embedded deployment of spreadsheet software. FIG. 1 provides an example of ways in which data visualization and spreadsheets can be integrated. The present invention provides several additional data visualization capabilities to traditional spreadsheets.

First, traditional spreadsheets present data in a tabular form leveraging row, column, and sheet organization. Traditional spreadsheets typically include plotting routines that create graphical representation of selected data points. These plots can be used to provide visual representations of data and mathematical functions. These spreadsheet functions provide a base-level form of data visualization based on data in the spreadsheet, as represented in rows A and B of FIG. 1.

Additional subsequent work has been done to employ data visualization characterizing internals of spreadsheet structure such as information flow, cell formula dependences, and semantic classification. These do not provide visualization of data per se, but can be very useful in understanding the data handling of a given spreadsheet. This is represented in rows C and D of FIG. 1.

Further subsequent work has been done to supplement basic spreadsheet plotting utilities providing richer data plotting capabilities (for example, utilizing 3D graphics). These capabilities enhance the possible data visualization based on data in the spreadsheet. This is represented in row E of FIG. 1.

Yet other subsequent work has been done adopting the interactive format and metaphor of a spreadsheet for use in a tabular presentation of complex data visualization renderings. This is represented in row F of FIG. 1. One aspect of the invention focuses on adapting and significantly expanding this capability. This is represented in row G of FIG. 1.

Still other subsequent work has been done superimposing a third (height) dimension atop the 2-dimensional tabular data layout of an interactive electronic spreadsheet. The third dimension can be used to render color-coded line and surface plots, and the resulting 3D graphics can be viewed from various virtual observation points for inspection. This is represented in row H of FIG. 1. Another aspect of the invention focuses on adapting and expanding this capability.

Traditional spreadsheets also present numerical, textual, and symbolic data in a tabular array of cells, with the numerical, textual, and/or symbolic data within the cells provided in various font styles and colors, and with various background colors and border styles of the associated cell. Using spreadsheet functions known as "conditional formatting" these font styles and colors, cell background colors, and cell border styles can be controlled by values of data according to hand-specified (through spreadsheet GUI, VBA, APIs, etc.) conditional tests performed on data within one or more specified cells. These spreadsheet functions provide another form of data visualization based on data in the spreadsheet. One aspect of the invention focuses on adapting and expanding this capability. This is represented in row I of FIG. 1.

FIG. 2A illustrates a region 200 of a traditional spreadsheet or table of tabular data. Such spreadsheet or tabular data can be created by desktop applications such as Microsoft Excel or online applications such as Google Spreadsheet. Aspects of the present invention can be implemented via an add-on package of existing software or additional plug-in script on any online applications. The minimum block that makes up this whole region is referred to as a cell, and cells can be merged to compose a cell with bigger area expanding multiple rows, columns, or both. Region 200 of an example spreadsheet contains four columns 281-284 and five rows 291-295. Cell 230 is confined within one row 293 and on column 283 and accordingly is defined by a left border 213, a right border 214, an upper border 222, and a lower border 223. Each of the four columns 281-284 represents a different categorical subset of data (for example, an item, region, revenue area, inventory level, etc.). In contrast to exemplary cell 230, another exemplary cell 240 in the left-most column comprises the height of three rows 293, 294, 295.

The border of cell 230 is bolded with respect to the other cells depicted so as to call this cell out from the others. This can be rendered for any of a number of reasons, such as signifying the selection of the cell via a pointing device of a user interface, selection resulting from a query, the signifying of special status or conditions, etc. The data displayed in cell 230 is a decimal number formatted as a national financial currency and with a thousands-separating comma. In contrast, the data displayed in cell 260 is an unformatted non-decimal number without a thousands-separating comma. Also in contrast, the data displayed in cell 250 comprises a text string, while the data displayed in cell 240 comprises an alphabetic text string and an unformatted non-decimal number. In the latter, the unformatted non-decimal number can in fact be part of the preceding text string, or can be a calculated, retrieved, or can be a fixed number composed with a calculated, retrieved, or fixed text string.

In general the data displayed in the foreground of a cell can contain numbers, text, symbols, or a combination of these, and this data or portions of it can be further "emphasized" with attributes. Such attributes include choice of the font family, font size, bolding, italicizing, stretching, color, transparency with respect to the cell background, position within the cell, various types of animations (modulations of aforementioned attributes, blinking, shimmering, vibrating, rotating, etc.) Each individual font attribute can be fixed or determined by data values via conditional formatting. The data displayed in the foreground of a cell can be fixed, replicated, or result from processing of other data by (no displayed) formulas and/or functions.

FIG. 2B depicts additional detail of cell 230 and its immediate neighborhood. In order to render the bolded border of the cell, the dividing border lines 213, 214, 222, 223 of FIG. 2A can be segmented into a plurality of sections—for example dividing border line 213 of FIG. 2A can be segmented into at least adjacent sections 213*a*, 213*b*, 213*c*; similarly dividing border line 214 of FIG. 2A can be segmented into at least adjacent sections 214a, 214b, 214c, dividing border line 222 of FIG. 2A can be segmented into at least adjacent sections 222a, 222b, 222c, and dividing border line 223 of FIG. 2A can be segmented into at least adjacent sections 223a, 223b, 223c. The exemplary cell 230 is visually defined as the geometric area enclosed by upper, lower, left, and right dividing border lines 213b, 214b, 222b, and 223b—these border line sections can be accented via thickening, darkening, coloring, etc. so as to visually contrast with the other sections 213a, 213c, 214b, 214c, 222a, 222c, 223a, 223c. Such border line section accenting can be fixed or determined by data values via conditional formatting.

The background 245 of each cell can be used to display a background color, shading pattern, image, etc. which can be fixed or determined by data values via conditional formatting. The background can vary from cell to cell.

The displayed data in this particular case is, again, a decimal 241 number formatted as a national financial currency via a signifying currency symbol 242 and further employing a thousands-separating comma 243.

Figure 3:
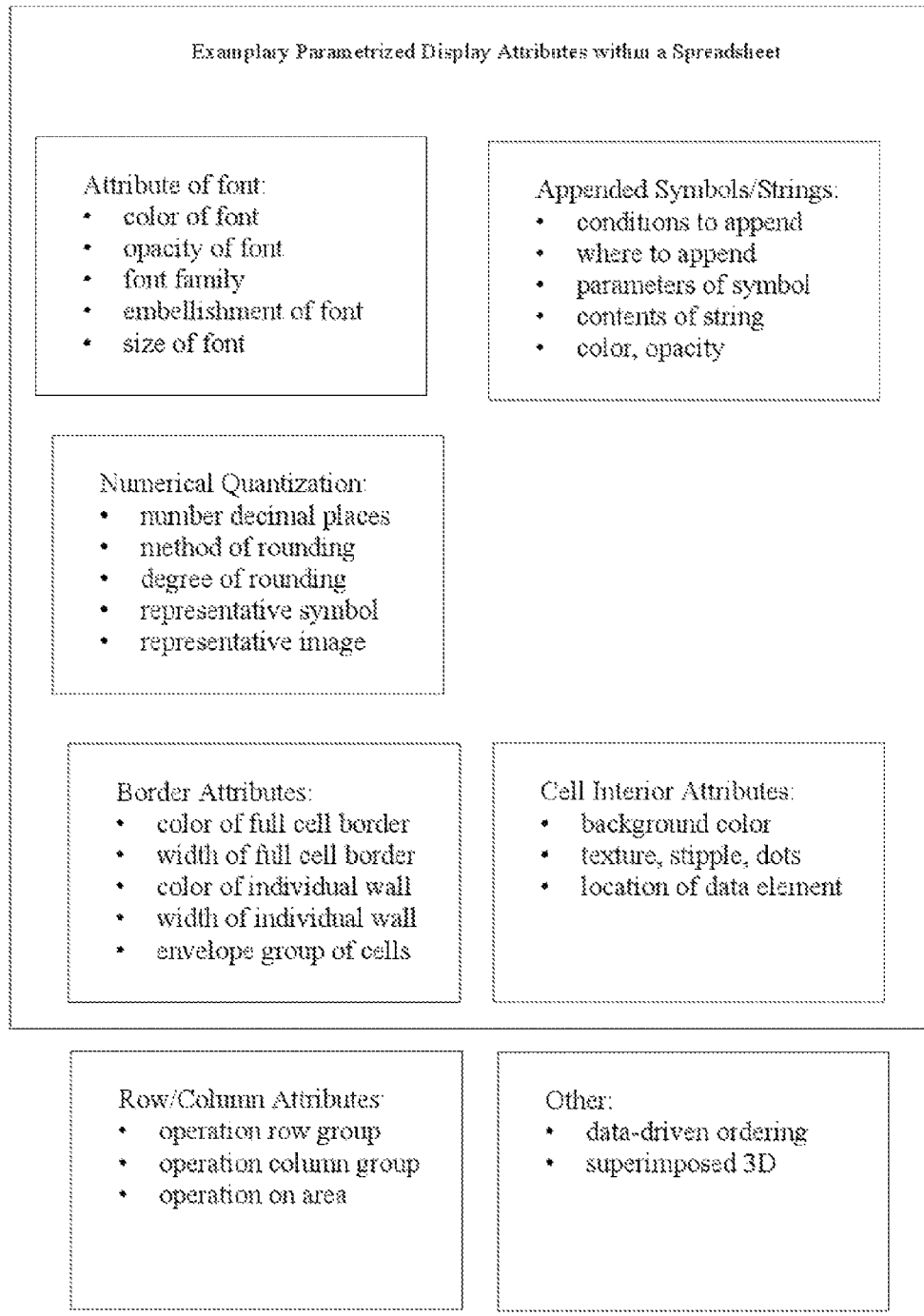
FIG. 3 depicts of data and cell presentation attributes serving as candidates for visualization parameters within a spreadsheet display.

FIG. 3 depicts of data and cell presentation attributes serving as candidates for visualization parameters within a spreadsheet display. Some of these attributes can be controllable under conditional formatting in traditional spreadsheets while others may not be controllable under conditional formatting in traditional spreadsheets. In one aspect of the invention, a data or cell presentation attribute provided a pre-defined range of variability and is controlled by a parameter that can vary over a pre-defined range (for example, between 0 and 1, between 0 and 100, between −1 and +1, etc). This parameter-controlled variability of a data or cell presentation attribute allows that presentation attribute to be used as a visualization parameter.

For those data and cell presentation attributes that have been controllable under conditional formatting in traditional spreadsheets, the parameter-controlled variability provided for by the invention is fundamentally different in a number of ways. A few of these include:
  Conditional formatting provides a particular custom-specified result for satisfaction of a custom-specified rule;
  For each individual result desired, a corresponding hand-specified rule must be entered; for example in order to span 64 color steps, 64 hand-specified rules must be hand-entered;
  In the case of colors, shades, fonts, stipples, etc., conditional formatting provided (or extended by VBA, APIs, etc.) in traditional spreadsheets offers only a small discrete set of choices. In the case of colors, Microsoft Excel for example provides a fixed pre-selected collection of 56 colors, some of which are duplicates. Even if Microsoft Excel provided 64 colors, this would only permit 4 steps per primary color in an RGB color model or a very limited color wheel in a HSB color model. Additionally, the fixed collection of pre-selected colors will always have a significant portion of colors that will be unusable as foreground or background colors as they will not be able to visibly stand out, respectively, against a corresponding range of background or foreground colors. Thus there are typically considerably less than the full collection of pre-selected colors to work with in a given color-control data presentation visualization if numeric or text information is co-displayed.
Clearly the present invention provides a far superior approach with greater capability, practicality, and ease of use.

Among other capabilities, the invention provides new visualization capabilities to spreadsheet presentation, spreadsheet formatting, spreadsheet data handling, and spreadsheet interactive use in ways well-suited for use as a numeric-intensive data visualization tool. Many of these spreadsheet features can be implemented with simple vector graphics rendering operations or easily managed mixtures of vector and raster graphics, permitting:
  Implementation of a number of the invention's spreadsheet presentation features through use of APIs of existing spreadsheet products;
  Implementation of many of the invention's spreadsheet presentation features with relatively small augmentation and modification of existing product software by product manufacturers;
  Implementation of most of the invention's spreadsheet presentation features with well-established graphics utilities such as SVG (http://www.w3.org/TR/SVG11/) and the graphics utilities of various computer operating systems provided by companies such as Microsoft and Apple;
  Via these and/or other graphics utilities, implementation of most of the invention's spreadsheet presentation features in browser-rendered web applications, thus making the invention's spreadsheet presentation features available in a web page;
  Via web and/or other implementation approaches, implementation of the invention's presentation features in a collaborative viewing environment.

The invention provides for a value of a data element, or result of a formula calculated from one or more data elements in a spreadsheet or data table, to be used to determine spreadsheet presentation attributes, such as one or more of the following examples:
  Attributes of a Font and/or Symbol:
  the color of a font employed in rendering some data element within the spreadsheet or data table;
  the opacity of a font employed in rendering some data element within the spreadsheet or data table;
  the selection of a font employed in rendering some data element within the spreadsheet or data table;
  the embellishment of a font (bolding, italicizing, underlining, etc.) employed in rendering some data element within the spreadsheet or data table;
  the size of a font employed in rendering some data element within the spreadsheet or data table;
  Attributes of Appended Symbols:
  the condition for the addition of an appending symbol or string employed in rendering some data element within the spreadsheet or data table;
  where to append symbol or string
  color(s) of symbol or string
  opacity of symbol or string
  other parameters of the symbol or contents of string;
  Attributes of Numerical Quantization of Cell Data:
  the number of decimal places employed in rendering some data element within the spreadsheet or data table;
  the method of numerical rounding employed in rendering some data element within the spreadsheet or data table;
  the degree of numerical rounding employed in rendering some data element within the spreadsheet or data table;
  the selection of a symbolic data element rendered within the spreadsheet or data table;
  the selection of an image element rendered within the spreadsheet or data table;

Attributes of a Cell Border:
  the color of at least one border of a cell enveloping a font employed in rendering some data element within the spreadsheet or data table;
  the thickness/width of at least one border wall of a cell enveloping a font employed in rendering some data element within the spreadsheet or data table;
  the thickness/width of at least one border outlining of a plurality of contiguous cells, where each cell envelopes a font employed in rendering of data elements within the spreadsheet or data table;

Attributes of Cell Interior:
  the background color of a cell enveloping some data element within the spreadsheet or data table;
  the background texture of a cell enveloping some data element within the spreadsheet or data table;
  the location of data element within a cell enveloping that data element within the spreadsheet or data table;

Attributes of Rows & Columns:
  an attribute of a column employed in rendering a plurality of data elements within the spreadsheet or data table;
  an attribute of a row employed in rendering a plurality of data elements within the spreadsheet or data table.
  an attribute of a row-by-column area employed in rendering a plurality of data elements within the spreadsheet or data table.

The invention also provides for one or more of the following capabilities:
  reordering of tabular rows and/or columns as a function of data values;
  superimposing a third (height) dimension atop the 2-dimensional tabular data layout of an interactive electronic spreadsheet.
  adopting the interactive format and metaphor of an interactive electronic spreadsheet for use in a tabular presentation of complex data visualization renderings;

Additionally, the invention provides for the control of data and cell presentation attributes through use of a uniform parameterization framework. This allows pre-visualization operations, such as scaling, translation, filtering, array (matrix, tensor) operations, nonlinear warping, etc. to be employed in a modular, cascadable fashion independent of the particular choice of data and cell presentation attributes. The invention further provides for pre-visualization operations to themselves have parameters that can be adjusted in real time and/or be stored in files for recall. The invention further provides for a network of pre-visualization operations to be stored in files for recall.

The invention additionally provides for advanced user interface devices, particularly those providing large numbers of simultaneously-adjustable interactive control parameters, to be used to control the viewing, presentation, and creation of the visualization as well as controlling the underlying data source such as databases, statistical packages, simulations, etc.

Further, via web and other implementation approaches, the implementation of the invention's presentation features in a collaborative interactive use environment.

Figure 4A:
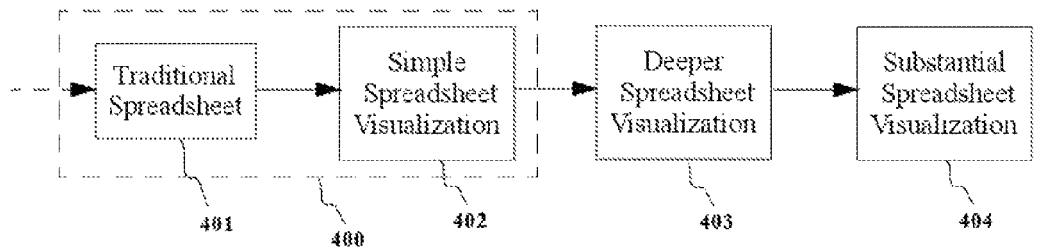
FIGS. 4A-4E illustrate several application settings where the invention is well-suited to add value.
Figure 4B:
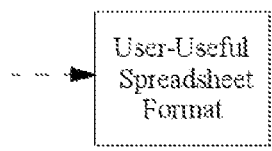
Figure 4C:
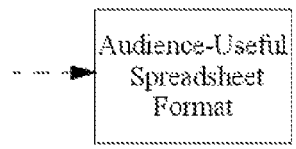
Figure 4D:
Figure 4E:

The invention thus can serve a variety of callings. FIGS. 4a-4e illustrate several example application settings where the invention is well-suited to add value. In one scenario, depicted in FIG. 4A, a spreadsheet is initially used as a tool of choice or convenience 401, and at some point some simple data visualizations are incorporated 402. Such capabilities can be within the range provided by available spreadsheet software products 400. As study of the data or development of the model intensifies, additional degrees of visualization are incorporated 403, potentially involving a need for a rich suite of visualization capabilities to create data visualization of substantial richness 404. In FIG. 4B, a spreadsheet is chosen as a vehicle or venue for visualization as it matches one dominating user needs (for example, original data already in or readily imported into a spreadsheet, quick assembly, tabular nature of data, tabular nature of formula replication, etc.). In FIG. 4C, a spreadsheet is chosen as a vehicle or venue for visualization as it is comfortable or intuitive for a particular audience. In FIG. 4D, a spreadsheet is chosen as a vehicle or venue for visualization as other aspects of the invention allow for it to be rendered in a web-based application. In FIG. 4E, a spreadsheet is chosen as a vehicle or venue for visualization as other aspects of the invention allow for it to be rendered in a collaborative context.

The spreadsheet visualization aspects of the present invention are a special case of other more general aspects of the invention including:
  the use of arbitrary or integrated data sources (such as static databases, dynamic databases, streaming databases, live sensing data streams, numerical simulations, signal processing, statistical processing, linear and nonlinear transformations, etc.);
  uniform parameterizations of selected or all visualization presentation parameters;
  the support for real-time updates to integrated data sources (such as static databases, dynamic databases, streaming databases, live sensing data streams, numerical simulations, signal processing, statistical processing, linear and nonlinear transformations, etc.);
  the use of data flow paths to link arbitrary data sources with arbitrary data destinations via arbitrary topologies (graphically, via an interconnection, specification, and/or data-flow language, etc.);
  the providing of shared GUI environments for controlling two or more of visualization rendering, pre-visualization operations, and data sources.

Figure 5:
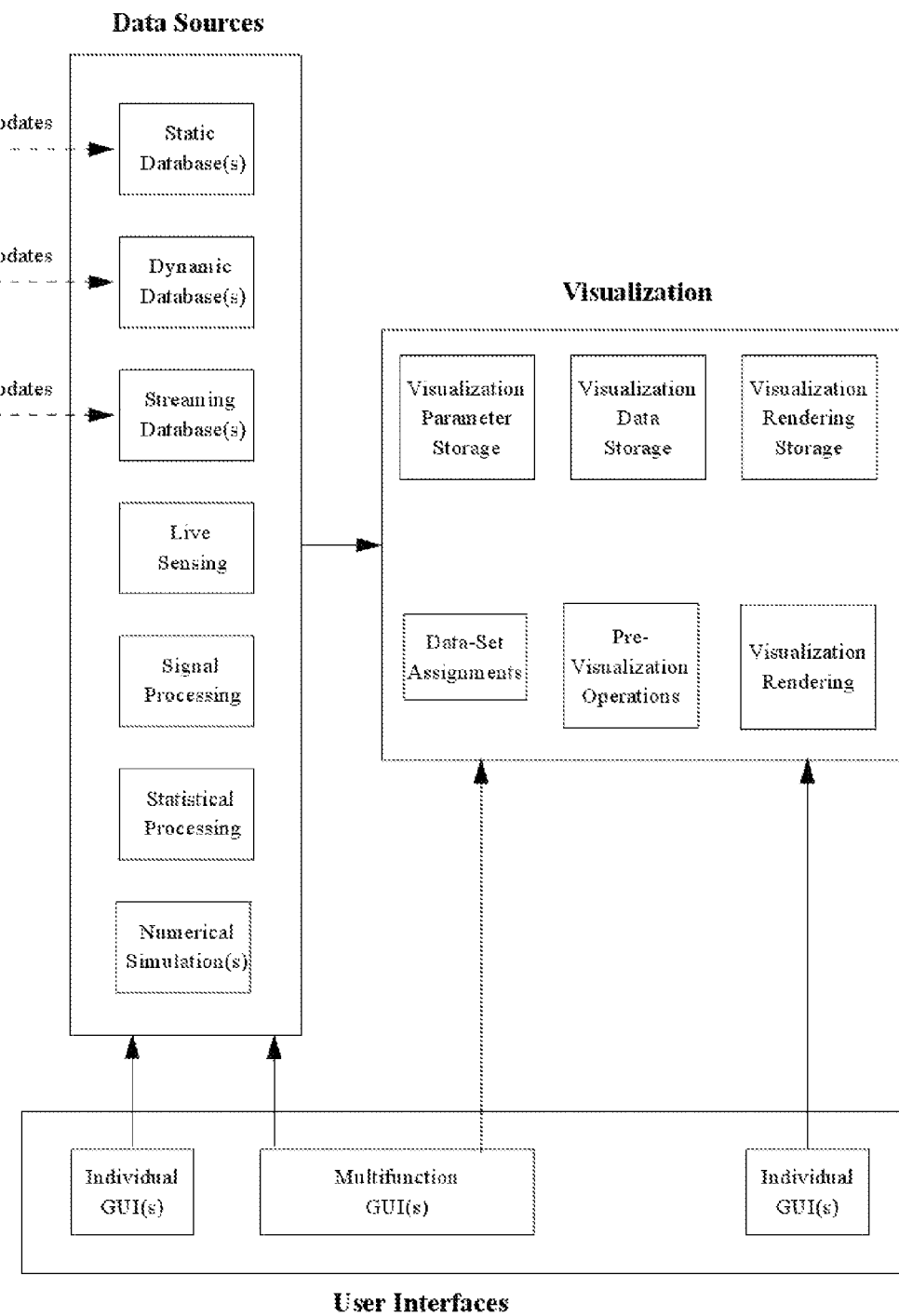
FIG. 5 illustrates an arrangement of selected more general aspects of the invention that are not restricted to spreadsheet visualization.

FIG. 5 illustrates an arrangement of these more general aspects of the invention. Implicit in FIG. 5 are more general aspects of the invention, not restricted to spreadsheet visualization, that support visual rendering in a browser window and as a web application. As shown in the figure, graphical user interfaces (GUIs) are provided for including one or more relating to data sources and one or more relating to visualization processes. Additionally, the invention also provides for multifunction GUIs that provide roles involving both data source matters and visualization processes. The overall collection of user interfaces provides the following capabilities:
  Setup of a fixed data analysis configuration;
  Setup of fixed data visualization configuration;
  Setup of fixed data visualization presentation;
  Setup of an interactive data analysis configuration;
  Setup of an interactive data analysis session;
  Setup of an interactive data visualization configuration;
  Setup of an interactive visualization session;
  Interactive control of data source selection and usage;
  Interactive control of data analysis sessions;
  Interactive control of visualization sessions;
  Storage and recall of configurations;
  Storage and recall of data;
  Storage and recall of visualizations;
  Storage and recall of sessions.

Figure 6:
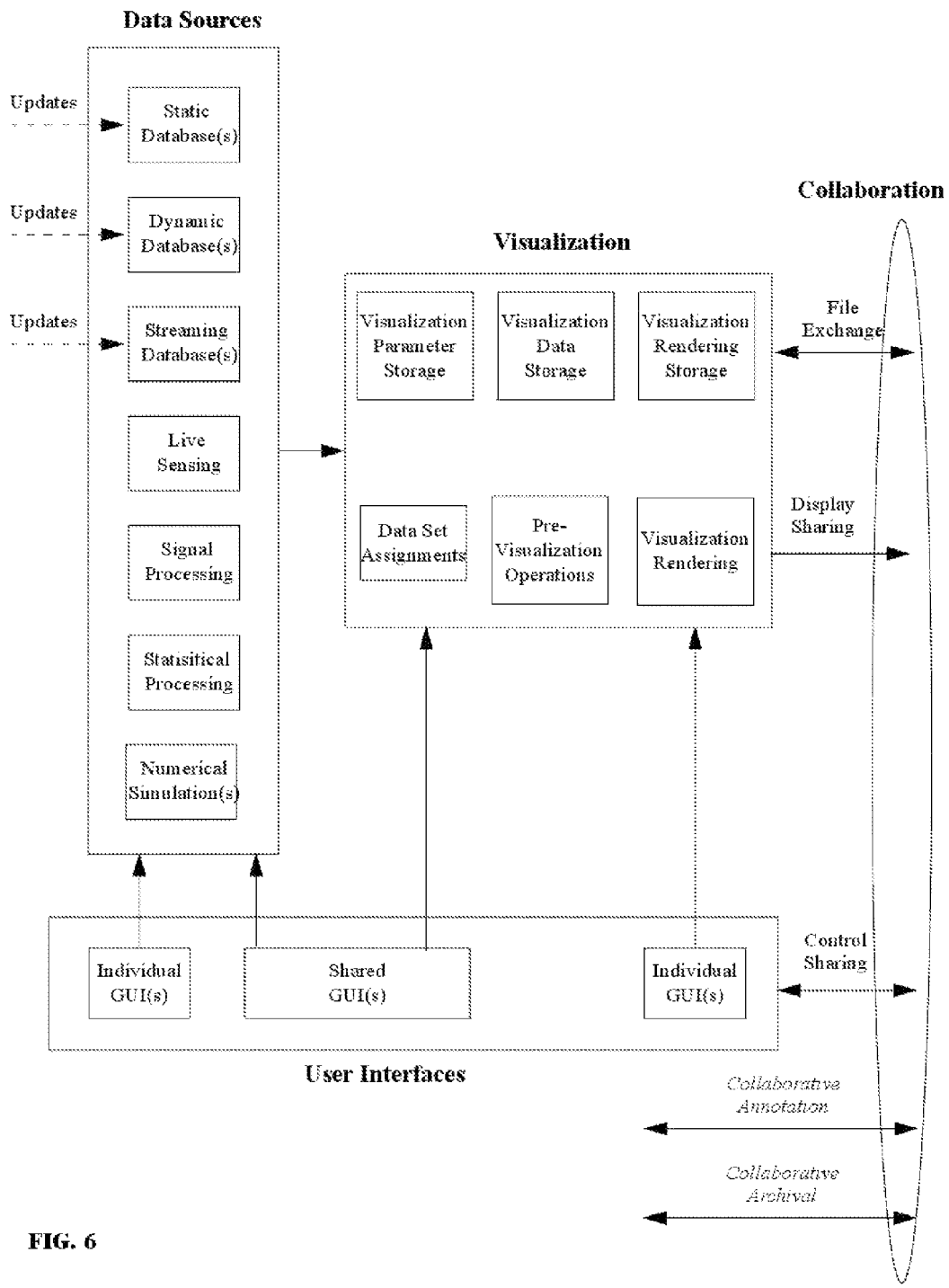
FIG. 6 illustrates an adaptation of the arrangement of FIG. 5 to an environment supporting collaboration features.

Yet additional aspects of the invention, not restricted to spreadsheet visualization, also include (real-time and non-real-time) collaboration capabilities. FIG. 6 illustrates an adaptation of the arrangement of FIG. 5 to a collaboration environment supporting collaboration features such as one or more of file exchange, real-time or stored display sharing, real-time control sharing, real-time or stored collaborative annotation, and archives of collaboration sessions and transactions.

Uniform Parameterizations of Cell and Data Presentation Attributes

The invention provides for uniform parameterizations of selected or all visualization presentation parameters. This allows pre-visualization operations, such as scaling, translation, filtering, array (matrix, tensor) operations, nonlinear warping, etc. to be employed in a modular, cascadable fashion independent of the particular choice of data and cell presentation attributes.

Data Flow Paths to Implement Arbitrary Interconnection Topologies

The invention provides for the use of data flow paths to link arbitrary data sources with arbitrary data destinations via arbitrary topologies. This allows the selection and/or fusion of data sources, their interconnection with selected signal processing, statistical processing, pre-visualization operations, and visualization parameters (such as, among other examples, the cell and data presentation parameters of the spreadsheet visualization described earlier and in more detail to follow).

Figure 7:
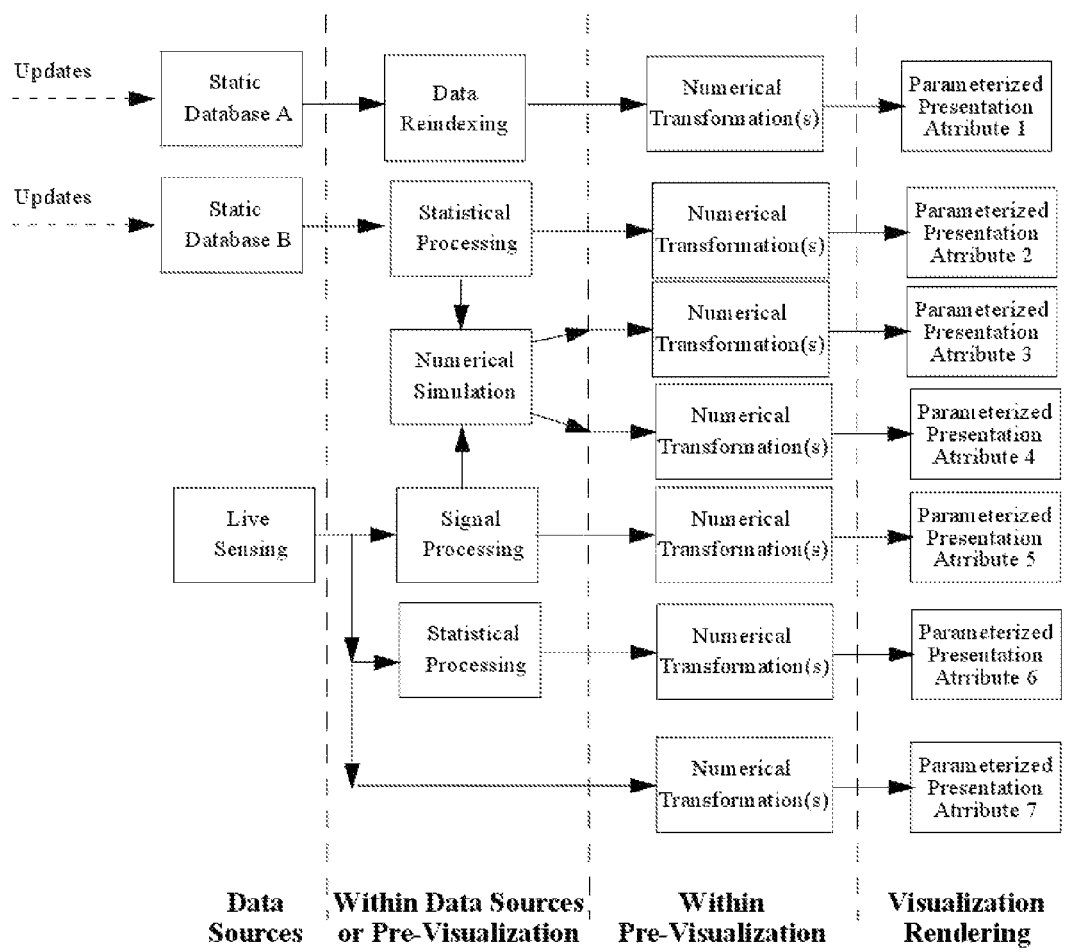
FIG. 7 depicts a topological interconnection of data flow paths linking various elements depicted in FIG. 5.

FIG. 7 depicts an exemplary topological interconnection of data flow paths linking various elements depicted in FIG. 5. In various embodiments, functions such as data re-indexing, statistical processing, and signal processing can be provided as the data sources depicted in FIG. 5 or as the pre-visualization functions depicted in FIG. 5. Similarly, numerical simulations, for example (but not limited to) those rendered by the computer running a spreadsheet program, a high-performance or other computer, can serve as the data sources depicted in FIG. 5. Certain pre-visualization functions, for example linear predictors, can in an embodiment be regarded as a numerical simulation. Additionally, in a spreadsheet visualization setting, calculations in the spreadsheet can provide a form of numerical simulation prior to visualization.

The invention provides for some or all of the data flow paths (such as depicted in the example of FIG. 7) to be specified in any convenient way, for example graphically via an interactive GUI or via a character-based language (interconnection, specification, and/or data-flow, etc.). In an exemplary embodiment, a GUI can permit the rendering of a graphic similar to that of FIG. 7. A GUI can permit creation and customization of instances of functional blocks such as the ones depicted in FIG. 7 from a library, menu, and/or graphical pallet. In an exemplary embodiment, a GUI can be used to create and link these customized instances of functional blocks, via link-by-link "drawing," with a data path topology such as the ones depicted in FIG. 7.

Various types of user interfaces may be used to create configurations such as that of FIG. 7 and set the various parameters within it. As one example approach, the selection of function blocks and the general connectivity among them can be specified using a drawing tool and a palette of function blocks, and clicking on each function block would cause dialog windows to appear that can be used for setting parameters. The parameters can be set by means of typed-in values, sliders, mouse manipulation, or the advanced high-dimension user interface devices to be described later in the specification. More generally, a wide range of approaches, styles, and forms of configuration-specification, feature-selection, and parameter-setting GUIs are known in the art. A few example user interfaces or aspects of them will be mentioned to showcase different aspects, but a comprehensive treatment of user interface approaches is not necessary for enablement as general forms of configuration specification GUIs and parameter setting GUIs are known in the art. A number of example configuration-specification, feature-selection, and parameter-setting GUIs will be the subject of a later companion patent application.

Pre-Visualization Operations

Figure 8A:
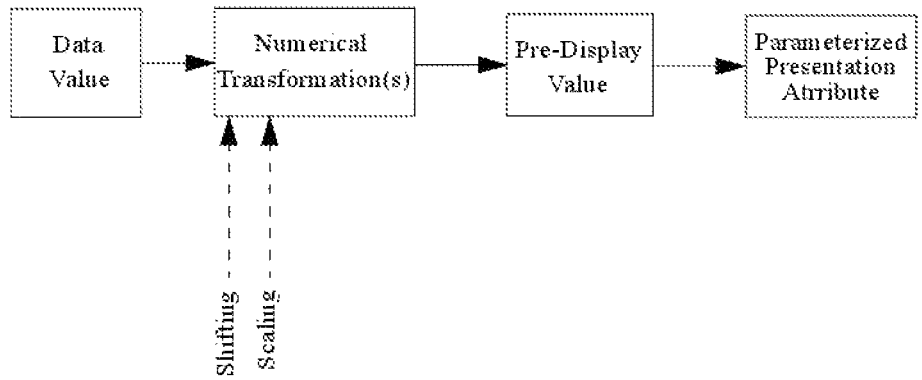
FIGS. 8A-8C depict approaches for mapping a data value lying within a pre-defined range to a value within a pre-defined range for a parameterized data or cell presentation attribute.
Figure 8B:
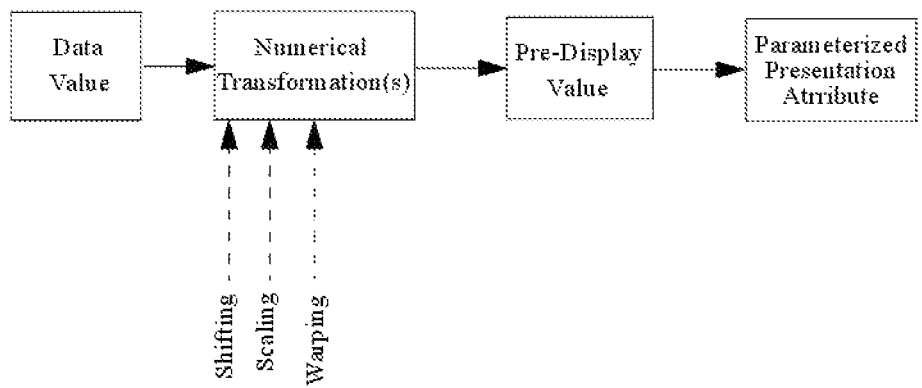
Figure 8C:
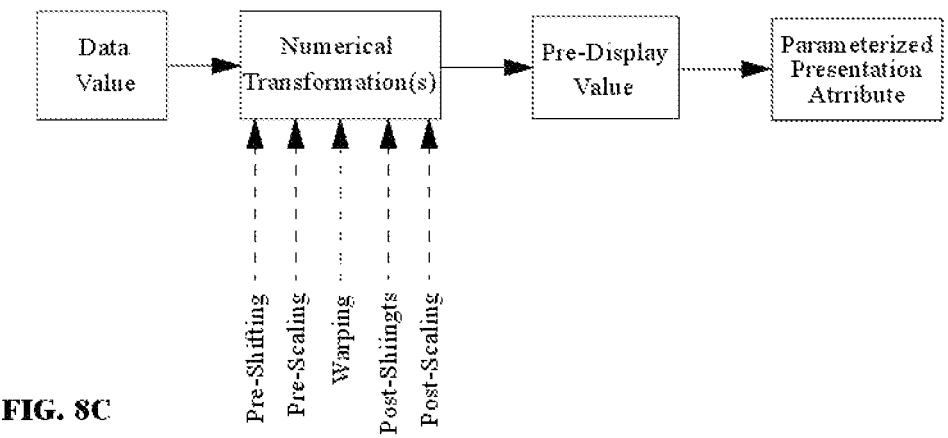

Attention is now directed to consideration of pre-visualization operations. FIGS. 8A-8C depict an approach for mapping a data value lying within a pre-defined range to a value within a pre-defined range for a parameterized data or cell presentation attribute. In most cases the input data range must be at least scaled and shifted to match the pre-defined range for a parameterized presentation attribute. This (linear or affine transformation) arrangement is depicted in FIG. 8A. In some circumstances it can also be desirable to warp the data range with nonlinearity. In one embodiment a library of fixed or adjustable nonlinearities are provided which are such that the input and output of the nonlinearity both match the pre-defined range for a parameterized presentation attribute. This arrangement is depicted in FIG. 8B. In another embodiment the warping effect is provided with additional flexibility by allowing pre-scaling and pre-shifting prior to applying a selected nonlinearity and subjecting the outcome of the nonlinear warping to post-scaling and/or post-shifting operations in order to match the resulting range to the pre-defined range for a parameterized presentation attribute. This arrangement is depicted in FIG. 8C. Features and parameters of the above operations can be selected via user interface dialog windows. General forms configuration-specification, feature-selection, and parameter-setting GUIs are known in the art.

Figure 9:
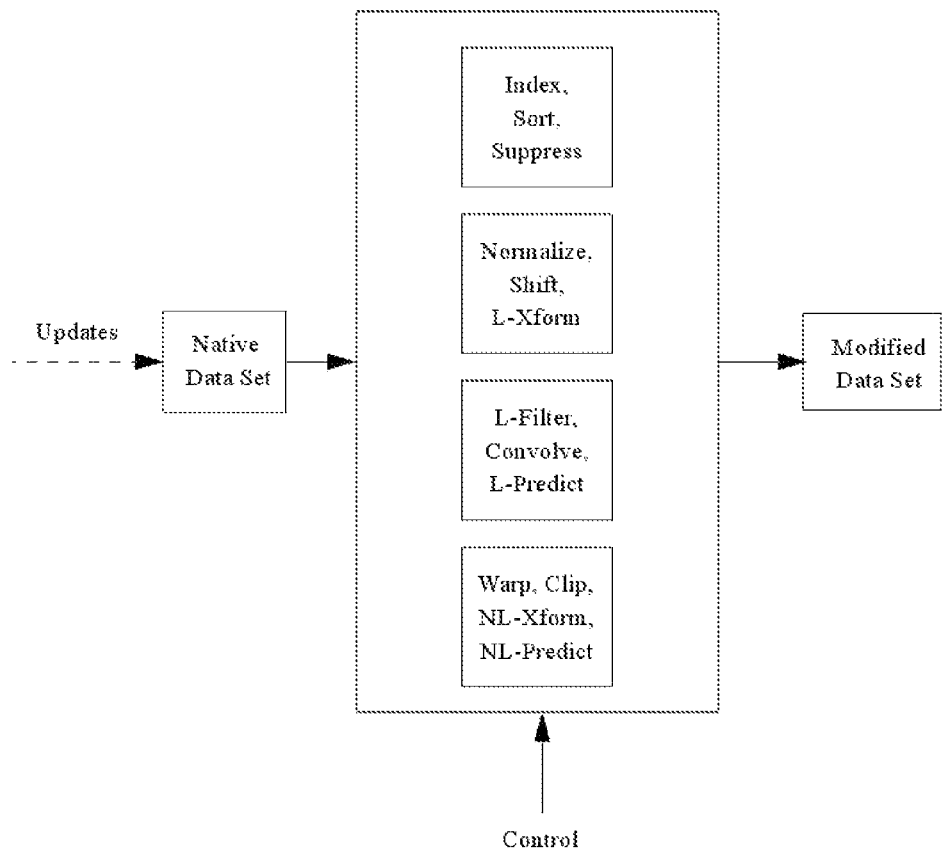
FIG. 9 depicts a more general view and organization of pre-visualization operations provided for by the invention.

FIG. 9 depicts a more general view and organization of pre-visualization operations provided for by the invention. In this example, available pre-visualization operations include:
 Data indexing/re-indexing, data sorting, data suppression, and similar types of data operations;
 Normalization, shifting (translation), and other types of linear and affine transformations;
 Linear filtering, convolution, linear prediction, and other types of signal processing operations;
 Warping, clipping, nonlinear transformations, nonlinear prediction, and other nonlinear transformations.
 The invention provides for other types of pre-visualization operations as well.

Features and parameters of the above operations can be selected via user interface dialog windows. General forms configuration-specification, feature-selection, and parameter-setting GUIs are known in the art.

The invention also provides for the inclusion of statistical operations and statistical processing functions and for the linking to external programs to perform other types of pre-visualization operations. Features and parameters of these can be selected via user interface dialog windows. General forms configuration-specification, feature-selection, and parameter-setting GUIs are known in the art.

The invention also provides for external programs to be added to the collection of available pre-visualization operations.

Figure 10:
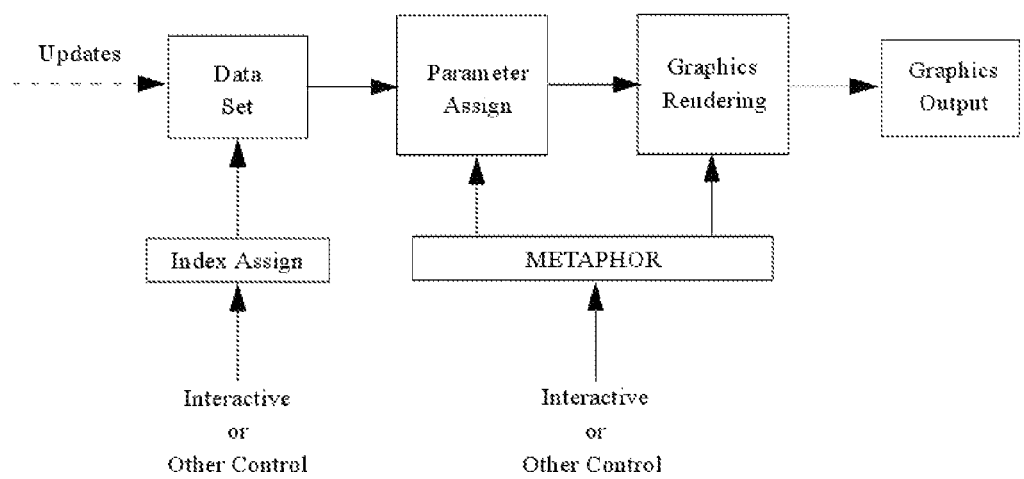
FIG. 10 depicts an embodiment wherein a selected metaphor is used to automatically generate parameter assignments and graphics rendering operations.

The invention additionally provides for the inclusion and use of visual metaphors to simplify visualization setup and user interaction for data exploration. As an example, FIG. 10 depicts an exemplary embodiment wherein a selected metaphor is used to automatically generate parameter assignments and graphics rendering operations. The invention provides for metaphors to control other aspects of the visualization and pre-visualization operations. The invention provides for a metaphor to base its operations on characteristics of a data set being visualized, previously visualized, and anticipated to be visualized. The invention additionally provides for metaphors to be selected and controlled by user interaction, data values, or other means. Features and parameters of the above operations can be selected via user interface dialog windows. General forms configuration-specification, feature-selection, and parameter-setting GUIs are known in the art.

The invention also provides for array (vector, matrix, tensor) operations such as (vector, matrix, tensor) linear combinations, (vector, matrix, tensor) multiplication, scalar multiplication, finding (matrix, tensor) determinants, finding (matrix, tensor) inverses and psuedoinverses, row reduction, factorization, change of basis, or calculation of an eigensystem (eigenvalues, eigenvectors, eigentensors).

Users can select the region of the spreadsheet to be stored in an array and give a name to the array. Different programs can require different formatting of arrays, thus, users can also choose the separating characters, such as a comma and a space or tab. The key of the array can be numbers from 0 to (the number of entries—1) or the values of any column user selects. Such array created can be exported to an external program. Similarly, data of one or multiple arrays can be implemented to be imported from an external program and the values of elements are displayed in appropriate numbers of rows and columns. FIG. 11A illustrates an example of a user interface that permits users to select the geometric element boundary of a captured or rendered tabular matrix data elements or cells within a spreadsheet. Other features and parameters of the above operations can be selected via user interface dialog windows. General forms configuration-specification, feature-selection, and parameter-setting GUIs are known in the art.

In the case of spreadsheet visualization, spreadsheets natively provide certain types of array calculations with relative ease while other standard matrix and array operations, such as matrix/tensor multiplication, eigensystem calculations, convolutions, etc., have no native support within the spreadsheet paradigm. The invention provides for a matrix boundary tool for use in capturing and labeling matrix data and rendering matrix operation results. For example, users can specify the group of cells as the elements of one matrix or multiple matrices. FIG. 11B illustrates an exemplary user interface that permits users to select array operations to be performed on selected array data, for example as may be selected by the tool of FIG. 11A. Other features and parameters of the above operations can be selected via user interface dialog windows. General forms configuration-specification, feature-selection, and parameter-setting GUIs are known in the art.

Figure 12B:
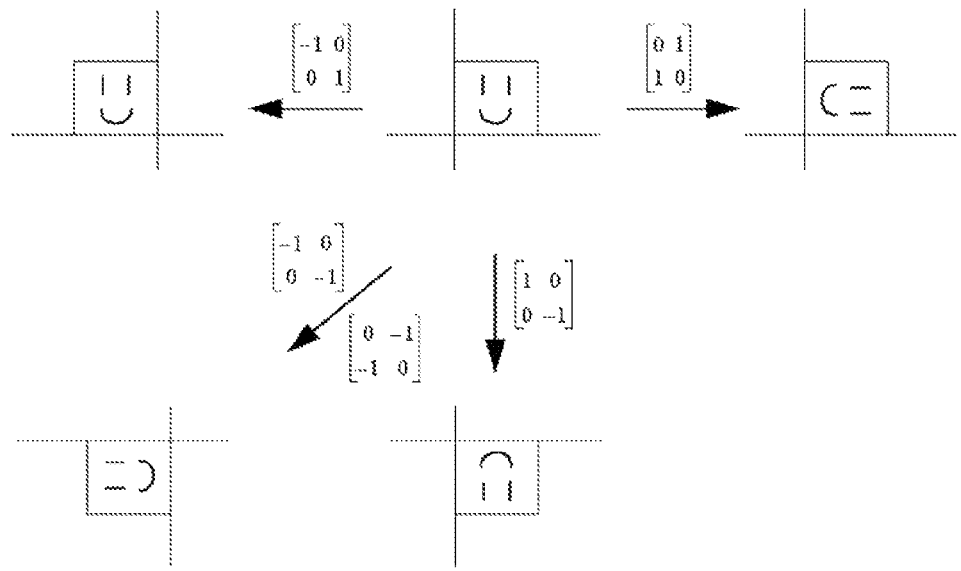
Figure 12C:
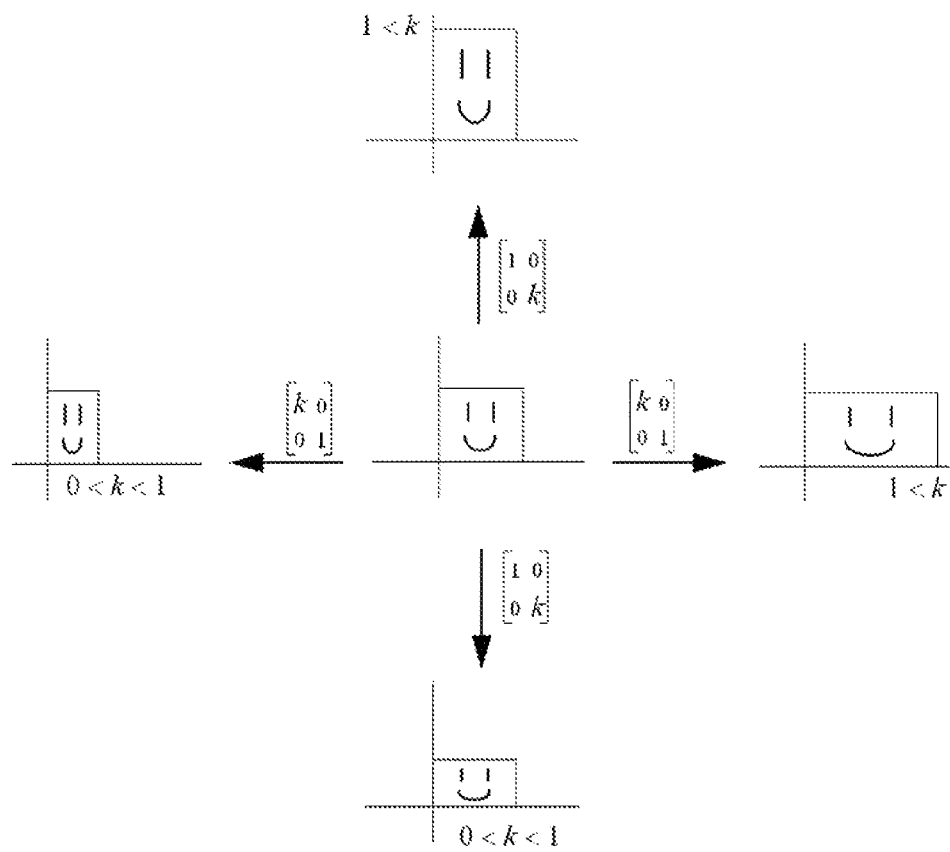
Figure 12D:
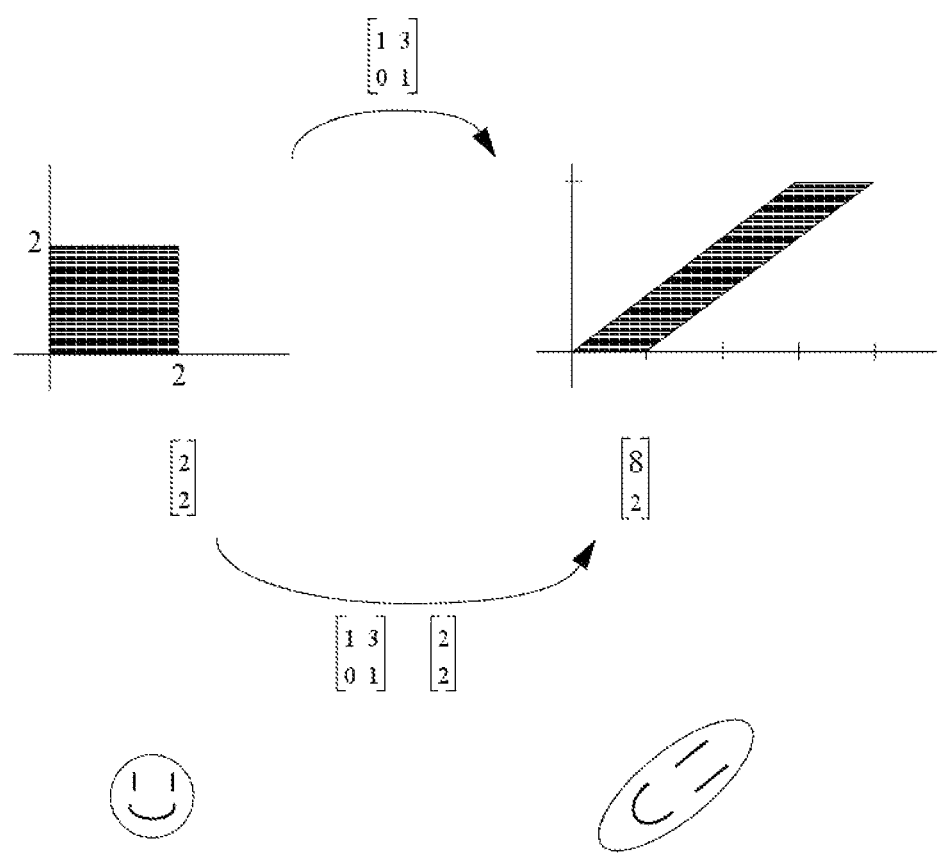

The invention can additionally transform a graphics object via matrix operations. As examples, FIG. 12A illustrates a figure being resized, rotated, and shifted through array-based scaling, rotating, and translating linear transformations. FIG. 12B illustrates processes of a figure being rotated around x-axis, y-axis, line of y=x, and line of y=−x. and FIG. 12c illustrates processes of figure being rescaled vertically or horizontally. FIG. 12D illustrates a transformation process acting on 2D graphics objects such as a rectangle-bounded horizontal line array and a graphic. The invention also provides for embodiments to extend these and related systems and methods to transform 3D-graphics via scalings, rotations, stretch, etc.

The invention provides for dimensional transformations among points, 1D, 2D, and 3D graphics objects. FIG. 12E illustrates a matrix and/or tensor transformation process and how it changes a 3D graphics object into a 2D object via dimension dropping. FIG. 12F illustrates a 3D graphics object rendered of a 2D surface created by a vertical line rotated around the y-axis. FIG. 12G illustrates a 3D graphics object rendered by perspective projection defined by a point.

The invention also provides for 3D graphics generation from 3D vector draw-lists provided by other programs, spreadsheet data, and/or the user. In an embodiment, the invention also provides for 3D graphics generation from equations provided by the user.

The invention further provides for pre-visualization operations to themselves have parameters that can be adjusted in real time and/or be stored in files for recall.

The invention further provides for a network of pre-visualization operations to be stored in files for recall.

Spreadsheet Visualization Integration Architectures

The invention provides implementation of at least some of the invention's spreadsheet presentation features through use of APIs of existing spreadsheet products. The invention provides implementation of at least some of the invention's spreadsheet presentation features with relatively small augmentation and modification of existing product software by product manufacturers.

Figure 13:
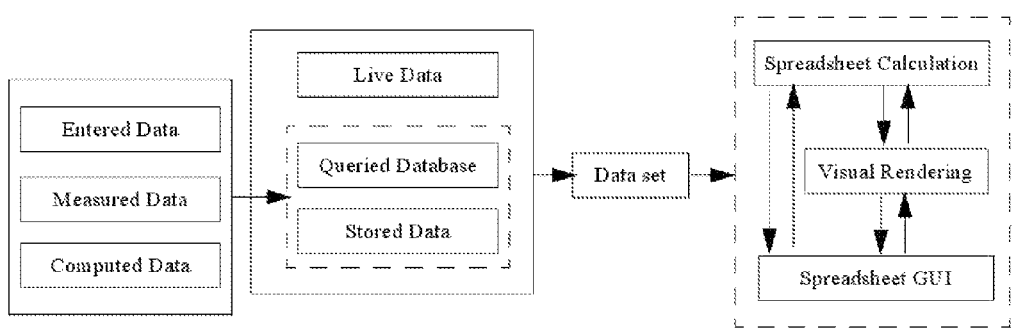
FIG. 13 depicts a spreadsheet architecture and information flow as it might be used in a data visualization setting.

FIG. 13 depicts an example of spreadsheet architecture (right side) and an information flow as it might be used in a data visualization setting. One of or some combination of entered data, measured data, and/or computed data can be stored as stored data or stored in a queriable data base. In some situations live data feeds can also provide data. One or some combination of these data sources can be used to provide a data set used by the spreadsheet program. The spreadsheet program internally comprises at least a GUI component, a calculation compound, and a visual rendering component.

Figure 14A:
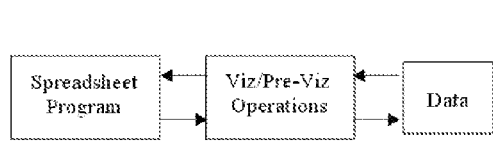
FIGS. 14A-14D depict various types of architectural approaches for combining and integrating spreadsheet programs, visualization operations provided by the invention, and a data set used by each.
Figure 14B:
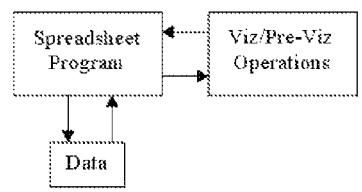
Figure 14C:
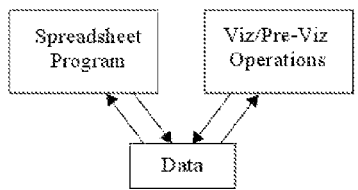

FIGS. 14A-14D depicts various types of exemplary relationships and information flows among a system or method for rendering a conventional spreadsheet or table of tabular data, a system or method for rendering the visualization operations of the invention, and a data set used by each. Visualization and pre-visualization operations can be introduced between the data and the spreadsheet program as depicted in FIG. 14A. In another embodiment, visualization and pre-visualization operations can obtain data from the spreadsheet program, process data, and return the generated visual operation back to the spreadsheet program as depicted in FIG. 14B. An example of this is using an API or the use of VBA in conjunction with Microsoft Excel.

Figure 14D:
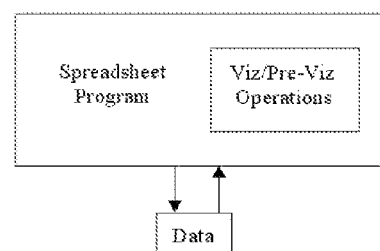

Visualization and pre-visualization operations can also be implemented as parallel operations to the spreadsheet program. Visualization and pre-visualization operations can be configured separately as an independent operation(s) with direct access to data (i.e., able to obtain data and send the result to the data without having to go through the spreadsheet program), as shown in FIG. 11C. One advantage of this is that relevant categories of data can be extracted to generate complicated visualizations without the data being arranged into table form. Visualization and pre-visualization operations can be part of a spreadsheet program without direct access to the data, as depicted in FIG. 14D.

Spreadsheet Visualization User Interface Architectures: Traditional and High-Dimension User Interface Devices (HDTP and Advanced Mice)

Figure 15:
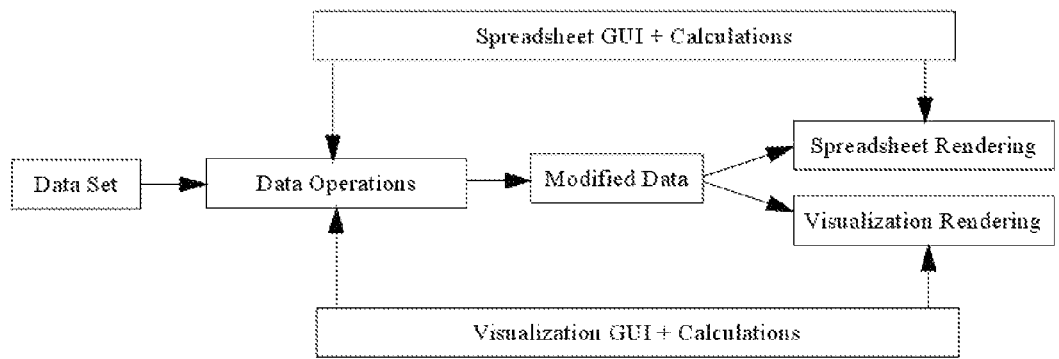
FIG. 15 depicts an embodiment of an augmentation of a spreadsheet program with additional spreadsheet features as provided for by the invention.

Next, user interface architectures for general visualization and spreadsheet visualization environments are considered. FIG. 15 depicts an exemplary embodiment of an augmentation of a spreadsheet program with additional spreadsheet features as provided for by the invention. A data set is subjected to data operations so as to produce modified data. The data operations can be controlled by the spreadsheet GUI and spreadsheet calculation as well as by the visualization GUI and Visualization calculations.

Figure 16A:
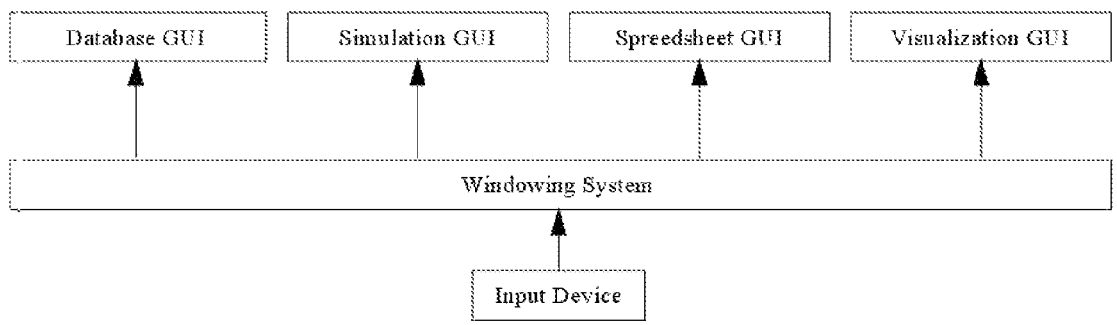
FIGS. 16A-16B depict ways in which one or more user interface input devices (such as a mouse, trackball, touchpad, etc.) can be managed so as to control graphical user interfaces of a plural software application in the context of the invention.
Figure 16B:
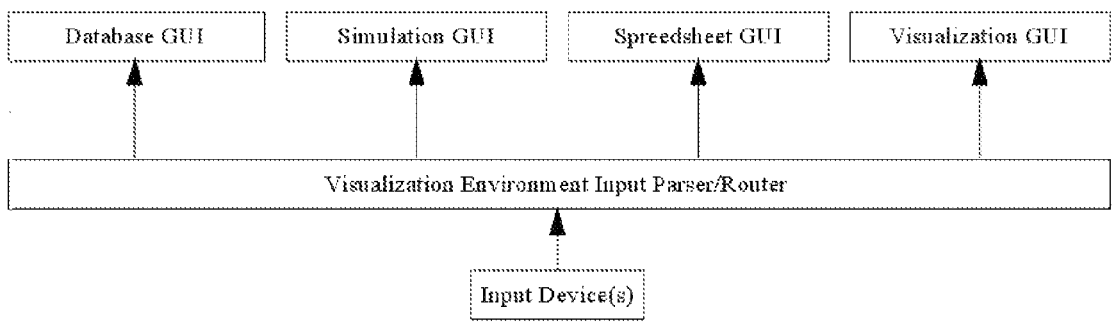

FIGS. 16A-16B depict ways in which one or more user interface input devices (such as a mouse, trackball, touchpad, etc.) can be managed to control graphical user interfaces of a plural software application in the context of the invention. FIG. 16A, the windowing system directs the input events from a single user interface input device to various applications, for example, a Database GUI, a Simulation GUI, a Spreadsheet GUI, and a Visualization GUI. FIG. 16B depicts an alternative implementation wherein a Visualization Environment Input Router/Parser accepts input events from one or more user interface input devices and directs these events to each of the various applications. The Visualization Environment Input Router/Parser can direct events from multiple user interface input devices to different inputs to the same application. In another embodiment the Visualization Environment Input Router/Parser can split events originating from an individual user interface device and separately route these to inputs of separate applications. In another embodiment, a Visualization Environment Input Router/Parser works together with the Window System to route input events.

The above arrangements are general and apply to use of conventional mice, trackballs, touchpads, etc. However, visualization and CAD workstations have often been provided with more sophisticated user input devices that provide a higher number of interactive simultaneously-adjustable parameters. Classic examples of this are knob-boxes (as used in HP and SGI workstations), the DataGlove (VPL, General Reality), the SpaceBall (Logitech3Dconnexion, Labtec, HP/Compaq), etc., although few of these have survived product cycles to remain in active use or with wide availability. More recently enhanced touch-based interfaces have attracted a great deal of attention, mostly for their multi-touch and gesture recognition capabilities. However, some enhanced touch-based interfaces such as the HDTP ("High Dimensional Touch Pad," U.S. Pat. No. 6,570,078; U.S. patent application Ser. No. 11/761,978 U.S. Ser. No. 12/418, 605, and U.S. Ser. No. 12/502,203 among others) employ a tactile sensor array (pressure, proximity, etc.) and real-time image and mathematical processing to provide a powerful user input device with both a higher number of interactive simultaneously-adjustable parameters and a rich range of syntactic and metaphorical capabilities well-suited to use with interactive visualization. Additionally, the HDTP technology can be readily implemented as a touchscreen through use of, for example, inexpensive transparent capacitive proximity-sensor arrays. The present invention provides for the incorporation and use of the HDTP and other metaphor-rich user interface input devices into visualization environments. Attention is now directed to incorporation of the HDTP as part of a visualization environment user interface and then brief attention is directed to alternative use of a few alternative metaphor-rich enhanced user interface technology approaches.

Figure 17A:
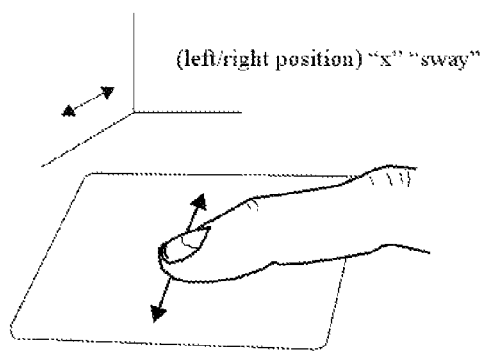
FIGS. 17A-17F illustrate the six independently adjustable degrees of freedom of touch from a single finger that can be simultaneously measured by the HDTP technology.
Figure 17D:
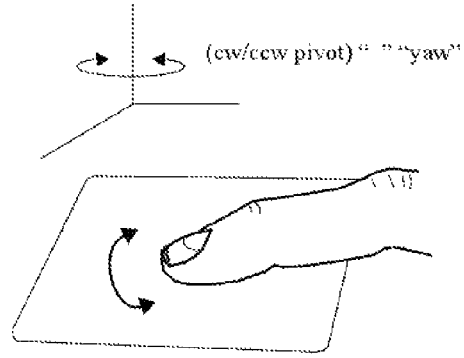
Figure 17B:
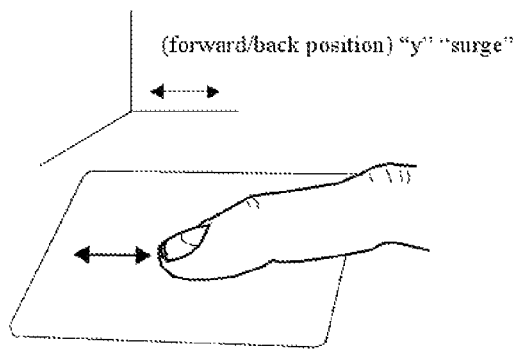
Figure 17E:
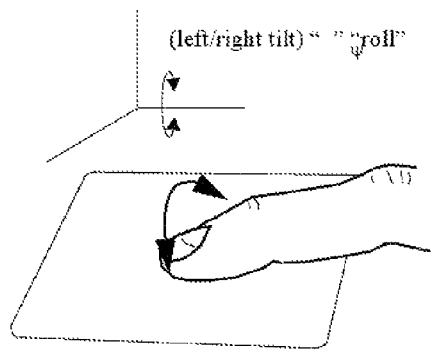
Figure 17C:
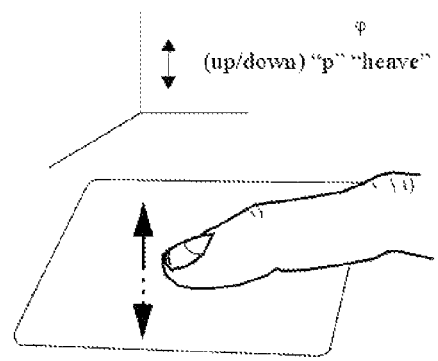
Figure 17F:
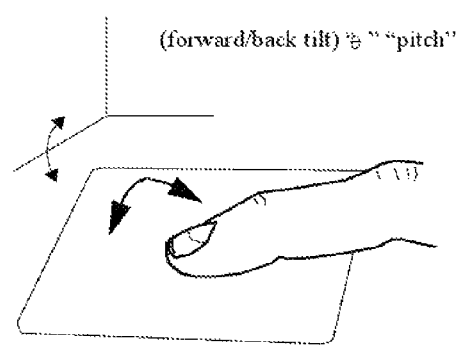
Figure 18:
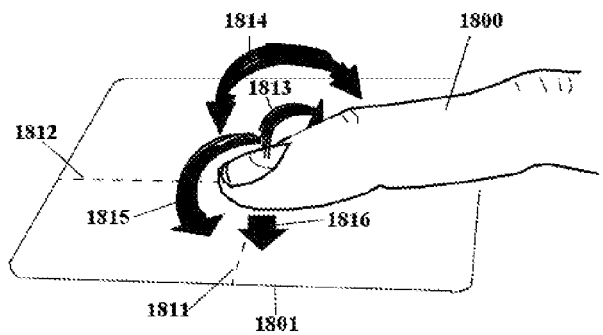
FIG. 18 suggests general ways in which two or more of these independently adjustable degrees of freedom can be adjusted at once.

FIGS. 17A-17F illustrate the six independently adjustable degrees of freedom of touch from a single finger that can be simultaneously measured by the HDTP technology. The depiction in these figures is from the side of the touchpad. FIGS. 17A-17C show actions of positional change (amounting to applied pressure in the case of FIG. 17C) while FIGS. 17D-17F show actions of angular change. Each of these can be used to control a user interface parameter, allowing the touch of a single fingertip to control up to six simultaneously-adjustable quantities in an interactive user interface. FIG. 18 suggests general ways in which two or more of these six independently adjustable degrees of freedom 1811-1816 can be adjusted at once for a finger 1800 in contact with an HDTP sensor surface 1801. More advanced implementations of the HTDP provide for multi-touch capabilities far more sophisticated than those popularized by the Apple iPhone, NYU, and others.

Figure 19:
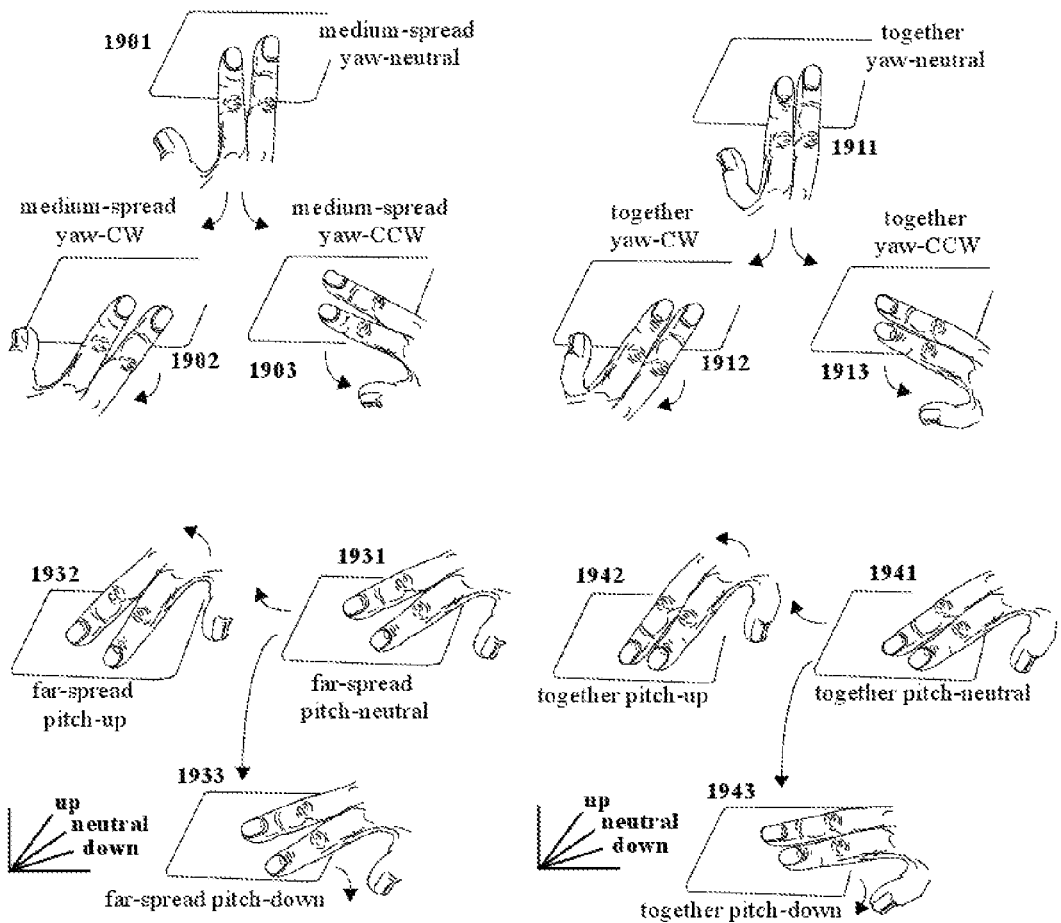
FIG. 19 demonstrates a few two-finger multi-touch postures and/or gestures from the many that can be readily recognized by HTDP technology.

FIG. 19 demonstrates a few exemplary two-finger multi-touch postures and/or gestures from the hundreds that can be readily recognized by HTDP technology. The two fingers may be spread apart somewhat, as in the cases 1901-1903 and 1931-1933, or may be brought together, as in the cases 1911-1913 and 1941-1943. The separation of the two fingers adds an additional parameter that can be controlled by the user, and the yaw (pivot) parameter may be varied independently from the newly introduced finger separation parameter. For example the hand can pivot clockwise 1902, 1912, or counter-clockwise 1903, 1913 from the corresponding neutral positions 1901, 1911. Similarly, the pitch of the pair of fingers can be raised 1932, 1942 or lowered 1933, 1943 with respect to the corresponding neutral positions 1931, 1941, while independently from these motions the two fingers are spread apart 1931-1933 or brought together 1941-1943. Note the finger spread can be varied considerably in this two-finger posture.

The pair of fingers can be moved as a group through all six degrees of freedom (left-right, forward-back, downward pressure, roll, pitch, yaw), and comfortably allow for two differences between the fingers (differences in downward pressure, and one angle of finger separation spread) and even three differences between the fingers (differences in downward pressure and two coordinates of separation when fingers curl to form independently controlled "x" and "y" components). Thus two-finger postures considered above can readily provide a nine-parameter set relating to the pair of fingers as a separate composite object adjustable within an ergonomically comfortable range. One example nine-parameter set the two-finger postures comprises:

composite (group) average x position;
    inter-finger differential x position;
    composite (group) average y position;
    inter-finger differential y position;
    composite (group) average pressure;
    inter-finger differential pressure;
    composite (group) roll;
    composite (group) pitch;
    composite (group) yaw.

HTDP technology can also be configured to recognize and measure postures and/or gestures involving three or more fingers, various parts of the hand, the entire hand, multiple hands, etc. In general, multifinger contact can be used to provide control of up to three additional independently adjustable parameters for each additional finger.

Figure 20:
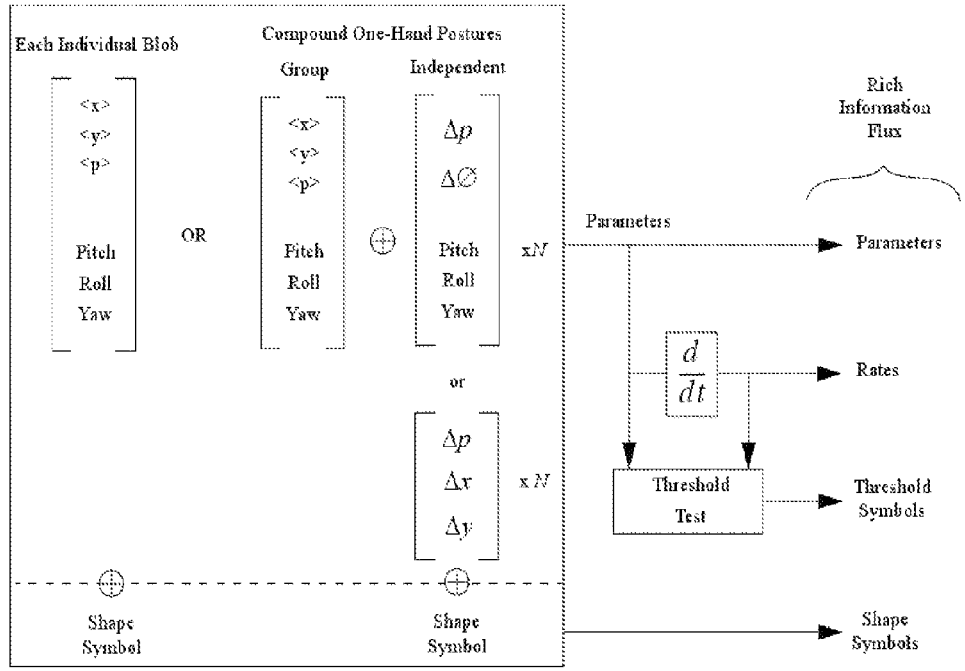
FIG. 20 shows how raw measurements of the six quantities of FIGS. 17A-17F, together with shape recognition for distinguishing contact with various parts of the hand and the touchpad, can be used to create a rich information flux of parameters, rates, and symbols.
Figure 21:
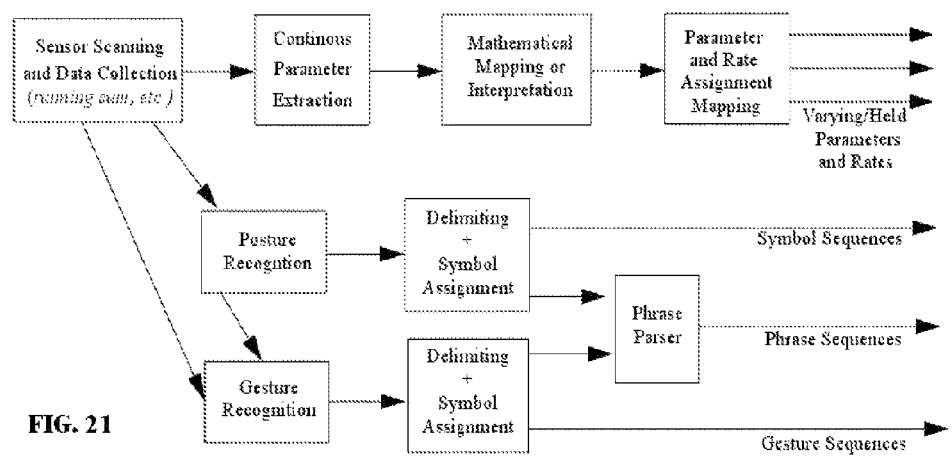
FIG. 21 shows an approach for incorporating posture recognition, gesture recognition, state machines, and parsers to create an even richer human/machine tactile interface system capable of incorporating syntax and grammars.

FIG. 20 shows an example of how raw measurements of the six quantities of FIGS. 17A-17F, together with shape recognition for distinguishing contact with various parts of the hand and the touchpad, can be used to create a rich information flux of parameters, rates, and symbols. FIG. 21 shows an exemplary approach for incorporating posture recognition, gesture recognition, state machines, and parsers to create an even richer human/machine tactile interface system capable of incorporating syntax and grammars.

Figure 22:
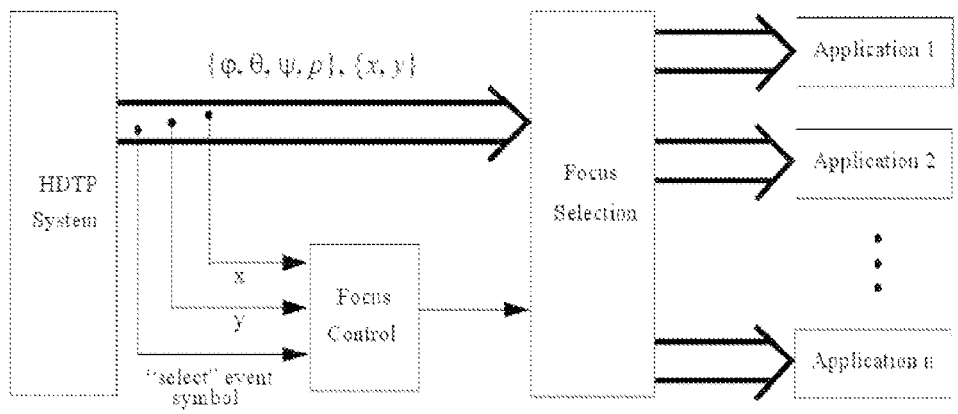
FIG. 22 depicts a user interface input arrangement incorporating one or more HDTPs that provides user interface input event and quantity routing of the type described earlier in conjunction with FIGS. 16A-16B.

FIG. 22 depicts an exemplary user interface input arrangement incorporating one or more HDTPs that provides a user interface input event and quantity routing of the type described earlier in conjunction with FIGS. 16a-16b.

Figure 23A:
FIGS. 23A-23L depict a number of arrangements employing the HDTP technology suitable for use with visualization environments.
Figure 23B:
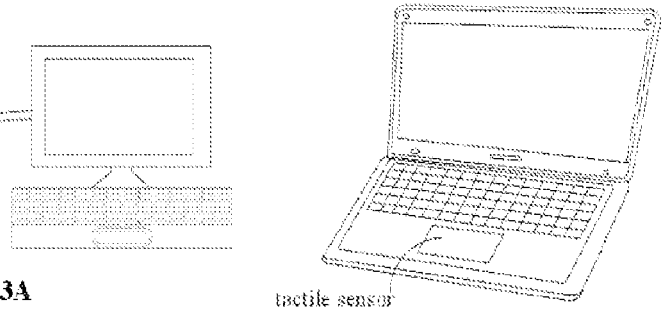
Figure 23C:
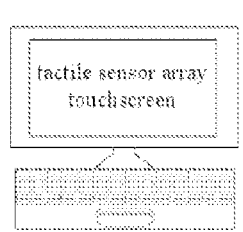
Figure 23D:
Figure 23E:
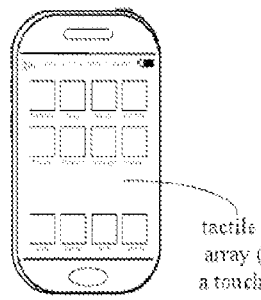
Figure 23F:
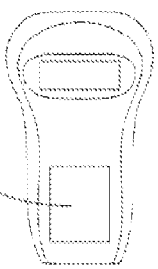
Figure 23G:
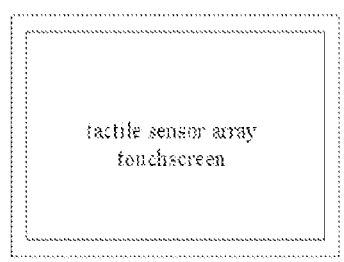
Figures 23H, 23I, 23J, 23K, 23L:
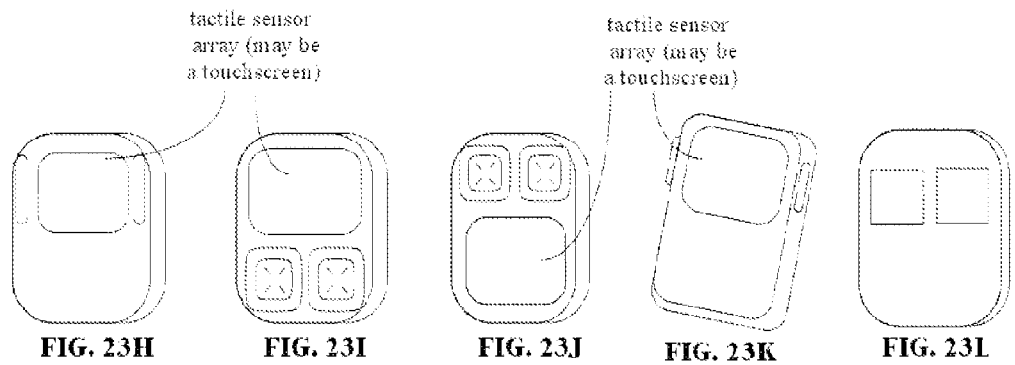

FIGS. 23A-23L depict a number of arrangements employing the HDTP technology suitable for use with visualization environments. FIG. 23A illustrates an HDTP as a peripheral that can be used with a desktop computer (shown) or laptop (not shown). FIG. 23B depicts an HDTP integrated into a laptop in place of the traditional touchpad pointing device. In FIGS. 23A-23B the HDTP tactile sensor can be a stand-alone component or can be integrated over a display to form a touchscreen. FIG. 23C depicts an HDTP integrated into a desktop computer display to form a touchscreen. FIG. 23D shows the HDTP integrated into a laptop computer display to form a touchscreen. FIG. 23E depicts an HDTP integrated into a cellphone, smartphone, PDA, or other hand-held consumer device. FIG. 23F shows an HDTP integrated into a test instrument, portable service-tracking device, portable service-entry device, field instrument, or other hand-held industrial device. In FIGS. 23E-23F the HDTP tactile sensor can be a stand-alone component or can be integrated over a display to form a touchscreen. FIG. 23G depicts an HDTP touchscreen configuration that can be used in a tablet computer, wall-mount computer monitor, digital television, video conferencing screen, kiosk, etc. In at least the arrangements of FIGS. 23A, 23C, 23D, and 23G, or other sufficiently large tactile sensor implementation of the HDTP, more than one hand can be used and individually recognized as such.

FIGS. 23H-23K depict various integrations of an HDTP into the back of a conventional computer mouse. In FIGS. 23H-23K the HDTP tactile sensor can be a stand-alone component or can be integrated over a display to form a touchscreen. More than two touchpads can be included, such as the example of FIG. 23L as taught in U.S. Pat. No. 7,557,797.

The types of human-machine geometric interaction between the hand and the HDTP facilitate many useful applications within a visualization environment. A few of these include control of visualization observation viewpoint location, orientation of the visualization, and controlling fixed or selectable ensembles of one or more of viewing parameters, visualization rendering parameters, pre-visualization operations parameters, data selection parameters, simulation control parameters, etc. As one example, the 6D orientation of a finger can be naturally associated with visualization observation viewpoint location and orientation, location and orientation of the visualization graphics, etc. As another example, the 6D orientation of a finger can be naturally associated with a vector field orientation for introducing synthetic measurements in a numerical simulation. As another example, at least some aspects of the 6D orientation of a finger can be naturally associated with the orientation of a robotically positioned sensor providing actual measurement data. As another example, the 6D orientation of a finger can be naturally associated with an object location and orientation in a numerical simulation. As another example, the large number of interactive parameters can be abstractly associated with viewing parameters, visualization rendering parameters, pre-visualization operations parameters, data selection parameters, numeric simulation control parameters, etc.

In another example, the x and y parameters provided by the HDTP can be used for focus selection and the remaining parameters can be used to control parameters within a selected GUI.

In another example, the x and y parameters provided by the HDTP can be regarded as specifying a position within an underlying base plane and the roll and pitch angles can be regarded as specifying a position within a superimposed parallel plane. In a first exemplary extension of the previous two-plane example, the yaw angle can be regarded as the rotational angle between the base and superimposed planes. In a second exemplary extension of the previous two-plane example, the finger pressure can be employed to determine the distance between the base and superimposed planes. In a variation of the previous two-plane example, the base and superimposed planes are not fixed as being parallel but rather intersect at an angle associated with the yaw angle of the finger. In each of these examples, either or both of the two planes can be used to represent an index or indexed data, a position, pair of parameters, etc. of a viewing aspect, visualization rendering aspect, pre-visualization operations, data selection, numeric simulation control, etc.

A large number of other examples are possible as is appreciated by one skilled in the art.

One use of the HDTP in the above examples is simply to supply more than the usual two user interface parameters provided by a conventional user interface input device such as a conventional computer mouse, trackball, touchpad, etc. The present invention provides for the use of other user interface input arrangements and devices as alternatives to or in conjunction with one or more HDTPs.

Figures 24A, 24B:
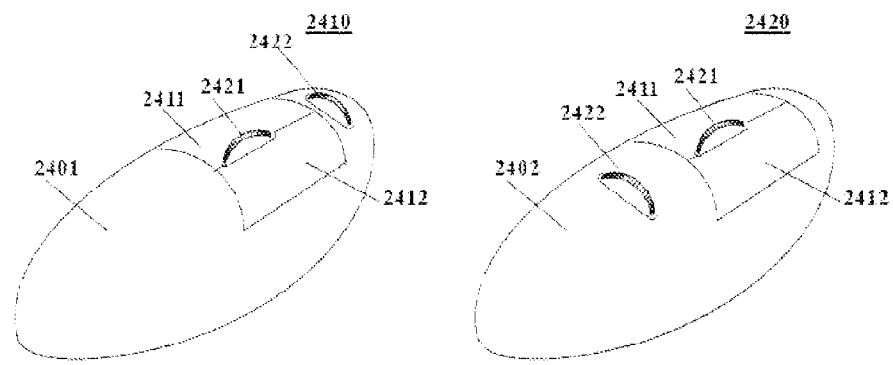
FIGS. 24A and 24B illustrate examples of scroll-wheel mice provided with an additional scroll-wheel.

In a simple example, the scroll-wheel of a scroll-wheel mouse is used to provide a third simultaneously adjustable user interface parameter. In another example, a second or yet more additional scroll-wheels can be added to a conventional scroll-wheel mouse. The resultant collection of scroll-wheels can be relatively positioned in parallel, oriented at orthogonal angles to support a coordinate-metaphor, positioned on the sides of the mouse body, etc. FIGS. 24A and 24B illustrate examples 2410, 2420 of a conventional scroll-wheel mouse 2401, 2402 with a traditional up-down scrollwheel 2421 and at least standard mouse buttons 2411, 2412 provided with an added left-right scroll-wheel 2422 as taught in U.S. Pat. No. 7,557,797. Such an arrangement can employ a connecting cable, or the device can be wireless. Each of the arrangements of FIGS. 24A and 24B as well as the ones described in the next paragraph, plus variations and adaptations, will be referred to as an "advanced mouse" or in the plural "advanced mice."

Figures 25A, 25B, 25C:
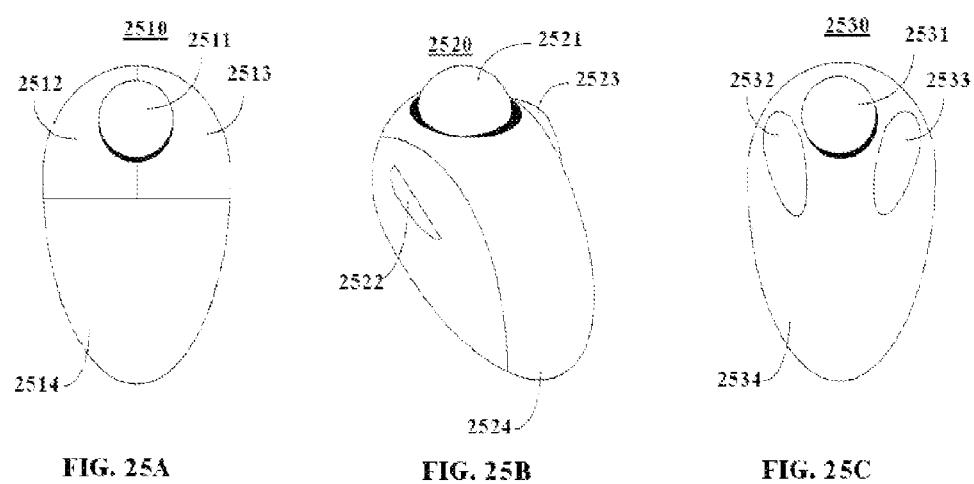
FIGS. 25A-25C illustrate a single trackball incorporated into the back of a conventional computer mouse.
Figure 26A:
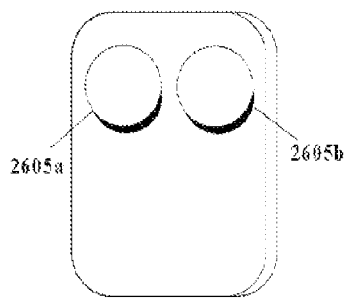
FIGS. 26A-26E illustrate two trackballs incorporated into the back of a conventional computer mouse.
Figure 26B:
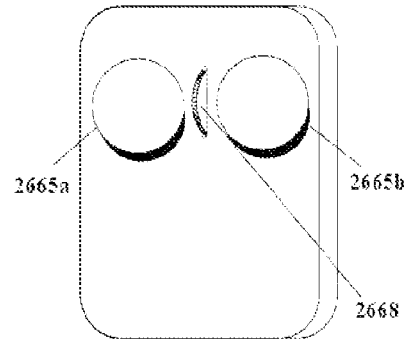
Figure 26C:
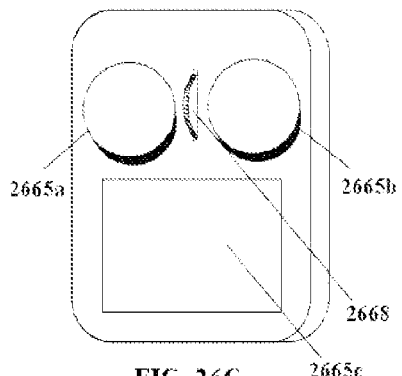
Figure 26D:
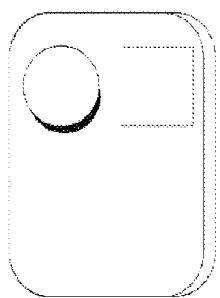
Figure 26E:
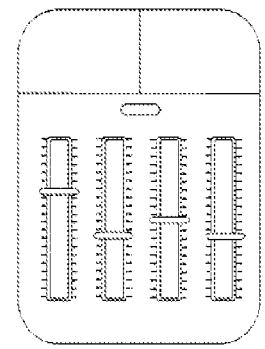

In another example of an advanced mouse, one or more trackballs can be added to a conventional computer mouse. FIGS. 25A-25C illustrate examples 2510, 2520, 2530 wherein a single trackball 2511, 2521, 2531 is incorporated into the back of a conventional computer mouse 2510, 2520, 2530 with at least standard mouse buttons 2512-2513, 2522-2523, 2532-2533 as taught in U.S. Pat. No. 7,557,797. FIGS. 26A-26C illustrate examples where two trackballs 2605$a$, 2605$b$ are incorporated into the back of a conventional computer mouse as taught in U.S. Pat. No. 7,557,797. The trackballs in the arrangements of FIGS. 25A-25C and FIGS. 26A-26C can be the conventional two degree of freedom type (roll left-right, roll away-towards) or can provide three to six degrees of freedom as taught in U.S. Pat. No. 7,557,797; U.S. patent application Ser. No. 10/806,694. Useful exemplary advanced mouse arrangements include the trackball 2605$a$-2605$b$, touchpad 2605$c$, scrollwheel 2668 mouse of FIG. 26C, the trackball/touchpad mouse of FIG. 26$d$, and the multiple slider configuration of FIG. 26E, each as taught in U.S. Pat. No. 7,557,797. Each of these arrangements can employ a connecting cable, or the advanced mouse device can be wireless.

The additional parameters provided by the HDTP and the above alternatives are more than the usual number supported by conventional window systems (for example as described in conjunction with FIG. 16A). To implement additional parameter handling, for example such as in the HDTP arrangement of FIG. 22 or its equivalents for the alternative advanced mice as described above, additional arrangements must be made beyond the conventional operating system pointer device handling.

Figure 27:
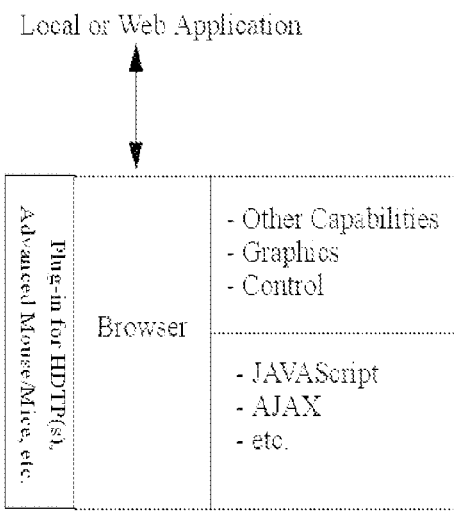

In an additional approach, the invention provides for the HDTP or alternatives such as the advanced mice described above to interface with a browser via a browser plug-in. This arrangement can be used to capture the additional user interface input parameters and pass these on to an application interfacing to the browser. An example of such an arrangement is depicted in FIG. 27. The browser can interface with local or web-based applications that drive the visualization and/or control the data source(s), process the data, etc. The browser can be provided with client-side software such as JAVA Script, AJAX, etc. Such an arrangement is particularly useful when combined with browser-based rendering of visualizations, as described in the next section.

The invention provides for HDTP parameters to be separated into groups which are individually directed to pointer device interfaces on multiple computers.

Browser-Rendered Implementations

Figure 28:
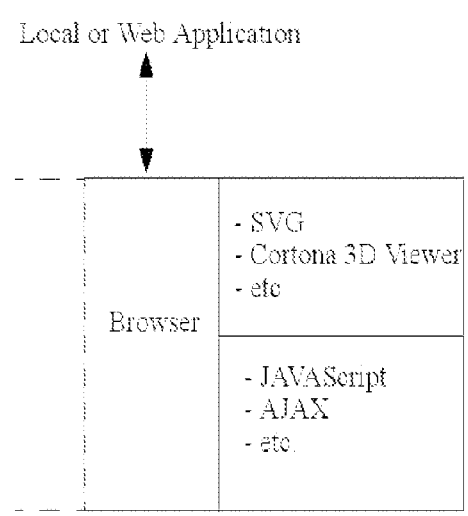
FIG. 28 depicts an implementation for rendering visualization in a browser.

The invention provides for visualizations to be rendered in a browser. This allows for implementations wherein the browser is used as a viewer. The browser can interface with local or web-based applications that drive the visualization. An exemplary arrangement is depicted in FIG. 28. In an embodiment, the browser can be provided with Simple Vector Graphics ("SVG") utilities (natively or via an SVG plug-in) to render basic 2D vector and raster graphics. In another embodiment, the browser can be provided with a 3D graphics capability, for example via the Cortona 3D browser plug-in. These embodiments or alternatives can be provided with client-side software such as JAVA Script, AJAX, etc. The example of FIG. 28 also provides for other plug-ins (represented by the dashed-line box) such as the user interface input device plug-in described earlier.

Web-Based Implementations

Figure 29:
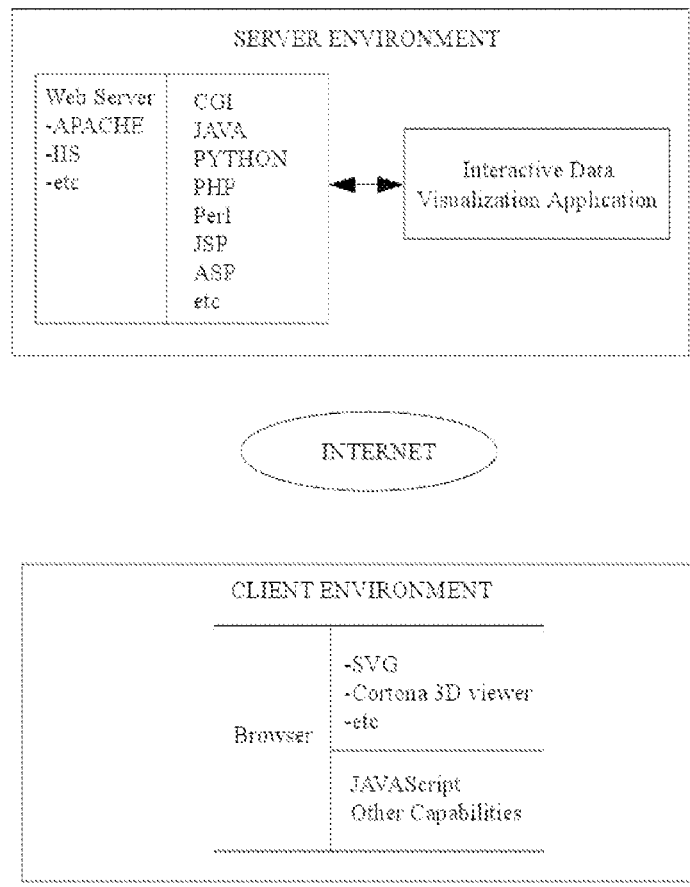
FIG. 29 depicts a web-based implementation of a visualization environment leveraging browser arrangements such as that depicted in FIGS. 27-28, their variations, alternatives, etc.

The invention provides for web-based implementations of the visualization environment. FIG. 29 depicts an exemplary web-based implementation of a visualization environment leveraging browser arrangements such as that depicted in FIGS. 27-28, their variations, alternatives, etc. As depicted in the arrangement of FIG. 29, the client environment can employ such a browser to access a visualization server environment or visualization-related (databases, live data feeds, simulations, statistical or signal processing, etc.) server environment. In an embodiment, the client environment browser can connect over the internet with two or more visualization server environments and/or visualization-related server environments and/or local applications. In an embodiment, a visualization or visualization-related server environment can connect over the internet with two or more browsers in the client environment. Other variations and alternative implementations are also possible as is clear to one skilled in the art.

A server environment can include web server foundation software such as Apache, 115, etc. A server environment can also include server-side scripting and dynamic software such as CGI, JAVA/JAVA Script, Python, PHP, Perl, JSP, ASP, etc. Other variations and alternative implementations are also possible as is clear to one skilled in the art.

The additional interactively-controlled parameters provided by the HDTP provide more than the usual number supported by conventional browser systems and browser networking environments. This may be addressed in a number of ways.

In a first approach, an HDTP interfaces with a browser both in a traditional way and additionally via a browser plug-in. Such an arrangement may be used to capture the additional user interface input parameters and pass these on to an application interfacing to the browser. An example of such an arrangement is depicted in FIG. 30D.

In a second approach, an HDTP interfaces with a browser in a traditional way and directs additional GUI parameters though other network channels. Such an arrangement may be used to capture the additional user interface input parameters and pass these on to an application interfacing to the browser. An example of such an arrangement is depicted in FIG. 30E.

In a third approach, an HDTP interfaces all parameters to the browser directly. Such an arrangement may be used to capture the additional user interface input parameters and pass these on to an application interfacing to the browser. An example of such an arrangement is depicted in FIG. 30F.

The browser may interface with local or web-based applications that drive the visualization and/or control the data source(s), process the data, etc. The browser may be provided with client-side software such as JAVA Script, AJAX, etc. The browser may provide also be configured advanced graphics to be rendered within the browser display environment, allowing the browser to be used as a viewer for data visualizations, advanced animations, etc., leveraging the additional multiple parameter capabilities of the HDTP. The browser may interface with local or web-based applications that drive the advanced graphics. In an embodiment, the browser may be provided with Simple Vector Graphics ("SVG") utilities (natively or via an SVG plug-in) so as to render basic 2D vector and raster graphics. In another embodiment, the browser may be provided with a 3D graphics capability, for example via the Cortona 3D browser plug-in.

Collaboration Implementations

The invention provides for collaboration implementations and the use of collaboration tools for collaborative use of visualization features of the invention and for the creation of a collaborative visualization environment.

Figure 30A:
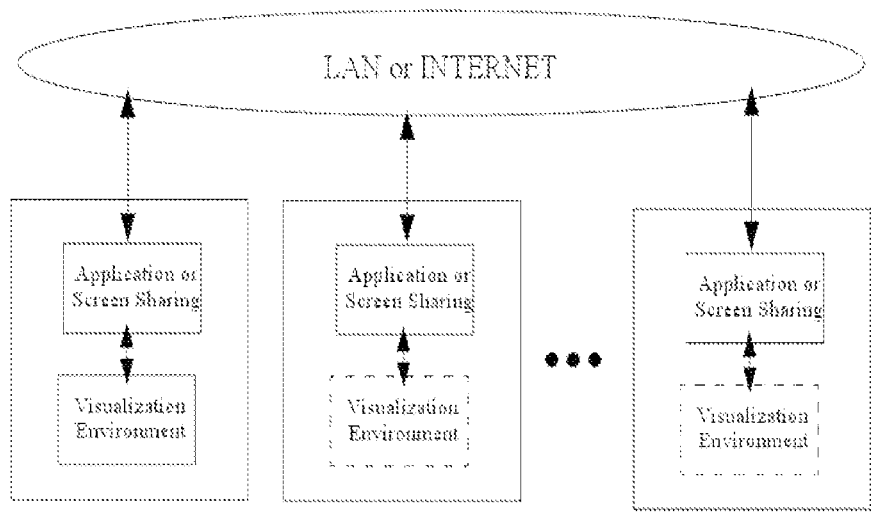
FIG. 30A depicts a client-side collaboration implementation wherein a general purpose collaboration tool can be used to share the visualization environment session running on one computer with one or more other computers.

FIG. 30A shows a client-side collaboration implementation wherein a general purpose collaboration tool can be used to share the visualization environment session running on one computer with one or more other computers. The visualization environment can be a stand-alone visualization application or can comprise a browser implementation employing, for example, any of the various arrangements described in conjunction with FIGS. 27-29.

In the case of real-time collaboration, the general purpose collaboration tool employed in the arrangement of FIG. 30 can comprise application sharing software (such as Microsoft's NetMeeting™, IBM/Lotus' SameTime™$^{SM}$, HP's Shared-X, etc.) or display sharing software. In the case of real-time collaboration, audio and/or video conferencing can also be used to facilitate interpersonal communication among collaborating session participants.

Figure 30B:
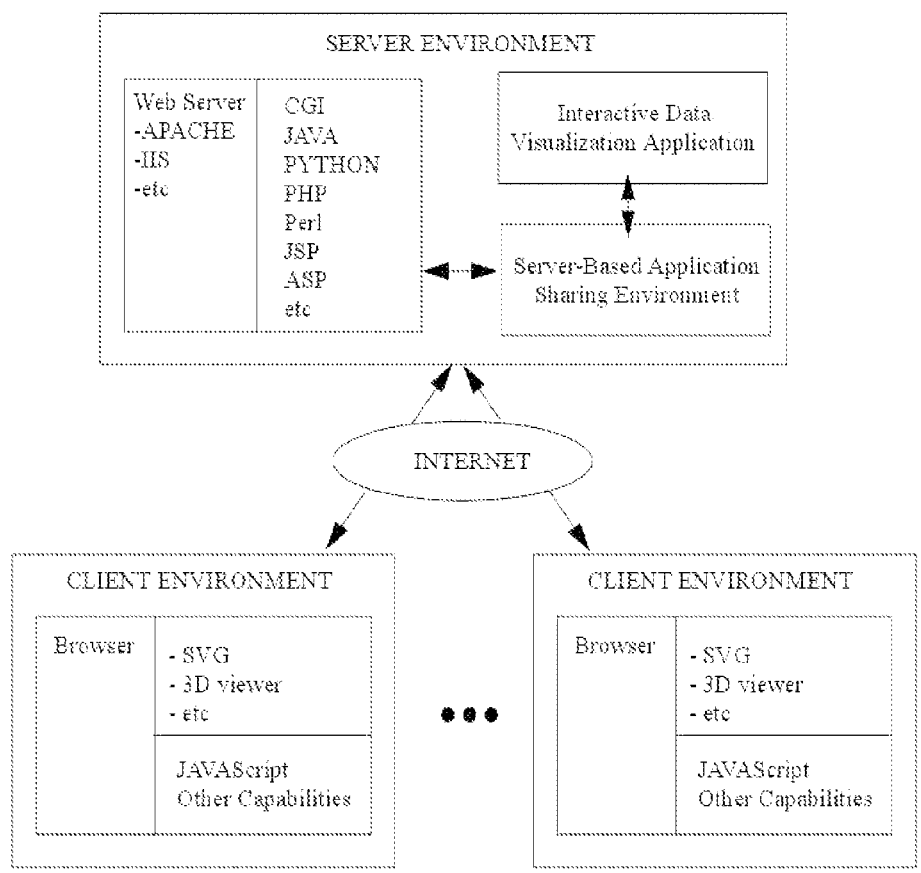
FIG. 30B depicts a server-side collaboration implementation wherein a general purpose or specialized server-side application sharing environment is used to share a server-based interactive data visualization application.

FIG. 30B shows server-side collaboration implementation wherein a general purpose or specialized server-side application sharing environment is used to share a server-based interactive data visualization application.

Figure 30C:
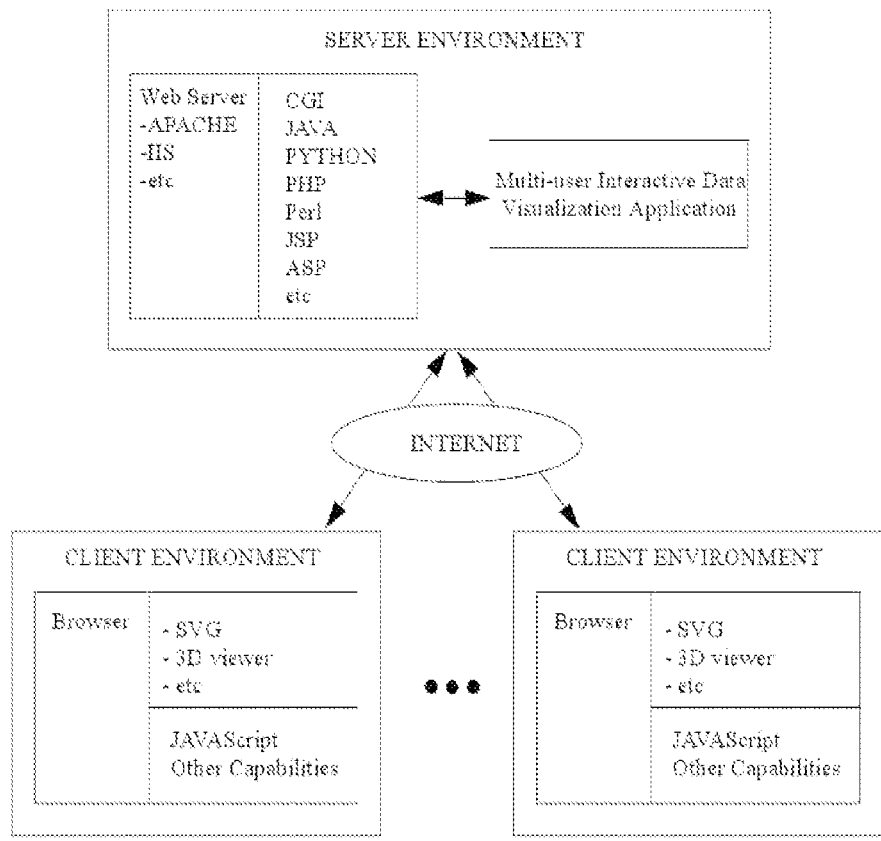
FIG. 30C depicts a server-side collaboration implementation comprising a server-based multi-user interactive data visualization application.
Figure 30D:
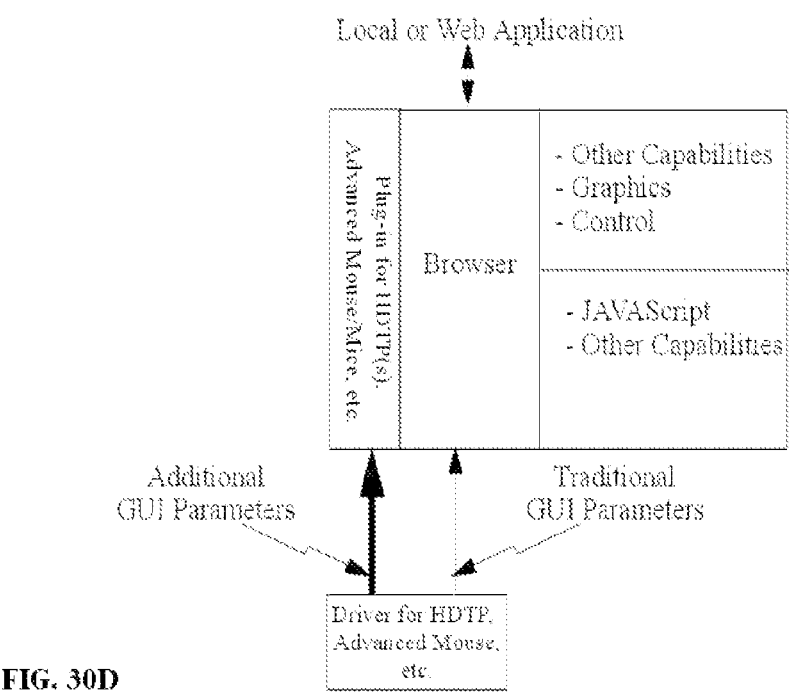
FIG. 30D depicts an interface between an HDTP and a browser which directs additional GUI parameters via a browser plug-in according to an example implementation.
Figure 30E:
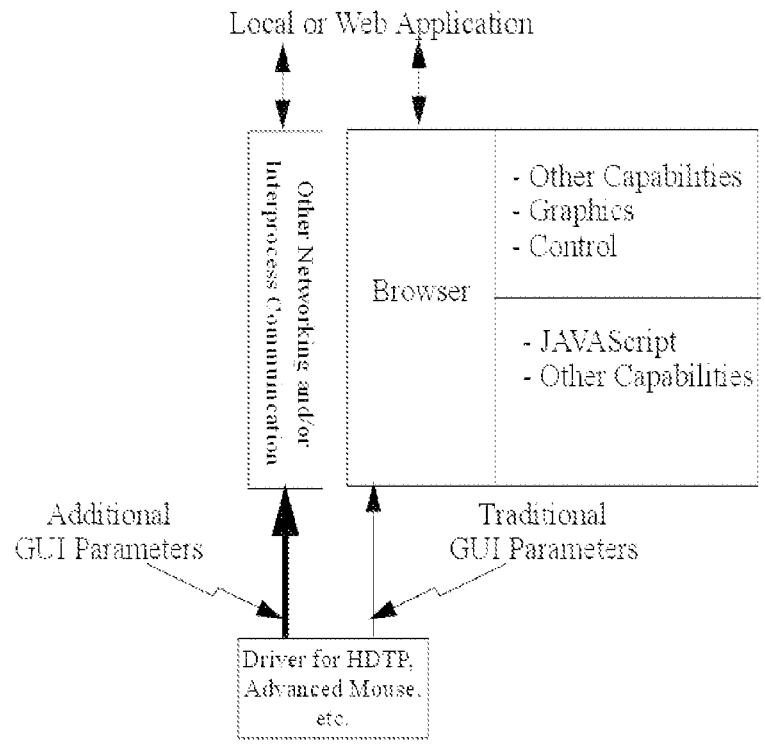
FIG. 30E depicts an interface between an HDTP and a browser, which directs additional GUI parameters though other network channels, according to an example implementation.
Figure 30F:
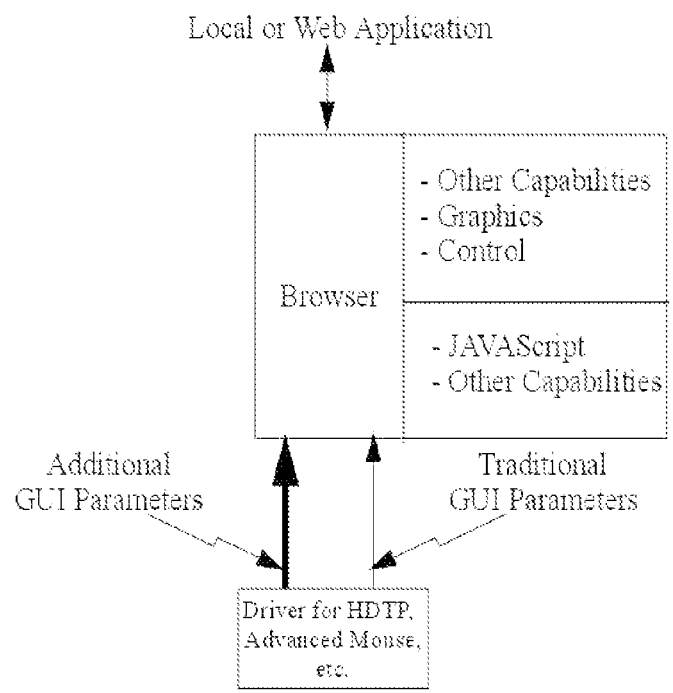
FIG. 30F depicts an interface between an HDTP and a browser, which interfaces all parameters to the browser directly, according to an example implementation.

FIG. 30C shows a server-side collaboration implementation comprising a server-based multi-user interactive data visualization application.

Interfacing with Sonification

The invention further provides for interfacing with established and advanced data sonification utilities. Data sonification has received considerable attention and analysis but for the most part is fairly simplistic and often contributes little practical value. More advanced data sonification techniques, such as the multi-channel data sonification system described in U.S. Patent Application 61/268,856 employed in the environmental GIS (Geographic Information System) process monitoring and modeling system of U.S. Patent Application 61/268,873, provides new opportunities for practical use of data sonification.

FIG. 31 illustrates a general framework for data sonification where a parameterized metaphor is used to manage parameter assignment and sound rendering and a parameterized data indexing operation.

Data sonification may be applied to the same data used to generate visualization. The data directed to data sonification may be selected by interacting with a rendered visualization via a user interface input device. Data sonification may be provided by a multichannel data sonification system such as the one described in U.S. Patent Application 61/268,856. Data sonification output may be shared using an audio channel of a real-time collaboration system, may be transmitted from a web-based application using an audio channel as provided by a high-fidelity VoIP system, may be shared using an audio channel as provided by a high-fidelity VoIP system, may be produced local to the user computer under the control of a web-based application, or may be produced local to the user computer under the control of a web-based application employing MIDI protocol.

Some user interface considerations relating to configurations, features and parameters of data sonification operations are described in the aforementioned U.S. Patent Application 61/268,856. Beyond these, and more generally, configurations, features and parameters of data sonification operations can be selected via user interface dialog windows. General forms configuration-specification, feature-selection, and parameter-setting GUIs are known in the art.

Uniform Parameterizations of Cell and Data Presentation Attributes

The invention provides for visualization rendering parameters to be uniform over a common variational range. This permits uniform handling of visualization rendering parameters and numerical operation compositions. Any of these can be set, varied, or modulated as selected or as advantageous to represent data or information derived from data. In an embodiment, the invention provides for visualization rendering uniform parameters in the range of [0,1]. The uniform parameter range of [0,1] is used in the examples below, but it is understood that other choices for the uniform range are also possible and are provided for by the invention.

Color Morphing

The invention provides for at least one color selection option to be determined by a uniform parameter in the range of [0,1]. FIG. 32 depicts an exemplary embodiment wherein the hue of a color can be varied through natural colors of red through violet for the bulk of the [0,1] range and a range of artificial colors, such as the purple through magenta continuum, are appended for the remaining portion of the [0,1] range. The invention also provides for other color models, such as RGB, HSB, LUV, LAB, grayscale, etc. to be used with one to three uniform parameters, each in the range of [0,1]. Such uniform parameter colors can be assigned one or more of text, symbols, borders, backgrounds, gridlines, glyphs, lines, components of lines, components of stipples, components of gradients, surfaces, and other geometric primitives employed in the visualization of data. Other variations and alternative arrangements are possible as is clear to one skilled in the art.

A uniform parameter range of [0,1] is used in the examples above, but it is understood that other choices for the uniform range are also possible and are provided for by the invention.

Line Morphing

The invention provides for at least one line rendering option to be determined by a uniform parameter in the range of [0,1]. FIG. 33 illustrates an example wherein line width is determined by a uniform parameter in the range of [0,1]. FIG. 33 also illustrates an example wherein line dashing period is determined by a uniform parameter in the range of [0,1]. FIG. 33 further illustrates an example wherein line dashing duty-cycle is determined by a uniform parameter in the range of [0,1]. FIG. 33 also illustrates an example wherein line dashing sub-duty-cycle is determined by a uniform parameter in the range of [0,1]. Other variations and alternative arrangements are possible as is clear to one skilled in the art.

The invention provides for line color to be determined by a uniform parameter color model as described above and for line dashing to include a plurality of colors.

Stipple Morphing

Figure 34:
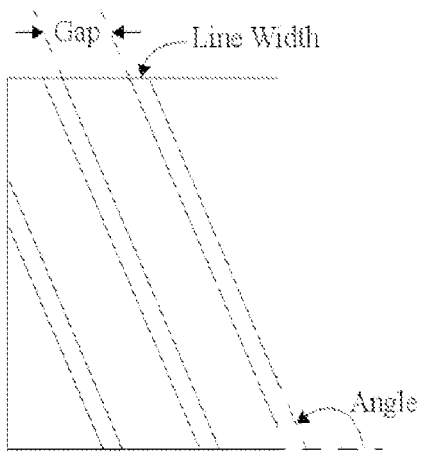
FIG. 34 illustrates an arrangement wherein stipple line width, stipple gap, and stipple angle can be determined by a uniform parameter in the range of [0,1].

The invention provides for at least stipple pattern rendering option to be determined by a uniform parameter in the range of [0,1]. FIG. 34 illustrates an example wherein stipple line width is determined by a uniform parameter in the range of [0,1]. FIG. 34 also illustrates an example wherein stipple gap is determined by a uniform parameter in the range of [0,1]. A period and duty cycle model can be used instead and controlled via respectively associated uniform parameters varying over the range of [0,1].

FIG. 34 further illustrates an example wherein stipple angle is determined by a uniform parameter in the range of [0,1]. Other variations and alternative arrangements are possible as is clear to one skilled in the art.

The invention provides for at least one of stipple foreground and background colors to be determined by a uniform parameter color model as described above. The invention provides for a stipple pattern to comprise more than two colors, for the inclusion of line dashing in a stipple pattern, and for line dashing to include a plurality of colors.

Other variations and alternative arrangements are possible as is clear to one skilled in the art. A uniform parameter range of [0,1] is used in the examples above, but it is understood that other choices for the uniform range are also possible and are provided for by the invention.

Border Morphing

The invention provides for at least one border rendering option to be determined by a uniform parameter in the range of [0,1]. The border rendering option can comprise the border of a spreadsheet cell as depicted in FIG. 35, or can comprise the border of another visually rendered graphical object.

Figure 35:
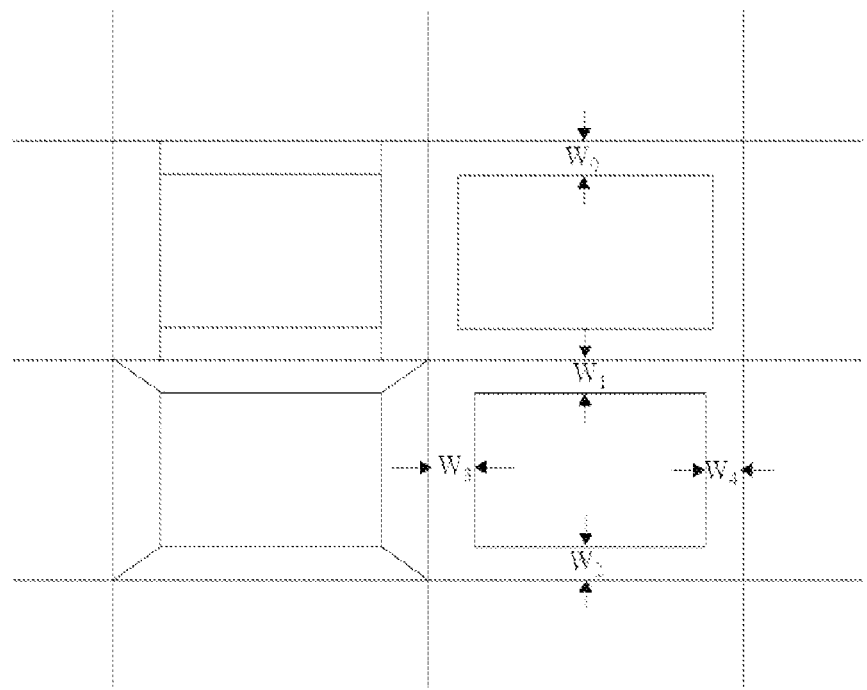
FIG. 35 depicts an arrangement wherein at least one border rendering option is to be determined by a uniform parameter in the range of [0,1]. The border can be the border of a spreadsheet cell as depicted, or can be the border of another visually rendered graphical object.

In the complete cell depicted in the upper right corner of FIG. 35, all four sides of the cell border are uniform. Such a border to have a common width $W_0$ controlled by a uniform parameter in the range of [0,1] and to have a common color controlled by one or more uniform parameters in the range of [0,1]. The cell border can be rendered as a gradient among two or more selected colors, wherein the colors and/or gradient characteristic can be respectfully determined by an associated uniform parameter in the range of [0,1].

In the complete cell depicted in the lower right corner of FIG. 35, all four sides of the cell border are distinct. The invention provides for each such border segment to have an associated width ($W_1$-$W_4$), each respectively controlled by an associated uniform parameter in the range of [0,1]. The invention further provides for each such border segment to have a common color controlled by one or more uniform parameters in the range of [0,1]. A border segment can be rendered as a gradient among two or more selected colors, wherein the colors and/or gradient characteristic can be respectfully determined by an associated uniform parameter in the range of [0,1].

The invention further provides for such a cell (interior) background to be filled with a color controlled by one or more uniform parameters in the range of [0,1]. In an embodiment, the invention provides for stipple patterns to be used as a cell background. The cell background can be rendered as a gradient among two or more selected colors, wherein the colors and/or gradient characteristic can be respectfully determined by an associated uniform parameter in the range of [0,1].

The invention also provides for the four sides of a cell border to be segmented in other ways, for example as in the two complete cells in the left side of FIG. 35.

Other variations and alternative arrangements are possible as is clear to one skilled in the art. A uniform parameter range of [0,1] is used in the examples above, but it is understood that other choices for the uniform range are also possible and are provided for by the invention.

Font Morphing

The invention provides for font morphing and font interpolation under the control of uniform parameters in the range of [0,1]. Other choices for the uniform range are also possible and are provided for by the invention.

Figure 36A:
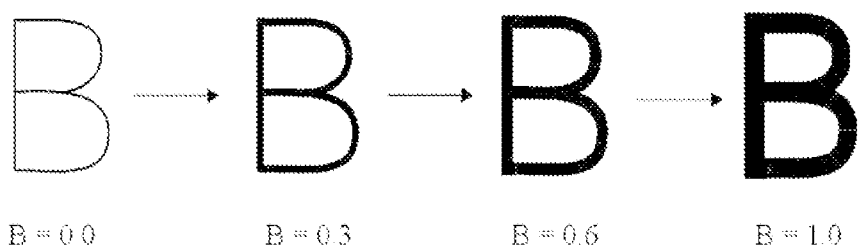
FIG. 36A depicts an arrangement wherein a boldness parameter is under the control of uniform parameters in the range of [0,1].

FIG. 36A depicts a boldness parameter under the control of uniform parameters in the range of [0,1]. In an embodiment, the variation in boldness can be implemented so that it is governed by the optical properties of de Groot Interpolation Theory. In an embodiment, a minimum and maximum degree of boldness are assigned to the extremes of the parameter range.

FIG. 36B depicts an italics angle parameter under the control of uniform parameters in the range of [0,1]. In an embodiment, a minimum and maximum degree of italics angle is assigned to extremes of the parameter range.

FIG. 36C depicts an font family interpolation parameter under the control of uniform parameters in the range of [0,1]. One font family is assigned to the minimum extreme of the parameter range and a second font family is assigned to the maximum extreme of the parameter range.

FIG. 37A depicts vertical and horizontal dilation/contraction parameters, each respectively under the control of uniform parameters in the range of [0,1]. In an embodiment, a minimum and maximum degree of italics angle are assigned to the extremes of the parameter range.

FIG. 37B shows font underline line width and font underline separation gap parameters, each respectively under the control of uniform parameters in the range of [0,1]. In an embodiment, a minimum and maximum degree of italics angle are assigned to the extremes of the parameter range.

Other variations and alternative arrangements are possible as is clear to one skilled in the art. A uniform parameter range of [0,1] is used in the examples above, but it is understood that other choices for the uniform range are also possible and are provided for by the invention.

User Interfaces for Adjusting Cell and Data Presentation Attributes

Configurations, features and parameters for related operations, such as data set selection, data ranges, offsets, scalings, warping functions, etc., can be, for example, selected via traditional types of user interface dialog windows. General forms configuration-specification, feature-selection, and parameter-setting GUIs are known in the art.

Figure 38:
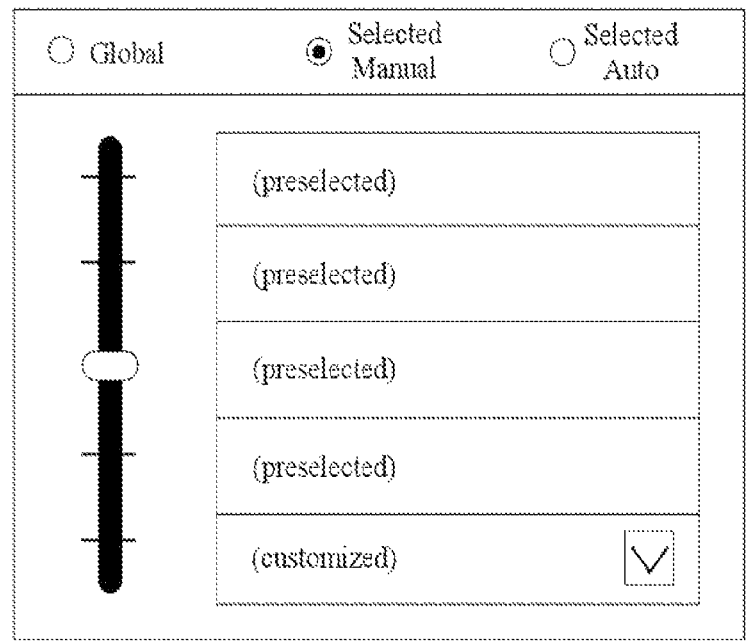
FIG. 38 depicts an attribute control panel wherein there are pre-selected values and a value which can be customized.

The invention provides for user interfaces to simplify operation with a friendly user interface for new or occasional users. A typical attribute control panel, as shown in FIG. 38, contains a few pre-selected values and a value which can be customized usually by selecting a value from a drop-down list.

Also, users can specify if the changes in attributes are to be applied globally or are to be applied to a single cell or a group of cells in a spreadsheet. The change to be made can also be determined by the value of a data element or by the result of a formula calculated from one or more data elements.

Figure 39:
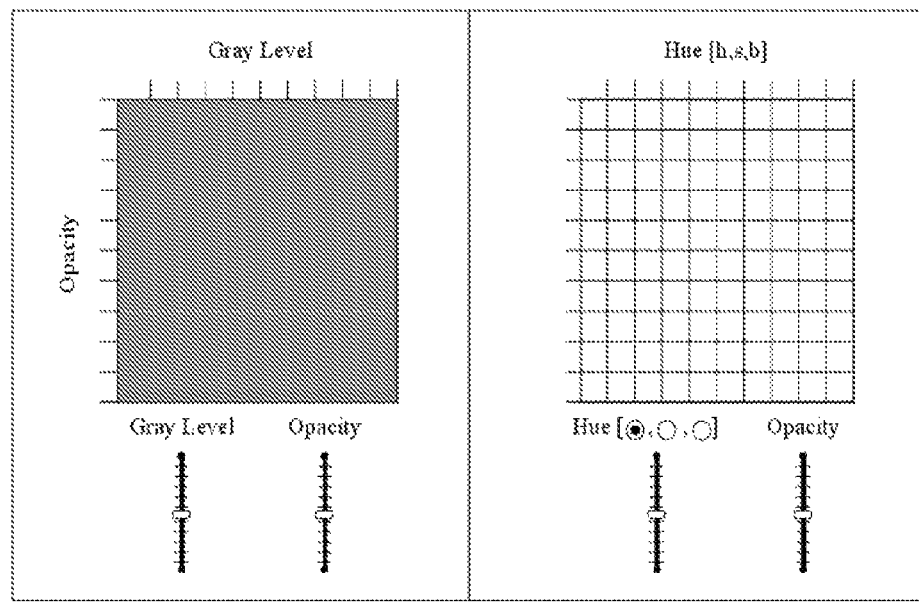
FIG. 39 depicts an arrangement wherein a change in color of a font can be specified for a cell, a group of cells, or globally across an entire worksheet.

FIG. 39 illustrates an example of how change in color of a font can be specified for a cell, a group of cells, or globally across an entire worksheet. Users can select the color of a font simply by clicking on a region in the gray level or Hue color chart or by moving the slider that determines the gray level or parameters in Hue. A formula that determines such value can also be included. For example, the ratio of the data in a cell to the range of the data in a category can determine the value of gray level accordingly.

Figure 40:
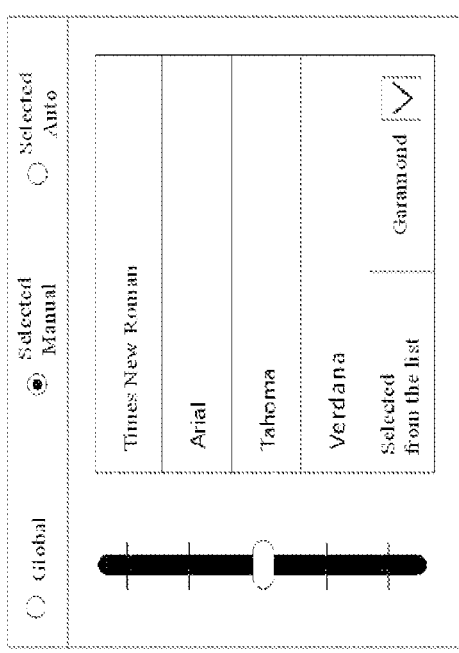
FIG. 40 depicts an interface that determines a font type of the specified cell(s).

FIG. 40 depicts an interface for determining a font type of the specified cell(s). Such interface can have a pre-selected list or a list to be customized or a combination of both, and can be implemented in a wide variety of ways.

Figure 41:
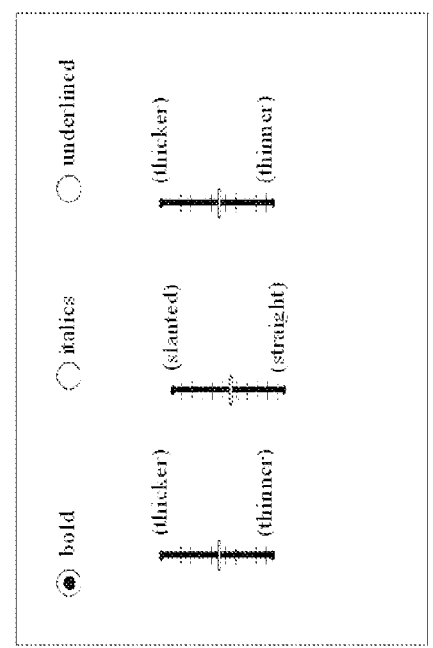
FIG. 41 depicts an interface that determines the embellishment of a font in rendering some data element within the spreadsheet or data table.

FIG. 41 depicts an example of an interface for determining the embellishment of a font in rendering some data element within the spreadsheet or data table. The data element can be displayed in bold face, italics or underlined. The percentage of bolding or the thickness of the underline can be varied. For example a data element can be emphasized by being displayed in bold face, or a title of a book or quotation can be displayed in italics, or a link to a website or a reference to another cell or region can be underlined.

Figure 42:
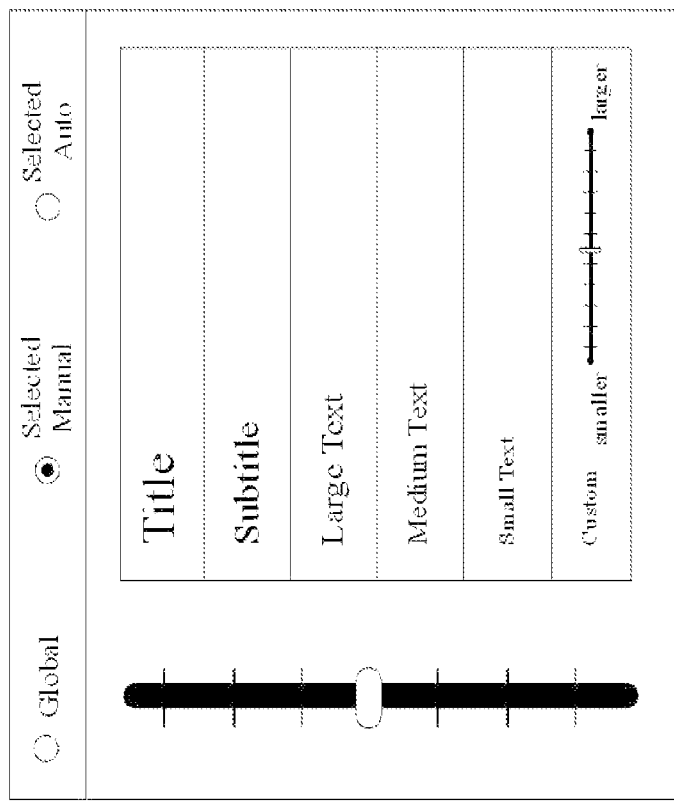
FIG. 42 depicts an interface to control the size of a font to be displayed.

FIG. 42 depicts an example interface to control the size of a font to be displayed. Several preset sizes are listed on the panel as well as a slider that enables users to control the font size gradually. Font size can be incremental with step sizes or continuous, which can be adjusted by controlling a slider, as long as the value is positive and less than reasonable size compared to the area of the text displayed.

Figure 43:
FIG. 43 depicts an wherein data in a cells in a selected column can have symbol appended to data within the cells of the column.

The invention provides for a user interface to determine addition of an appending symbol. The symbol(s) can be different types, numbers, or sizes of graphical objects. The factor that determines can depend on the significance or the ratio of the element to the category or the value of another category in the dataset. In this example, the symbols appended to the right end of the chart represent different categories of expenses. If the symbol appended is configured to represent quantity, the number of symbols to be appended will depend on the ratio of the value of the cell to the unit or base value. If the symbol appended is configured to represent significance, the size of symbols to be appended will depend on the significance of the value of the cell in that category. FIG. 43 depicts an example wherein data in a cells in a selected column can have symbol appended to numbers or other data within the cells of the column.

Different formatting options can be applied to different types of data. The factor that determines the type of data can be obtained from the result of a hidden formula, from associated data such as the data from another column in the same row, or simply selected by the user. The number of decimals can be determined according to such factors. Also symbols can be attached according to the type of data. If the data in a cell represents currency, a currency symbol can be attached, and if the data represents percentage, a percentage sign will be attached. Further if the country is specified in another column, the corresponding country's currency sign can be attached.

The invention provides for the varying the color and opacity/transparency of the background color of a cell or group of cells as a function of data values. Specifying background color and opacity/transparency can be done similarly with the case for color of the font is determined, as illustrated in FIG. 39. For example, a user can affect the control the background color and opacity/transparency with the sliders or by simply clicking on a region of color or grayscale chart. The background color control can also be incorporate auto-scaling. Optionally, and the color can be determined depending on the ratio of the value of the cell to the values in the column.

Figure 44:
FIG. 44 depicts an example use of controlling the background texture or stipples of cells as a function of data values in a spreadsheet or other form of tabular data.
Figure 45:
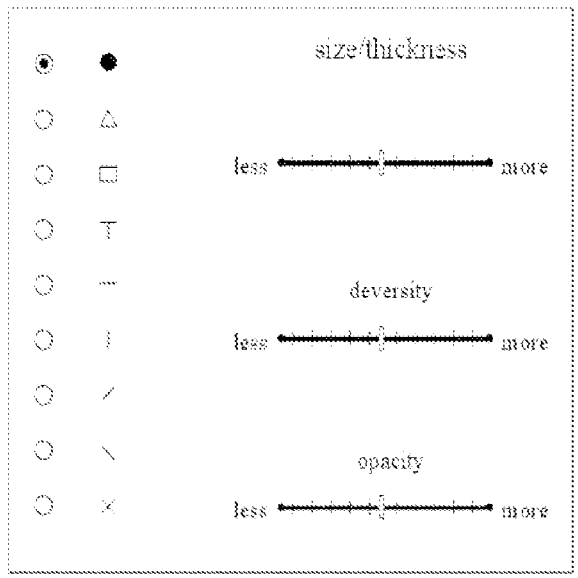
FIG. 45 depicts an interface that can be used to specify the background texture or stipples to be applied to a cell or a group of cells.

Similarly, the invention provides for the background texture or stipples of a cell or group of cells can also be varied as a function of data values. FIG. 44 depicts an example use of controlling the background texture or stipples of cells as a function of data values in a spreadsheet or other form of tabular data. FIG. 45 depicts an exemplary interface that can be used to specify the background texture or stipples to be applied to a cell or a group of cells. The stipples of a cell can be made up of dots, shapes, or grid lines. The size, thickness, density, or opacity of the background can be adjusted with sliders as well. Stipples can be used alone or in combination with the background color.

The invention provides for the specifying the location of a displayed data element within a cell. FIG. 46 depicts an exemplary interface that can be used to specify the position of text being displayed in a cell. Users can move sliders by clicking and dragging on the icon and moving it vertically or horizontally to specify vertical or horizontal position of text displayed in a cell. Users can specify the point of vertical and horizontal centering by clicking on a region in the provided box and selecting how texts are aligned horizontally or vertically relative to the point specified. In an embodiment, values representing the left-right or up-down ratio can be simply entered in text boxes by the users.

The invention provides for the specifying the location of a displayed rotation of text, symbols, or other information within a cell. FIG. 47 depicts an exemplary interface that can be used to specify the rotation of text, symbols, or other information displayed combined with the vertical or horizontal placement of the text. By clicking and dragging the right tip of the slider handle, the user can control the text to be rotated counter-clockwise, and vice versa. Vertical or horizontal shift of the position of the text can be controlled by clicking and dragging the middle of the slider handle to the desired direction.

The invention provides for a user interface to select of the color of at least one border of a cell, the thickness of at least one border of a cell enveloping a font, the thickness of at least one border outlining of a plurality of contiguous cells, and for a rendered image element.

The invention provides for data of a specified category to be extracted from cells and matched with hidden formula to obtain data used in the visualization. Data from another associated group of cells can be used for another attribute in the visualization. For example, data from one category can be used to determine the type of object displayed, another category can be used to determine the location of the object displayed, another category can be used to determine the number of objects displayed, and data from another category can be used to determine the size of the object(s) displayed. Existing spreadsheet applications offer various types of charts, but the placing of the objects are limited to aligning them in certain orders or directions.

The invention provides for visualizations to be co-rendered with the spreadsheet program. The invention provides for visualizations displayed on a specified region of a spreadsheet. In an embodiment, the invention provides for the result of visualizations to be exported to outside of the spreadsheet program.

Spreadsheet Visualizations

Figures 49, 50, 51A:
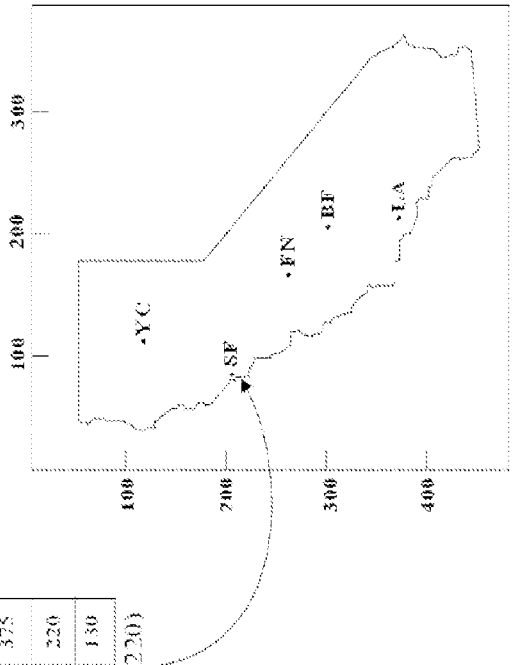
FIG. 49 depicts a visualization wherein the shading of a of a row area of data elements is varied as a group as a function of a data value and also wherein the font boldness of a column area of data elements is varied as a group as a function of another data value.
FIG. 50 illustrates a priority job queue model tabular-data visualization wherein the row can automatically reorder among themselves as underlying priority vales change.
FIG. 51A illustrates a basic map-based visualization example generated from previous data.

The invention provides for visual aspects of groups of cells to be varied together as a function of a data value. For example, FIG. 48 depicts an exemplary visualization wherein an attribute of a column area of data elements is varied as a group. In this example a set of collected data containing the state, main industry, population, the increase in population, number in current work force, unemployment rate, and the increase in unemployment rate can be used for different purposes. Depending on what category the emphasis is on, an attribute of that column can be varied. Such emphasis can be done by varying the font boldness, font size, or font color. FIG. 49 depicts an exemplary visualization wherein the shading of a row area of data elements is varied as a group as a function of a data value and also wherein the font boldness of a column area of data elements is varied as a group as a function of another data value.

The invention provides for a reordering of tabular rows and/or columns as a function of data values. Unlike a traditional spreadsheet data sort, such a reordering operates as a "live" function, responsive to interactive changes of the underlying data values. FIG. 50 illustrates a model of a priority queue wherein the rows can automatically reorder among themselves as underlying priority sales change. Jobs to be done can have different attributes, such as location or types of jobs along with numbers that indicate the rating of priority. A user would expect jobs with a higher priority rating to be displayed in a higher position of the priority queue tree listing and to reorder as calculated priority values change.

In another aspect of the invention function or mapping utilities can be included in the program. FIG. 51A illustrates a basic map-based visualization example generated from previous data. FIG. 51B illustrates the visualization of FIG. 51A augmented with additional spatially located symbols or parameterized glyphs.

Interactive Tabular Spreadsheet Metaphor for Presentation of Visualization Renderings The invention provides for interactive tabular spreadsheet metaphor for presentation of visualization renderings. A cell may be selected and the data used to create the enclosed visualization can be captured (as structured for the enclosed visualization) to be used in a subsequent visualization or calculation. A cell may be selected and the pre-visualization dataflow and processing steps used to create the enclosed visualization can be captured (as structured for the enclosed visualization) to be used in a subsequent visualization or calculation. A cell may be selected and the visualization format employed by the enclosed visualization can be captured (as structured for the enclosed visualization) to be used in a subsequent visualization or calculation.

Two cells can be selected and the data used to create the enclosed visualizations can be captured (as structured for the enclosed visualization) and provided to a mathematical operation (for example, adding, subtracting, multiplying, convolving, etc.) to form a new dataset to be used in a subsequent visualization or calculation. Similarly, multiple cells can be selected and the data used to create the enclosed visualizations can be captured (as structured for the enclosed visualization) and merged to form a new dataset to be used in a subsequent visualization or calculation. Embodiments of the invention can also include one or more of the following optional features:

- At least part of the captured data can be re-sampled. In an embodiment, redundant data occurring in the merged dataset is removed;
- Gaps in data occurring in the merged dataset are noted. In an embodiment, gaps in data occurring in the merged dataset can be filled in via interpolating functions;
- At least one partial row and at least one partial column can be selected and an operation applied to the underlying data;
- At least one partial row and at least one partial column can be selected and an operation applied to the individually enclosed visualizations;
- At least one partial row and at least one partial column can be selected and at least one attribute and/or parameter of a common visualization operation can be adjusted and applied to each of the individually enclosed visualizations;

At least one partial row and at least one partial column can be selected and at least one attribute and/or parameter of a common pre-visualization operation can be adjusted and applied to each of the individually enclosed visualizations;

At least one partial row and at least one partial column can be selected and at least one attribute and/or parameter of a common data source selection can be adjusted and applied to each of the individually enclosed visualizations.

Exemplary 3D Graphics Augmentations to Spreadsheet Visualizations

The invention provides for the inclusion of useful novel 3D graphics visualization functions for multidimensional data representation, data query, and numerical solution tools for simultaneous interactive numerical equations. These can be incorporated in various ways, as described below, to expand spreadsheet-based visualization capabilities yet further.

A first set of the useful novel 3D graphics visualization functions provided for by the invention pertain to multidimensional data visualizations based on 2D-surfaces embedded in a 3D visual field. FIG. 52 data or spreadsheet, these separated by a vertical gap within a 3D visual field as provided for by the invention. The invention also provides for interactively shifting the observation point with respect to these objects for more detailed feature, theme, or trend inspection. The viewpoint can be changed according to the 6 degrees of freedom (three translations, three angles) of rigid motion. FIG. 53 depicts with dashed lines a few ways in which the observation viewpoint can be moved with respect to these abstract objects. The viewpoint is changed under the control of an HDTP or can be changed under the control of an advanced mouse.

The invention also provides for moving the 2D-surface representing a 3D data plot within the 3D visual field. The 2D-surface can be moved according to the 6 degrees of freedom (three translations, three angles) of rigid motion. FIG. 54 depicts a translation and rotation of a 3D data plot within the 3D visual field. The 3D data plot can be moved under the control of an HDTP or the 3D data plot can be moved under the control of an advanced mouse.

The 2D-surface representing a 3D data plot within the 3D visual field can be virtually illuminated by one or more lighting sources. The one or more lighting sources can be moved according to the 6 degrees of freedom (three translations, three angles) of rigid motion. The one or more lighting sources can also permit control of the color and intensity of virtual light emitted. A lighting source can be moved and controlled under the control of an HDTP or under the control of an advanced mouse.

The data plotted in the 2D-surface representing a 3D data plot within the 3D visual field can directly echo the data displayed in the exemplary planar array of associated tabular data or spreadsheet and/or can originate from another set of tabular data or spreadsheet region and/or can originate from other data. This is suggested by FIG. 55A. The invention also provides for processing of the data via mathematical transformations, statistical processing, signal processing, etc. prior to creation of the 2D-surface representing at least 3-dimensional data. This is suggested by FIG. 55B. In an embodiment, the 2D-surface representing at least 3-dimensional data can plot filtered or averaged versions of tabular data, spreadsheet data, or other data. In an embodiment, and the filtering or averaging can be controlled by an interactive parameter.

Figures 56, 57:
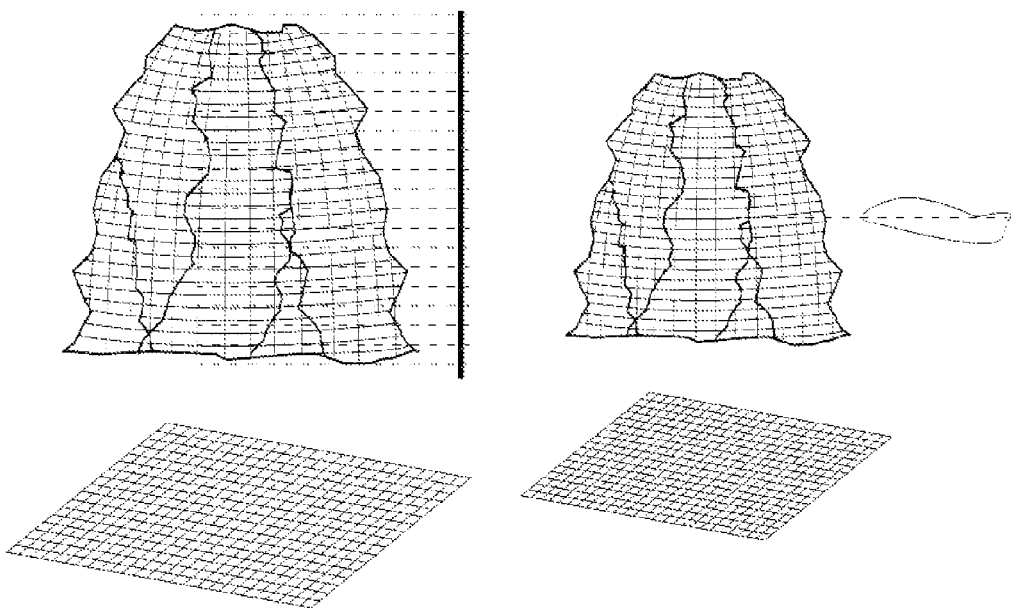
FIG. 56 illustrates a height measuring visual in its use with 2D-surface representing at least 3-dimensional data and useful for representing at least 4-dimensional data.
FIG. 57 depicts a slicing function here used to provide a (planar-slice) level set curve.

The invention provides for 2D-surface representing of at least 3-dimensional data to be rendered along with a height measuring visual so that the local color of the surface need not be a function of the vertical value being plotted. This frees up the local 2D-surface color to be used to represent an additional dimension of data. FIG. 56 illustrates an exemplary height measuring visual in its use with 2D-surface representing at least 3-dimensional data and useful for representing at least 4-dimensional data.

The invention provides for a 2D-surface representing at least 3-dimensional data to be rendered with a parameterized locally varying surface texture that can be used to represent an additional dimension of data, with numerical values rendered on the surface that can be used to represent an additional dimension of data, with symbols rendered on the surface that can be used to represent an additional dimension of data, or with parameterized glyphs rendered on the surface that can be used to represent (an) additional dimension(s) of data.

The invention provides for a slicing function to provide level set data. FIG. 57 depicts an exemplary slicing function, here used to provide a (planar-slice) level set curve. Other uses, implementations, and applications for slicing functions are also possible.

Figures 58A, 58B:
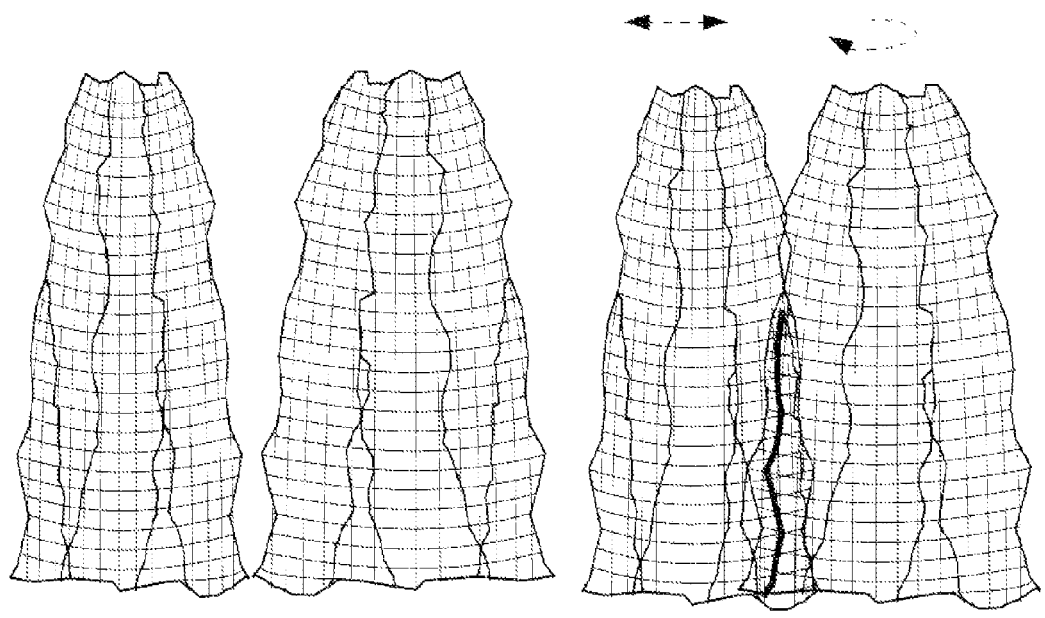
FIG. 58A illustrates two 2D-surfaces, each representing at least 3-dimensional data.
FIG. 58B illustrates the interactively created intersection of the two exemplary 2D-surfaces and the resultant intersection curve.

The invention provides for a more general surface intersection tool that can be used as a numerical solution operator for plotted, interpolated, and processed data. FIG. 58A illustrates two exemplary 2D-surfaces, each representing at least 3-dimensional data. Each of these can be interactively moved and rotated as described earlier. FIG. 58B illustrates the interactively created intersection of the two exemplary 2D-surfaces and the resultant intersection curve. A 2D-surface intersection tool allows the numerical values of selected points on a curve formed by the intersecting surfaces to be numerically calculated and visually displayed. The numerical values can also be used for other purposes and other subsequent calculations.

The sample points can be selected according to the details of the intersection. An adaptive sampling method can be employed. The resultant intersection data can be interpolated and re-sampled according to another sampling strategy. More than two surfaces can be intersected simultaneously, and various pair wise and group intersection data can be captured and displayed.

A second set of the useful novel 3D graphics visualization functions provided for by the invention pertain to multidimensional data visualizations based on 1D-curves embedded in a 3D visual field.

Figure 59:
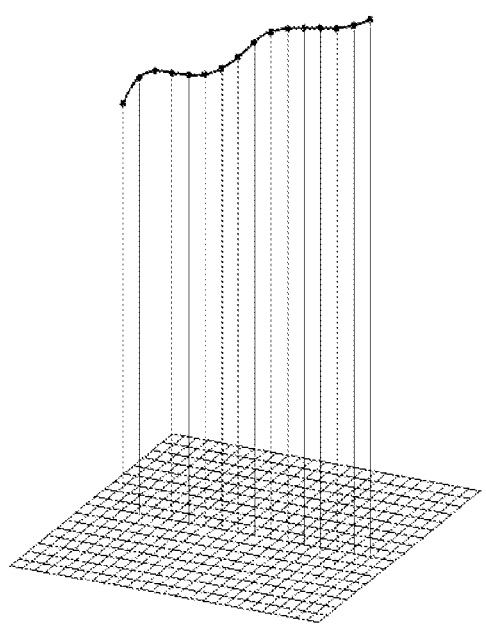
FIG. 59 depicts an arrangement wherein a curve can be generated by tabular data and be suspended over tabular data used to create it or otherwise associated with the curve, and can be visually linked to a geometric rendering of tabular data values.
Figure 60:
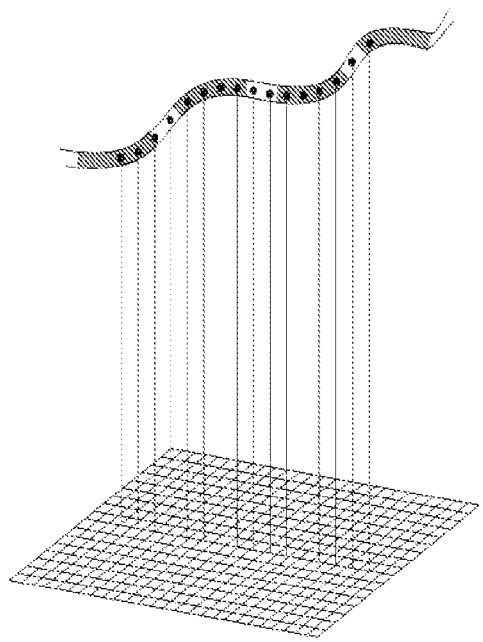
FIG. 60 depicts an arrangement wherein a curve can be given a thickness and or color under the control of data values.
Figure 61:
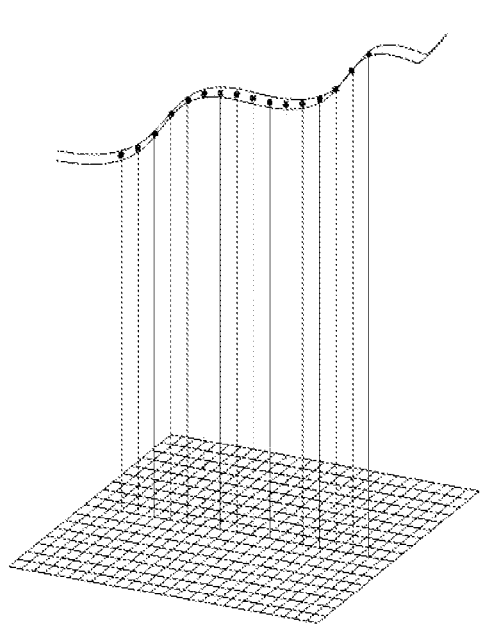
FIG. 61 depicts an arrangement wherein the thickness of a curve can be varied as a function of one or more data values.

The invention provides for a curve to be generated by tabular data and to be suspended over tabular data used to create it or otherwise associated with the curve. The invention provides for the curve to be visually linked to a geometric rendering of tabular data. These features are illustrated by FIG. 59. The invention provides for the curve to be given a thickness and or color under the control of one or more data values. The invention provides for the color of the curve to be varied as a function of tabular (or other) data values. These features are illustrated by FIG. 60. The invention provides for the thickness of the curve to be varied as a function of tabular (or other) data values. This feature is illustrated in FIG. 61.

Such curve plotting utilities can be provided with functions, features, and operations like that of the 2D-surface utilities described above. The invention also provides for interactively shifting the observation point with respect to these objects for more detailed feature, theme, or trend inspection. The viewpoint can be changed according to the 6 degrees of freedom (three translations, three angles) of rigid motion. The viewpoint is changed under the control of an HDTP or an advanced mouse. The invention also provides for moving a curve within the 3D visual field. The curve can be moved according to the 6 degrees of freedom (three translations, three angles) of rigid motion. The 2D-surface can be moved under the control of an HDTP or an advanced mouse.

A curve of any thickness can be treated as if it comprises a surface that can be virtually illuminated by one or more lighting sources. The one or more lighting sources can be moved according to the 6 degrees of freedom (three translations, three angles) of rigid motion. The one or more lighting sources can also permit control of the color and intensity of virtual light emitted. In an embodiment, a lighting source can be moved and/or controlled under the control of an HDTP or an advanced mouse.

The data plotted in a curve can directly echo the data displayed in the exemplary planar array of associated tabular data or spreadsheet and/or can originate from another set of tabular data or spreadsheet region and/or can originate from other data as suggested earlier in FIG. 55A. The invention also provides for processing of the data via mathematical transformations, statistical processing, signal processing, etc. prior to creation of the curve as was suggested earlier in FIG. 55B. A curve can plot filtered or averaged versions of tabular data, spreadsheet data, or other data. In an embodiment, the filtering or averaging can be controlled by an interactive parameter.

The invention provides for a curve to be rendered along with a height measuring visual, and also provides for a locally variable parameterized texture to be imposed on the curve and for the texture to be varied as a function of tabular or other data.

The invention provides for the curve to be rendered with numerical values displayed adjacently at specific points on the curve and that these can be used to represent an additional dimension of data. The invention also provides for the curve to be rendered with symbols displayed adjacently at specific points on the curve and that these can be used to represent an additional dimension of data. The invention further provides for the curve to be rendered with parameterized glyphs displayed adjacently at specific points on the curve and that these can be used to represent (an) additional dimension(s) of data.

Figure 62:
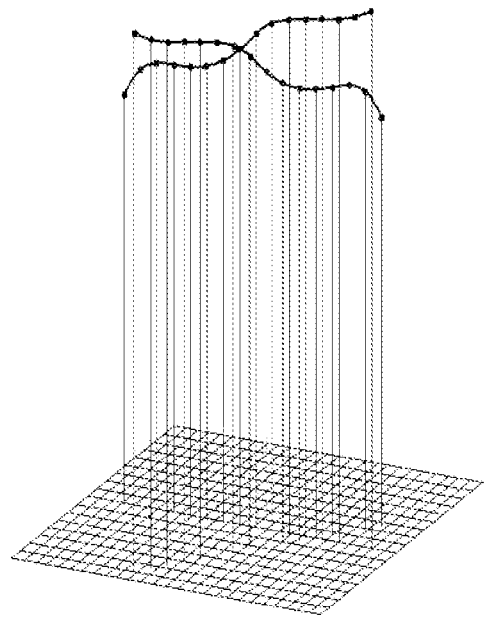
FIG. 62 depicts a curve intersection tool that can be used as a numerical solution operator for plotted, interpolated, and processed data.

The invention provides for a curve intersection tool that can be used as a numerical solution operator for plotted, interpolated, and processed data. FIG. 62 illustrates two exemplary curves, each representing at least 2-dimensional data. Each of these can be interactively moved and rotated as described earlier, interactively creating an intersection of the two exemplary curves and at least one resultant intersection point. In an embodiment, a 2D-surface intersection tool allows the numerical values of intersection points to be numerically calculated and visually signified. The numerical values can also be used for other purposes and other subsequent calculations.

In an embodiment, more than two curves can be intersected simultaneously, and various pair-wise and group intersection data can be captured and displayed.

For example, a curve and a surface can be intersected simultaneously, and intersection data can be captured and displayed. As another example, more than two curves and at least one surface can be intersected simultaneously, and various pair-wise and group intersection data can be captured and displayed.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. Therefore, the invention properly is to be construed with reference to the claims.

I claim:

1. A method for interactive orienting and computing the intersection between a pair of surfaces representing provided data, the method comprising:

obtaining at least a first plurality of data values and a second plurality of data values;

rendering a first visualization of a first two-dimensional surface, the first visualization computed from the first plurality of data values and further computed from first position data, first orientation data, and first viewpoint data;

rendering a second visualization of a second two-dimensional surface, the second visualization computed from the second plurality of data values and further computed from second position data, second orientation data, and second viewpoint data; and computing intersection data corresponding to the mathematical intersection of the first two-dimensional surface and the second two-dimensional surface, the computation responsive to the first position data, first orientation data, second position data, and second orientation data, wherein the first visualization and second visualization are rendered to form a common visualization in a common visual display area, the common visualization being representative of an intersection between the first visualization and the second visualization, wherein the computed intersection data is provided to an external computation, and wherein the common visualization is formed based on the computed intersection data.

2. The method of claim 1, wherein the first position data is provided from a user interface.

3. The method of claim 1, wherein the first orientation data is provided from a user interface.

4. The method of claim 1, wherein the first viewpoint data is provided from a user interface.

5. The method of claim 1, wherein the first plurality of data comprises tabular data associated with an electronic spreadsheet.

6. The method of claim 5, wherein the common visualization is displayed together with the display of tabular data of the electronic spreadsheet.

7. The method of claim 6, wherein the display of tabular data of the electronic spreadsheet is rendered within the common visualization.

8. The method of claim 1, wherein the common visualization is a 3-dimensional visualization.

9. The method of claim 1, wherein the rendered surface of at least one of the first visualization of the first two-dimensional surface and the second visualization of the second two-dimensional surface further comprises a color, the color representing values of at least one additional dimension of data at least one of the first plurality of data values and second plurality of data values.

10. The method of claim 1, wherein the rendered surface of at least one of the first visualization of the first two-dimensional surface and the second visualization of the second two-dimensional surface further comprises a parameterized locally varying texture, the texture representing values of at least one additional dimension of data at least one of the first plurality of data values and second plurality of data values.

11. The method of claim 1, wherein the rendered surface of at least one of the first visualization of the first two-dimensional surface and the second visualization of the second two-dimensional surface is further supplemented with at least one symbol rendered on the surface, the symbol representing values of at least one additional dimension of data at least one of the first plurality of data values and second plurality of data values.

12. The method of claim 1, wherein the rendered surface of at least one of the first visualization of a first two-dimensional surface and the second visualization of a second two-dimensional surface is further supplemented with at least one parameterized glyph rendered on the surface, the parameterized glyph representing values of at least one additional dimension of data at least one of the first plurality of data values and second plurality of data values.

13. The method of claim 1, wherein the rendered surface of at least one of the first visualization of the first two-dimensional surface and the second visualization of the second two-dimensional surface is further virtually illuminated by at least one virtual light source.

14. The method of claim 1, wherein an attribute of the virtual light source can be controlled by a user interface.

15. The method of claim 1, wherein the method comprises rendering a visualization of at least a third two-dimensional surface, the visualization computed from data values and further computed from at least third position data, third orientation data, and third viewpoint data.

16. The method of claim 1, wherein more than two surfaces are intersected simultaneously, and wherein group intersection data is displayed.

17. The method of claim 1, wherein more than two surfaces are intersected simultaneously, and wherein group intersection data is captured.

18. The method of claim 1, the method further comprises rendering a visual height measuring tool in the common visualization.

19. The method of claim 1, wherein numerical values of selected points on a curve formed by the intersecting surfaces are numerically calculated.

20. The method of claim 1, wherein numerical values of selected points on a curve formed by the intersecting surfaces are visually displayed.

21. The method of claim 1, wherein the computing of the intersection data comprises interpolation.

22. The method of claim 1, wherein the computing of the intersection data comprises resampling.

23. The method of claim 1, wherein the method provides a numerical solution for simultaneous interactive numerical equations.

24. The method of claim 1, wherein the first position data and the first orientation data are derived from input from the input device, and wherein the first visualization is rendered based on the input from the input device.

25. The method of claim 1, wherein the second position data and the second orientation data are derived from input from the input device, and wherein the second visualization is rendered based on the input from the input device.

* * * * *